US008145639B2

(12) United States Patent
Williams

(10) Patent No.: US 8,145,639 B2
(45) Date of Patent: *Mar. 27, 2012

(54) SYSTEM AND METHODS FOR PATENT EVALUATION

(76) Inventor: Allan Williams, Ottawa (CA)

( * ) Notice: Subject to any disclaimer, the term of this patent is extended or adjusted under 35 U.S.C. 154(b) by 967 days.

This patent is subject to a terminal disclaimer.

(21) Appl. No.: 10/915,598

(22) Filed: Aug. 11, 2004

(65) Prior Publication Data

US 2006/0036635 A1  Feb. 16, 2006

(51) Int. Cl.
*G06F 7/00* (2006.01)
(52) U.S. Cl. .................... 707/741; 707/756; 707/930
(58) Field of Classification Search .................. None
See application file for complete search history.

(56) References Cited

U.S. PATENT DOCUMENTS

| | | | |
|---|---|---|---|
| 4,658,370 A * | 4/1987 | Erman et al. ............... 706/60 |
| 5,052,043 A | 9/1991 | Gabordki | |
| 5,138,377 A | 8/1992 | Smith | |
| 5,170,443 A | 12/1992 | Todd | |
| 5,398,300 A | 3/1995 | Levey | |
| 5,721,910 A * | 2/1998 | Unger et al. ............... 707/100 |
| 5,754,840 A * | 5/1998 | Rivette et al. ............... 707/2 |
| 5,875,284 A * | 2/1999 | Watanabe et al. ............ 706/2 |
| 5,991,751 A | 11/1999 | Rivette | |
| 5,999,907 A | 12/1999 | Donner | |
| 6,029,195 A | 2/2000 | Harz | |
| 6,038,561 A * | 3/2000 | Snyder et al. ............... 707/6 |
| 6,175,824 B1 * | 1/2001 | Breitzman et al. ......... 705/36 R |
| 6,452,613 B1 | 9/2002 | Lefebvre | |
| 6,519,599 B1 | 2/2003 | Chickering | |
| 6,556,992 B1 * | 4/2003 | Barney et al. .............. 707/6 |
| 6,564,198 B1 | 5/2003 | Narayan | |
| 6,665,656 B1 | 12/2003 | Carter | |
| 6,978,115 B2 | 12/2005 | Whitehurst | |
| 7,076,415 B1 | 7/2006 | Demler | |
| 7,130,848 B2 | 10/2006 | Oosta | |

(Continued)

FOREIGN PATENT DOCUMENTS

WO  00/75851  12/2000

OTHER PUBLICATIONS

Duane Hanselman and Bruce Littlefield "Mastering Matlab" Prentice-Hall Inc. 1996.*

(Continued)

*Primary Examiner* — Vei-Chung Liang
(74) *Attorney, Agent, or Firm* — IP-MEX Inc.

(57) ABSTRACT

System, methods, computer program product, and web site for evaluating a patent document have been disclosed. The patent document is characterized by patent indices arranged into a hierarchy, each index reflecting a different aspect of the patent document. The indices are transformed into an integral Patent Quality index of the patent document according to a non-linear transformation, which satisfies certain predetermined rules and boundary conditions. A bias associated with an expert, influencing the evaluation of a patent is taken into account. A corresponding method for determining a monetary value of the patent document is also described. The system for patent evaluation comprises a Patent Quality and Monetary Value processing unit for implementing the methods, and respective input and output data means, including graphical user interface. An Artificial Intelligence system for analyzing and interpreting patent indices and a Visualization unit for color-coded visualization of the results of evaluation are also provided.

47 Claims, 29 Drawing Sheets

U.S. PATENT DOCUMENTS

| | | | |
|---|---|---|---|
| 7,188,069 | B2 | 3/2007 | Hagelin |
| 7,590,287 | B2 | 9/2009 | Lu |
| 7,606,757 | B1* | 10/2009 | Poltorak ............... 705/36 R |
| 2001/0028362 | A1* | 10/2001 | Minezaki et al. ............ 345/746 |
| 2001/0042034 | A1 | 11/2001 | Elliott |
| 2002/0022974 | A1* | 2/2002 | Lindh ............................. 705/3 |
| 2002/0062302 | A1* | 5/2002 | Oosta ............................. 707/1 |
| 2002/0103682 | A1* | 8/2002 | Stemmer et al. .................. 705/7 |
| 2002/0107824 | A1 | 8/2002 | Ahmed |
| 2002/0178029 | A1* | 11/2002 | Nutter et al. .................... 705/1 |
| 2002/0184130 | A1* | 12/2002 | Blasko ........................... 705/35 |
| 2003/0004936 | A1* | 1/2003 | Grune et al. ..................... 707/3 |
| 2003/0061140 | A1* | 3/2003 | Chen ............................... 705/36 |
| 2003/0105727 | A1* | 6/2003 | Reader ........................ 705/400 |
| 2003/0158800 | A1* | 8/2003 | Pisello et al. ................. 705/35 |
| 2003/0212572 | A1* | 11/2003 | Poltorak ......................... 705/1 |
| 2003/0220897 | A1* | 11/2003 | Lee et al. ......................... 707/1 |
| 2004/0015329 | A1 | 1/2004 | Shayegan |
| 2004/0103112 | A1* | 5/2004 | Colson et al. ................ 707/102 |
| 2004/0122841 | A1* | 6/2004 | Goodman et al. ............ 707/102 |
| 2004/0170339 | A1 | 9/2004 | Maurer |
| 2004/0220842 | A1* | 11/2004 | Barney ............................. 705/7 |
| 2005/0010515 | A1* | 1/2005 | Woltjen ......................... 705/36 |
| 2005/0028076 | A1* | 2/2005 | Harrington et al. ........... 715/500 |
| 2005/0097093 | A1* | 5/2005 | Clarkson ......................... 707/3 |
| 2005/0114168 | A1 | 5/2005 | Goldman |
| 2005/0210008 | A1* | 9/2005 | Tran et al. ......................... 707/3 |
| 2005/0222869 | A1 | 10/2005 | Bealke |
| 2005/0234685 | A1* | 10/2005 | Tanigawa ......................... 703/2 |
| 2005/0261927 | A1 | 11/2005 | Bilak |
| 2006/0020583 | A1* | 1/2006 | Baranov et al. .................. 707/3 |
| 2007/0208719 | A1 | 9/2007 | Tran |
| 2008/0091620 | A1* | 4/2008 | Vollenweider et al. ..... 705/36 R |

OTHER PUBLICATIONS

Griliches, Z. "Patent Statistics as Economic Indicators: A Survey", Journal of Economic Literature, vol. 28, No. 4 Dec. 1990, pp. 1661-1707.*

Hou et al., "A multiple regression model for patent appraisal", Industrial Management & Data Systems, vol. 106, No. 9, 2006, pp. 1304-1332.*

Lanjouw, J.O., A. Pakes and J. Putnam "How to Count Patents and Value Intellectual Property: The Uses of Patent Renewal and Application Data", NBER Working Paper 5741, Sep. 1996.*

Lanjouw, J. and Schankerman, M., "Patent Quality and Research Productivity: Measuring innovation with multiple indicators," The Economic Journal, vol. 114, Apr. 2004, pp. 441-465.*

Neifeld, A Macro-Economic Model Providing Patent Valuation and Patent Based Company Financial Indicators, http://www.neifeld.com/advart7.html.

Neifeld, Patent Valuation from a Practical View Point, and Some Interesting Patent Value Statistics from the PatentValuePredictor Model, http://www.neifeld.com/valuearticle 040311.htm.

Barney, A Study of Patent Mortality Rates: Using Statistical Survival Analysis to Rate and Value Patent Assets, AIPLA Quarterly Journal, Summer 2002, pp. 317-352, vol. 30, No. 3.

http://www.patentratings.com/ PatentRatings,LLC.

Van Den Berg, Models of Intellectual Capital Valuation: A Comparative Evaluation, http://business.queensu.ca/kbe/consortium/Models%20of%20IC%20Valuation.pdf, Queen's University School of Business, Canada.

Analytical Method for Evaluation of IPRs, http://www.sisshyd.net/siss/docs/analytical%20method.pdf, Shyamprasad Institute for Social Services, Hyderabad, India.

Patent Related Evaluative Indexes, Jul. 1999, http://www.jpo.go.jp/saikine/body.htm, Japanese Patent Office.

Patent Evaluation Index (edition of technology transfer), Mar. 2000, http://www.jpo.go.jp/saikane/tt1302-072.htm Japanese Patent Office.

http://evaluation/patentcafe.com/sample_medical.pdf PatentCafe.com, Inc.

http://www.ipscore.com/ Danish Patent Office.

http://www.pl-x.com PLX Systems, Inc.

http://www.iptec.com.tw/product/epv.asp IPTEC, Inc.

http://www.industrialnewsroom.com/fullstory/22228.

Color and Color Management Systems, May 27, 2004 http://developer.apple.com/documentation/GraphicsImaging/Conceptual/csintro/ Apple Computer, Inc.

Glassner, Principles of Digital Image Synthesis, 1995, Morgan-Kaufman, San Francisco, USA.

Education for the Colour Industry, http://www.colourware.co.uk/start.htm.

Schaller, http://www.cs.rit.edu/-ncs, Computer Science Department at Rochester Institute of Technology.

Graphic RGB Calculator, http://colorpro.com/info.toolsrgbcalc.htm#TOP.

Where is purple? Or, how to plot colours properly on a computer screen, http://casa.colorado.edu/~ajsh/colour/rainbow.html.

Advanced Patent Analysis, http://www.micropat.com/static/advanced.htm.

Trippe, Patinformatics: a review of the tools. Part 4. http://www.imakenews.com/scip2/e_article000186166.cfm Sep. 23, 2003.

Woods et al., "Comparison of two quantitative methods of determining rate bias". Oct. 2003, Journal of Engineering Education.

Jacobson, Norman "A Method for Normalizing Students' Scores When Employing Multiple Graders" Dec. 2001.

Woods et al. "Comparison of two quantitative methods of determining rater bias" Journal of Engineering Education, Oct. 2003.

* cited by examiner

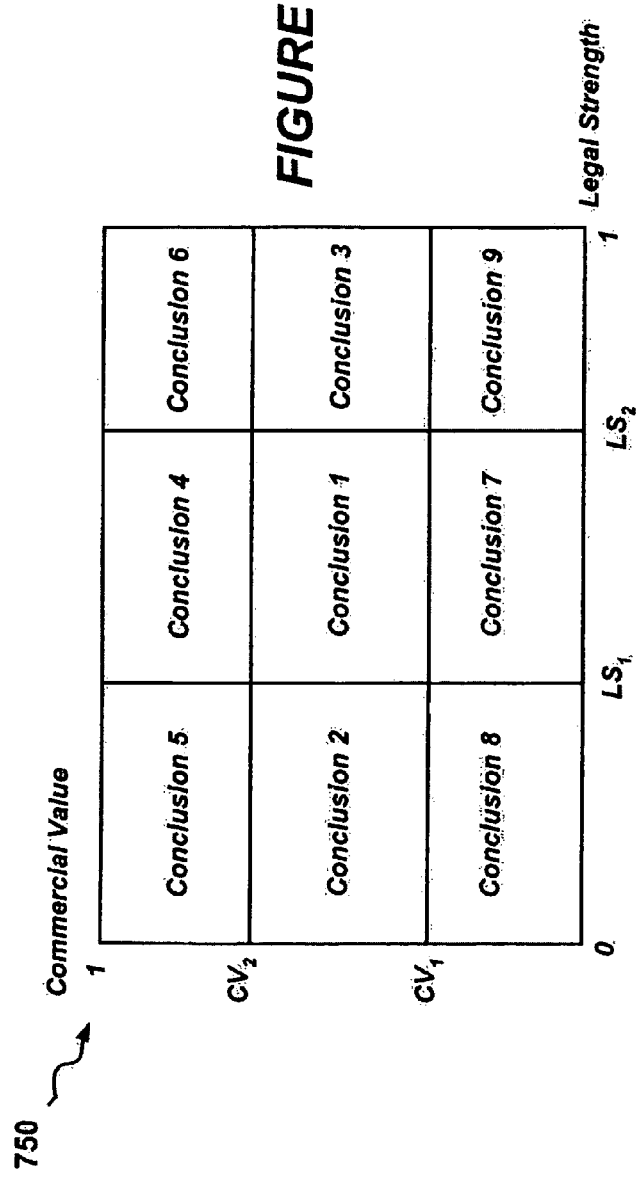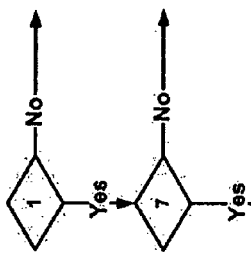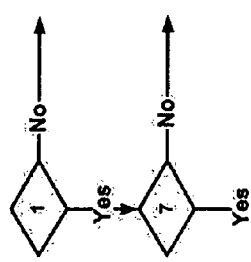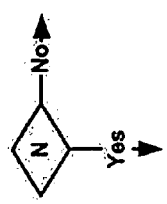
FIGURE 17A
FIG. 17E
FIG. 17D
FIG. 17C
FIG. 17B

Patent No. 4876725 Evaluation

Method and apparatus for fingerprint verification

| Date Filed: | Oct. 8, 1987 | Date Issued: | Oct. 24, 1989 | Assignee: | Mytec Technologies, Inc. Toronto, Canada |
|---|---|---|---|---|---|
| Inventor's Name: | George J. Tomko | | | | |

| Problem addressed: | Personal Identification Number, signature or even photograph of a person are not sufficiently reliable for positive user identification |
|---|---|
| Prospective Solution: | Use of the person's fingerprint as a verification parameter |
| Invention: | The invention describes a novel method of fingerprint verification and its hardware implementation, which consists of two devices: - an optical device for the fingerprint image recording and an opto-mechanical device for the live and recorded fingerprints comparison |
| Inventive idea: | Specific design of the verification system is based on a previously unknown combination of otherwise well known elements. The key improvements are: - usage of incoherent light instead of coherent one when actually performing the fingerprints comparison to reduce the system expense and complexity - usage of frequency multiplexed holograms instead of a regular ones for scale sensitivity reduction. - usage of two fingerprints instead of the width and relative length of two adjacent fingers as the supplementary verification parameters, positive error - usage of one to decrease the false to help to reduce the false negative error. |

Comments: Systems similar to the above have been widely discussed in the scientific literature since the invention of optical processors. The current invention looks like an attempt to combine some of their presumably best parts into a system with significant potential for commercialization. Unfortunately, it remains to be demonstrated that the advantages of the new approach outweigh its shortcomings to the extent allowing this potential to be utilized.

Conclusion

The invention is a moderate R&D step forward towards the solution of the automatic user identification problem. However, it still seems to be far away from being considered as a prototype for a commercially viable device.

Current Rating is 37 out of 100 with components

Technical Merit: 26    Commercial Value: 55    Legal Strength: 39

[BackToPatents] [Home]

FIG. 25D

Conclusion

The invention is a moderate R&D step forward towards the solution of the automatic user identification problem. However, it still seems to be far away from being considered as a prototype for a commercially viable device.

[Save] [Back] [Ready]

SYSTEM AND METHODS FOR PATENT EVALUATION

RELATED APPLICATIONS

This patent application is related to the U.S. patent applications to Williams, Allan Ser. No. 10/915,679 entitled "SYSTEM AND METHOD FOR PATENT EVALUATION USING ARTIFICIAL INTELLIGENCE" and Ser. No. 10/915,635 "SYSTEM AND METHOD FOR PATENT EVALUATION AND VISUALIZATION OF THE RESULTS THEREOF" filed concurrently herewith and incorporated herein by reference.

FIELD OF THE INVENTION

The invention relates to evaluation of patent documents, and in particular, to a system and methods for patent quality and monetary value evaluation.

BACKGROUND OF THE INVENTION

Patents play an important role in the industrial progress, providing information about innovations to the society and stimulating developments of further improvements. Increasing number of patent applications is being filed in Patent Offices around the world each year, exceeding 300,000 applications in the United States Patent and Trademark Office (USPTO) in year 2001 alone. New areas for patenting innovations become available, including software inventions, business methods related inventions and certain types of life forms. Triggered by enormous growth of the patent system, the exploitation of patents and other activities involving patents are also growing tremendously. Each year larger numbers of patents are being licensed and cross-licensed, involved in infringement and/or validity studies, used in advanced research and development programs, reached the stage of manufacturing, taken into account in mergers, acquisitions and venture capital financing. In all of the above-mentioned activities, there is an urgent need for accurate and consistent evaluation of the patents involved.

Usually, patent evaluations are based solely on opinions of experts in certain technology areas, being sometimes enhanced by second opinions provided by lawyers, accountants or other professionals. No wonder that the evaluation of the same patent may vary significantly depending on qualifications of the experts and their own evaluation criteria. In addition, experts' opinions may be biased, and since different experts may have different levels of bias, the consistency of patent evaluation may suffer to the point of rendering the evaluation project nearly useless. Clearly, such an approach is not practical for evaluating patent documents, especially when large quantities of patents are involved.

A few methods of patents evaluation have been proposed recently as will be discussed below. All of them are based on the idea of collecting suitable information about a patent under evaluation and transforming it into a monetary value of the patent. This idea is too broad to be directly applied to the patent evaluation without providing further details, which is not an easy task to do. One of the problems is that amount of information that can be collected about an average patent is large. It is not unusual to come across a patent of 200 pages long with dozens of claims. It is not immediately clear how many parameters are required to properly characterize a patent, and what those parameters are. However, the choice of parameters has a profound effect on the validity and quality of the patent evaluation. The improper choice of patent parameters may render the method of evaluation useless at best and disastrous at worst, especially if substantial amount of money is involved. Another problem is that there is no shortage of variants to transform the chosen parameters into a monetary value of a patent. Different combinations typically yield different monetary values of the patent, and it is not immediately clear which combination represents a true value or close to it. However, there is no doubt that an improper, let alone arbitrary, combination of the chosen parameters may result in disastrous consequences as far as money are concerned.

Unfortunately, most of the proposed methods of patent evaluation fail at the very beginning of the evaluation process when deciding on a set of parameters to characterize a patent. Certainly, it is not easy to choose a correct choice of evaluation parameters, however, throwing into the mix everything that we can get, apparently with little or no consideration given to the parameter's relevancy, is not likely to produce a trustworthy evaluation.

Consider, for example, a patent application WO 00/75851 to Neifeld, filed May 4, 2000 entitled "System and Method for Valuing Patents" and two papers to the same author entitled "A Macro-Economic Model Providing Patent Valuation and Patent Based Company Financial Indicators" and "Patent Valuation from practical View Point, and Some Interesting Patent Value Statistics from the PatentValuePredictor Model", which is are cited in the Information Disclosure statement submitted by the applicant. The main idea of these references is that a gross domestic product (GDP) is generated solely due to patents, and therefore the price of a patent can be calculated as a certain fraction of GDP. Unfortunately, while trying to apply a macro-economic model to patent evaluation and to make the evaluation completely automated without the involvement of experts, the author goes as far as offers to characterize a patent under evaluation by a number of characters in specification, a number of characters in the shortest independent claim, a number of words, lines and paragraphs, a two dimensional area each claim occupies on paper, a two dimensional area each claim occupies on electronic monitor, a number of characters in formulae and equations etc. The presumption is, as we hesitatingly understand it, that a formula containing more characters is more valuable for a patent than the formula containing fewer characters, which makes a choice of such parameters and the overall evaluation questionable.

Another example is the patent evaluation method developed by Patent Ratings, LLC, which is described in the U.S. Pat. No. 6,556,992 to Barney, issued Apr. 29, 2003, in a paper "A Study of Patent Mortality Rates: Using Statistical Survival Analysis to Rate and Value Patent Assets" to J. A. Barney published in AIPLA Quarterly Journal, Summer 2002, vol. 30, no 3, p. 317, which are cited in the IDS submitted by the applicant. It discloses a computerized statistically based method of patent evaluation, in which a relative rating of a patent is generated by comparing characteristics of the patent with statistical distribution of the same characteristic within a given patent population, e.g. by comparing patent mortality rates, i.e. looking at patent metrics determined as statistically correlated to the payment of patent maintenance fees. The specific patent metrics mentioned in this method may include a number of words per claim, a number of different words per claim, word density (e.g., different-words/total-words), length of patent specification, frequency or infrequency of certain word usage. Each word and/or word phrase in a patent claim (and/or patent specification) could be assigned a point value according to its frequency of use. The total point score for a claim is taken as an indication of the relative breadth or narrowness of the claim. As in the case of the previously discussed method, there is no need to understand the meaning of the words in the claims, or in the patent specification for the patent evaluation purposes, which raises certain questions of validity of such evaluation.

The method of patent evaluation disclosed in the U.S. Pat. No. 6,665,656 to Carter issued Dec. 16, 2003 proposes to compare a target patent document with search results based on the search criteria obtained from the target document, including the step of evaluation of the target patent document according to an empirical formula, which includes a number of patent parameters. A set of more than 16 parameters is selected from the citation distribution, present date, market royalty base for the invention, patent committee corporate rank of value of patent et al, though users are encouraged to add more parameters of their choice. The set is an eclectic mixture of patent parameters, which are very different in nature and therefore should be treated differently, while in the proposed method all parameters are treated and processed substantially similarly. It looks like the author, being concerned with complete automation of patent evaluation, offers to collect whatever computer readable information is available about the patent under consideration and to process this information automatically, sometimes disregarding incompatibility between the collected data.

The U.S. Pat. No. 5,999,907 to Donner issued Dec. 7, 1999 proposes a method of patent evaluation, which is similar to the approach used in real estate, where the patent under evaluation is compared with previously sold patents having similar formal characteristics selected so that to be processed by a computer.

Another attempt to provide patent evaluations has been proposed by the Queen's University School of Business, Canada, which is described in the paper to Herman A. van den Berg entitled "Models of Intellectual Capital Valuation: A Comparative Evaluation" and cited in the IDS submitted by the applicant. The author provides a review of various accounting methods for evaluating intangible assets, with concentration on the patent citations index, wherein it is assumed that patents that are cited more often presumably have higher value.

One more method for evaluating intellectual property assets has been developed at the Shyamprasad Institute for Social Services, Hyderabad, India, which is described in the paper entitled "Analytical Method for Evaluation of IPRs" and cited in the submitted by the applicant. In this method the value of the intellectual property rights (IPR) is determined as a function of the value contributed by the inventor, and the value of the prior art, which in turn depends on the value of traditional knowledge and resources, and contribution of prior researchers. Though it makes it difficult to assign meaningful values to such broadly introduced characteristics, the author further suggests to classify inventions into three categories, namely "minor inventions" which add only a small incremental value to the existing body of knowledge, "normal inventions" which add moderate amount of value to the existing body of knowledge, and "path breaking inventions" which transform the society and add value in exponential fashion. As a result, the value of the invention under consideration is determined as a function of the traditional knowledge and resources (so called indivisible body of knowledge), where empirical coefficients are suggested to be used, the coefficients being different for minor, normal and path breaking inventions.

Yet another attempt to develop a meaningful scheme for evaluating and rating of patents has been made by Japanese Patent Office (JPO), see, e.g. a JPO draft "Patent Related Evaluative Indexes", July 1999, and "Patent Evaluation Index (edition of technology transfer), March 2000 cited in the IDS submitted by the applicant. The suggested evaluation scheme is based on a point score system. The patent is rated in accordance with several categories of questions, where each question in the category is given a certain number of points that are added to a total score for the category. This system is similar to a well known point score testing system widely used in education, where a student's knowledge is evaluated. Unfortunately, the point score system for patent evaluation suggested by the JPO, though at first glance being similar to the educational point score system, is not a suitable choice for evaluating patent documents due to the substantially different nature of patents and student's knowledge. For example, a point score system for testing a student's knowledge may work satisfactory, where the fact that the student does not know certain areas decreases his/her final mark only slightly. In contrast, lack of certain qualities in a patent may change its value substantially, which is not adequately reflected in the point score system. As a result, the point score system, when applied to patents, may give inaccurate and confusing results, contradicting with the common sense, with independent evaluation of patents provided by experts, and/or certain patenting criteria established at various Patent Offices.

Moreover, such contradictory results would not allow to distinguish between those patents, which still have real value, although it may be moderate or low, and those to which some residual value is assigned only due to imperfections of the evaluation system being used. As a result, the point score system cannot provide consistent data for patent evaluation, especially for evaluation of patent portfolios having large quantities of patents.

Modifications of the point score system have been used in other methods of patent evaluation. One of them has been proposed by PatentCafe.com, Inc. in the "PatentCafe® Invention and Product Evaluation System", which is cited in the IDS submitted by the applicant, wherein the overall score over a number of parameters is calculated. Another point score method is used in the IPScore® software evaluation tool developed by the Danish Patent Office, and yet another point score method has been proposed in the U.S. Pat. No. 6,452,613 to Lefebvre issued Sep. 17, 2002 and applied to evaluating patent submissions, both references cited in the IDS submitted by the applicant.

A traditional accounting approach for evaluating monetary value of patents by applying Cost, Income and Market methods has been used by PLX Systems, Inc., cited in the IDS submitted by the applicant.

Yet another patent evaluation method using citation index, technology cycle time and science linkage has been used by IPTEC, Inc., an intellectual property services provider in Taiwan.

Another shortcoming in the area of patent evaluation is a lack of automated and consistent analysis and interpretation of the evaluation results. Normally, the evaluation of a patent document and interpretation of the evaluation results is carried out by experts. However, it has at least four serious deficiencies that make the practical value of such interpretation questionable: the interpretation is often subjective, heavily based on expert's knowledge and experience which may differ from patent to patent and from expert to expert; it defeats the goals of keeping the level of consistency in the patent evaluation process as high as possible; it slows down the evaluation process; and it makes the evaluation process more expensive. Another shortcoming of the currently known manual patent evaluation process is lack of meaningful and informative visual presentation of the results of patent evaluation, especially when large portfolios of patent documents have to be analyzed.

Accordingly, there is a need in the industry for the development of a method and system for systematic evaluation of patent documents, which would be more reliable, provide more consistent and meaningful results, and consequently, would be suitable for the analysis of large patent portfolios.

SUMMARY OF THE INVENTION

Therefore it is an object of the invention to provide a method and system for evaluation of patent documents, which would avoid the above-mentioned problems, while providing more consistent results and being suitable for the analysis of large patent portfolios.

It is another object of the invention to provide a method and system, which would ensure an automated and consistent interpretation of the results of patent evaluation, and a friendly visualization of the results of evaluation, which would be easy to comprehend.

According to one aspect of the invention there is provided a method for evaluating a patent document, comprising the steps of:
  (a) introducing a set of one or more patent indices, characterizing different aspects (features) of the patent document; and
  (b) combining said patent indices into a Patent Quality index (the PQ), characterizing value of the patent document, according to a non-linear function, which is monotonous, continuous and bounded on the interval of variation of the patent indices.

Conveniently, the step (a) comprises assigning numerical values to the patent indices, and the step (b) comprises combining the assigned values into to the PQ automatically.

Beneficially, the step (a) comprises introducing a hierarchy of patent indices, wherein each of the patent indices is further characterized by its respective patent sub-indices, and wherein the step (b) comprising combining said patent sub-indices into the respective patent indices, the combining of the sub-indices being performed according to one of the following:
  (i) according to a linear function; and
  (ii) according to a non-linear function, which is monotonous continuous and bounded on the interval of variation of the patent sub-indices.

Conveniently, the step (a) comprises introducing a hierarchy of patent indices having M layers, the 1st layer corresponding to the PQ, wherein each of the patent indices of a layer in the hierarchy except for the M-th layer (indices of a higher layer), is further characterized by its respective patent sub-indices (indices of a lower layer). The step (b) comprises combining said patent indices of the lower layer (k+1) into the respective patent indices of the higher layer (k), wherein k= 2, . . . M, according to one of the following:
  (i) according to a linear function; and
  (ii) according to a non-linear function, which is monotonous continuous and bounded on the interval of variation of the patent sub-indices.

Advantageously, the step (a) comprises assigning numerical values to the patent indices of the lowest M-th layer only, and the step (b) comprises combining the assigned numerical values into the respective indices of higher layers and into the PQ automatically.

The assigning of the numerical values to the patent indices is performed by experts by comparing each of the patent indices with the respective index of an Etalon Patent (EP), the EP being a patent devoted to the same problem as the patent document, although possibly providing a different solution, and characterized with the same set of patent indices, all of the patent indices of the EP being equal to their maximal values.

Beneficially, the step (b) comprises combining the patent indices into the PQ according to the non-linear function, which satisfies the following rule:
  (i) for any patent index, higher values of the Patent Quality correspond to higher values of said patent index.

The step (b) may comprise combining the patent indices into the PQ according to the non-linear function, which further satisfies the following rule:
  (ii) when values for all patent indices tend to the substantially same value of "p", then the Patent Quality would tend substantially to the value calculated as if the Patent Quality depended solely upon a index whose value is equal to "p".

Beneficially, the step (b) comprises combining the patent indices into the PQ according to the non-linear function, which satisfies the following rule:
  (iii) when a value of any patent index tends substantially to its minimal value, then Patent Quality value also tends substantially to its minimal value; and
  wherein the indices introduced in the step (a) have been chosen such that to satisfy the rule (iii).

If the selected non-linear function is monotonous and decreasing, then the above noted rule has to be changed accordingly. Then the step (b) will comprise combining the patent indices into the PQ according to the non-linear function, which satisfies the following rule:
  (iii) when a value of any patent index tends substantially to its minimal value, then Patent Quality value tends substantially to its maximal value; and
  wherein the indices introduced in the step (a) have been chosen such that to satisfy the rule (iii).

According to another aspect of the invention there is provided a method for evaluating a patent document, comprising the steps of:
  (a) introducing a set of one or more patent indices, characterizing different aspects (features) of the patent document; and
  (b) combining said patent indices into a Patent Quality index (a PQ), characterizing value of the patent document, according to a function, which is monotonous, continuous and bounded on the interval of variation of the patent indices, the function is linear if the patent document if characterized by one index only, and non-linear if the patent document is characterized by two or more patent indices.

Advantageously, the step (a) comprises introducing a hierarchy of patent indices, wherein each of the patent indices is further characterized by its respective patent sub-indices, and the step (b) comprising combining said patent sub-indices into the respective patent indices, the combining of the sub-indices being performed according to one of the following:
  (i) according to a linear function; and
  (ii) according to a non-linear function, which is monotonous continuous and bounded on the interval of variation of the patent sub-indices.

Conveniently, the function is a monotonous increasing function, i.e. the step (b) comprises combining the patent indices into the PQ according to the non-linear function that satisfies the following rule:
  (i) for any patent index, higher values of the Patent Quality correspond to higher values of said patent index.

Beneficially, the step (b) comprises combining the patent indices into the PQ according to the non-linear function, which satisfies the following rule:
(iii) when a value of any patent index tends substantially to its minimal value, then Patent Quality value also tends substantially to its minimal value; and
wherein the indices introduced in the step (a) have been chosen such that to satisfy the rule (iii).

The step (b) comprises combining the patent indices into the PQ according to the non-linear function, which satisfies yet another rule:
(ii) when values for all patent indices tend to the substantially same value of "p", then the Patent Quality would tend substantially to the value calculated as if the Patent Quality depended solely upon an index whose value is equal to "p".

If the non-linear function is a decreasing function, the step (b) comprises combining the patent indices into the PQ according to the non-linear function, which satisfies the following rule:
(iii) when a value of any patent index tends substantially to its minimal value, then Patent Quality value tends substantially to its maximal value; and
wherein the indices introduced in the step (a) have been chosen such that to satisfy the rule (iii).

Conveniently, the step (a) further comprises introducing coefficients $K_1, K_2, \ldots, K_n$, wherein the coefficient $K_i$, i=1,... n indicates the relative strength of the contribution of the i-th patent index into the PQ, e.g. wherein the step (b) comprises combining the patent indices $x_1, x_2, \ldots, x_n$ into the PQ according to the following expression $$\frac{1}{PQ} = K_1 \cdot \frac{1}{x_1} + K_2 \cdot \frac{1}{x_2} + \ldots + K_n \cdot \frac{1}{x_n},$$

wherein $K_i$, i=1, ... n is a coefficient indicating the relative strength of the contribution of the i-th patent index into the PQ, and $K_1+K_2+\ldots+K_n=1$.

To select the proper non-linear function, which would adequately describe the evaluation process, e.g. performed by a specific expert, the step (b) may comprise selecting said non-linear function from a family of non-linear functions determined by a parameter of non-linearity, wherein each function in the family corresponds to the unique value of the parameter of non-linearity. One possible form of such function described in the embodiments of the invention is shown below:

$$PQ = \frac{1}{1 - b + b \cdot \left(\frac{K_1}{x_1} + \frac{K_2}{x_2} + \ldots + \frac{K_n}{x_n}\right)},$$

wherein $x_1, x_2, \ldots, x_n$ are patent indices, b is a parameter of non-linearity, and $K_i$, i=1, ... n is a coefficient indicating the relative strength of the contribution of the i-th patent index into the PQ. $K_1+K_2+\ldots+K_n=1$.

The method described above further comprises determining a monetary value of the patent document as a product of the PQ and a monetary value of an Etalon Patent (EP) under current market conditions, the EP being a patent devoted to the same problem as the patent document, although possibly providing a different solution, and characterized with the same set of patent indices, all of the patent indices of the EP being equal to their maximal values.

To improve and automate the interpretation of the results of patent evaluation, the method may further comprise the step of analyzing values of the patent indices by an Artificial Intelligence (AI) system, including generating a conclusion regarding the value of the patent document based on the performed analysis, and optionally generating a reason associated with the generated conclusion. Conveniently, the generated conclusion and/or the generated conclusion along with the reason are displayed to a user. In the embodiment of the invention, the AI system is a decision tree based AI system.

Various choice can be made with regard to patent indices, preferably choosing the patent indices so that to satisfy the rules (postulates) described in detail in the specification. One possible choice of patent indices includes introducing one or more patent indices from the following set of patent indices, characterizing Technical Merit, Commercial Value, Legal Strength, Inventive Merit, and Utility. The patent indices may be further characterized by their own sub-indices, e.g. the patent index of Technical Merit may be characterized by the following sub-indices: Degree of technical importance to business; Difficulty of manufacturing; Degree of technical solution of a problem; Difficulty of designing around; and Number of existing alternative solutions.

The patent index of Inventive Merit may be characterized by the following sub-indices: Invention scale; Degree of the solution of the problem; Uniqueness of the invention; Degree of Novelty; Originality of the solution; and Technical effectiveness of the proposed solution.

The patent index of Commercial Value may be characterized by the following sub-indices: Life cycle stage of the patent document; Size of the market to serve; Required investment; and Scalability for Volume Production.

The patent index of Legal Strength may be characterized by the following sub-indices: Scope of claims; Infringement detectability; Chances of infringing third party patents; Chances of invalidity of the patent document; and Easiness to design around the proposed solution.

Additionally, the described method may further comprise the step of visualizing the value of the patent document by using a color coding of the patent document based on the value of the PQ index. For example, the step of visualizing may comprise providing a correspondence between the value of the PQ index of the patent document and the wavelength of a selected color of a visible part of the light spectrum, e.g. wherein the step of providing correspondence comprises providing correspondence between the value of the PQ index $PQ_0$ and the wavelength of the selected color $\lambda_0$ as follows:

$$\lambda_0 = \lambda_{min} + \frac{\lambda_{max} - \lambda_{min}}{PQ_{max} - PQ_{min}} \cdot (PQ_0 - PQ_{min}),$$

wherein $[PQ_{min}, PQ_{max}]$ is a range of variation of the PQ index, and $[\lambda_{min}, \lambda_{max}]$ is a wavelength range of the visible part of the light spectrum.

If the patent document is characterized by one, two or three patent indices, then the step of visualization may comprise visualizing the value of the patent document (the PQ index) as a color point in a system of coordinates with the number of axes being equal to the number of patent indices, the coordinates of the color point being equal to the values of the patent indices, and the color of the color point being in accordance with the value of the PQ index of the patent document.

A respective computer database stored in a computer memory, comprising patent evaluations of patent documents, each patent valuation being performed in accordance with the methods described above is also provided.

According to another aspect of the invention there is provided a system for evaluating a patent document, comprising:
- a data input means for receiving an input data with regard to one or more patent indices, characterizing different aspects (features) of the patent document; and
- a Patent Quality processing unit for processing the input data into an output data as a non-linear function of said patent indices, which is monotonous continuous and bounded on the interval of variation of patent indices, the output data comprising a Patent Quality (PQ) index characterizing the value of the patent document.

The system further comprises a graphical user interface for displaying one of the output data, and the input and output data to a user, wherein the graphical user interface comprises a computer readable program code stored in a computer memory, which when executed, provides a graphical means for entering and displaying the input data, and a graphical means for displaying the output data. Conveniently, the graphical means comprises a slider, having a linear scale, a sliding object movable along the linear scale, and a counter associated with the linear scale and showing the current position of the sliding object on the linear scale. Beneficially, the means for processing comprises a means for processing the input data into the output data as the non-linear function of the patent indices, which satisfies the following rule:
  (i) for any patent index, higher values of the Patent Quality correspond to higher values of said patent index.

Conveniently, the means for processing further comprises a means for processing the input data into the output data as the non-linear function of the patent indices, which satisfies the following rule:
  (ii) when values for all patent indices tend to the substantially same value of "p", then the Patent Quality would tend substantially to the value calculated as if the Patent Quality depended solely upon a single index whose value is equal to "p".

Alternatively, if the non-linear function is a decreasing function, the means for processing comprises a means for processing the input data into the output data as the non-linear function of the patent indices, which satisfies the following rule:
  (iii) when a value of any patent index tends substantially to its minimal value, then Patent Quality value also tends substantially to its maximal value; and
  wherein the patent indices have been chosen so that to satisfy the rule (iii).

The PQ processing unit further comprises a means for determining a monetary value of the patent document as a product of the PQ and a monetary value of an Etalon Patent (EP) under current market conditions, the EP being a patent devoted to the same problem as the patent document, although possibly providing a different solution, and characterized with the same set of patent indices, all of the patent indices of the EP being equal to their maximal values.

Beneficially, the system further comprising means for storing the input and processed data in a database or for sending said data over a network, the system being implemented to be accessible via a corporate Intranet or the Internet.

Additionally, the system may comprise an Artificial Intelligence (AI) Unit, comprising an AI system for analyzing the input data and generating a conclusion regarding the value of the patent document based on the performed analysis, e.g. a decision tree base AI.

A computer readable memory having recorded thereon statements and instructions for execution by a computer to carry out the processing of a number of patent indices, characterizing different aspects of the patent document, into a Patent Quality index (the PQ), as described in the above method, is also provided. Advantageously, said statements and instructions comprise statements and instructions for processing the patent indices into the PQ according to the increasing non-linear function, which satisfies the following rule:
  if any of the patent indices tends substantially to its minimal value, then the PQ also tends substantially to its minimal value; and wherein the patent indices are chosen so that to satisfy said rule.

A computer program product, comprising a memory having computer readable code embodied therein, for execution by a CPU, to carry out the processing of a number of patent indices, characterizing different aspects of the patent document into a Patent Quality index (the PQ), which characterizes value of the patent document, as described in the above method, is also provided, wherein beneficially the processing of the patent indices into the PQ is performed according to the non-linear function, which is continuous, monotonous, increasing, bounded function on the interval of variation of the patent indices, and satisfies the following rule:
  if any of the patent indices tends substantially to its minimal value, then the PQ also tends substantially to its minimal value; and
  wherein the patent indices have been chosen so that to satisfy said rule.

A computer data signal, representing sequences of statements and instructions, which when executed by a processor cause the processor to determine a Patent Quality index of a patent document, which characterizes value of the patent document, as described in the above method, may be embodied in a carrier wave.

According to yet another aspect of the invention there is provided a system for evaluating a patent document, comprising:
- a computer;
- a web site for receiving an input data with regard to a number of patent indices, characterizing different aspects (features) of the patent document; and
- a program executing on said computer for determining a Patent Quality index (the PQ), which characterizes value of the patent document, as a non-linear function of patent indices, which is continuous monotonous and bounded on the interval of variation of the patent indices.

Conveniently, the system further comprises a program executing on said computer for analyzing the input data by an Artificial Intelligence system, including generating a conclusion regarding the value of the patent document based on the performed analysis.

The computer program further provides a graphical user interface, having a computer readable program code stored in a computer memory, which when executed, provides graphical means for entering and displaying the input data, and graphical means for displaying the output data, e.g. the graphical means may have a form of a slider, having a linear scale, a sliding object movable along the linear scale, and a counter associated with the linear scale and showing the current position of the sliding object on the linear scale.

In the system described above, the program executing on said computer further determines a monetary value of the patent document as a product of the PQ and a monetary value of an Etalon Patent (EP) under current market conditions, the EP being a patent devoted to the same problem as the patent document, although possibly providing a different solution, and characterized with the same set of patent indices, all of the patent indices of the EP being equal to their maximal values.

Beneficially, the program executing on said computer determines the Patent Quality index as an increasing function of its patent indices, which satisfies the following rule:

if value of any of the patent indices tends substantially to its minimal, then the PQ value also tends substantially to its minimal value; and wherein the patent indices have been chosen so that to satisfy said rule.

Conveniently, the system further comprises means for sending results of the program execution over a network, or for storing said results in a database.

According to one more aspect of the invention there is provided a web site for evaluating a patent document, comprising:

a link on the web site causing a computer program code associated with the web site and stored in a computer memory to be executed so as to provide a data input means for receiving an input data with regard to a number of patent indices, characterizing different aspects of the patent document, and to perform calculations of a Patent Quality index (the PQ), which characterizes value of the patent document, as a non-linear function of patent indices, which is continuous monotonous and bounded on the interval of variation of the patent indices. The computer program code is executed so as to further determine a monetary value of the patent document as a product of the PQ and a monetary value of a Etalon Patent (EP) under current market conditions, the EP being a patent devoted to the same problem as the patent document, although possibly providing a different solution, and characterized with the same set of patent indices, all of the patent indices of the EP being equal to their maximal values. The said computer program code further provides a graphical user interface, comprising means for entering and displaying the input data, and means for displaying an output data on a computer screen. For example, the means for entering and displaying may comprise a slider, having a linear scale, a sliding object movable along the linear scale, and a counter associated with the linear scale and showing the current position of the sliding object on the linear scale. Beneficially, the computer program performs calculations of the PQ according to the non-linear function, which is increasing and satisfies the following rule:

if value of any of the patent indices tends substantially to its minimal value, then the PQ value also tends substantially to its minimal value; and wherein the patent indices have been chosen so that to satisfy said rule.

Additionally, the calculations of the PQ may be performed according to the non-linear function, which further satisfies another rule:

when values for all patent indices tend to the substantially same value of "p", then the Patent Quality would tend substantially to the value calculated as if the Patent Quality depended solely upon a single index whose value is equal to "p".

On the web site described above, the computer program is further executed so as to perform the analysis of the input data by an AI system, including generation of a conclusion regarding the value of the patent document based on the performed analysis.

The invented method for patent quality evaluation is more reliable, semi-automated where it is appropriate, and provides more consistent results compared to the prior art attempts of evaluating patents. It makes the invented method also applicable to the evaluation of large portfolios of patent documents, thus providing a patent evaluation method of industrial strength.

The corresponding system for patent quality evaluation has the same advantages as the above-mentioned method, as well as the additional advantages of having a friendly graphical user interface, being conveniently accessible via a corporate Intranet or the Internet, and as a result increasing the productivity of experts.

The Artificial Intelligence system for interpreting results of patent evaluation, beneficially used in both method and system for patent evaluation, provides an automated interpretation of patent indices, thus making the whole evaluation process even more uniform and consistent, and results thereof much easier to comprehend.

The color coded visualization of the results of patent evaluation further enhances the invented system and method of patent evaluation and make them easier to use and comprehend.

BRIEF DESCRIPTION OF THE DRAWINGS

Embodiments of the invention will now be described, by way of example, with reference to the accompanying drawings in which:

FIGS. 17A to 17E illustrate a process of designing a Knowledge base (decision tree) of the AI Unit of FIG. 16;

FIGS. 25A to 25C show an upper section, a middle section and a lower section of a sample of patent evaluation respectively as presented to an administrator, the middle section including the Patent Quality Calculator of FIG. 12 and the GUI of FIG. 13;

FIG. 25D shows a modified Conclusion box of the lower section of FIG. 25C as presented to an expert;

DETAILED DESCRIPTION OF THE EMBODIMENTS OF THE INVENTION

Figure 1:
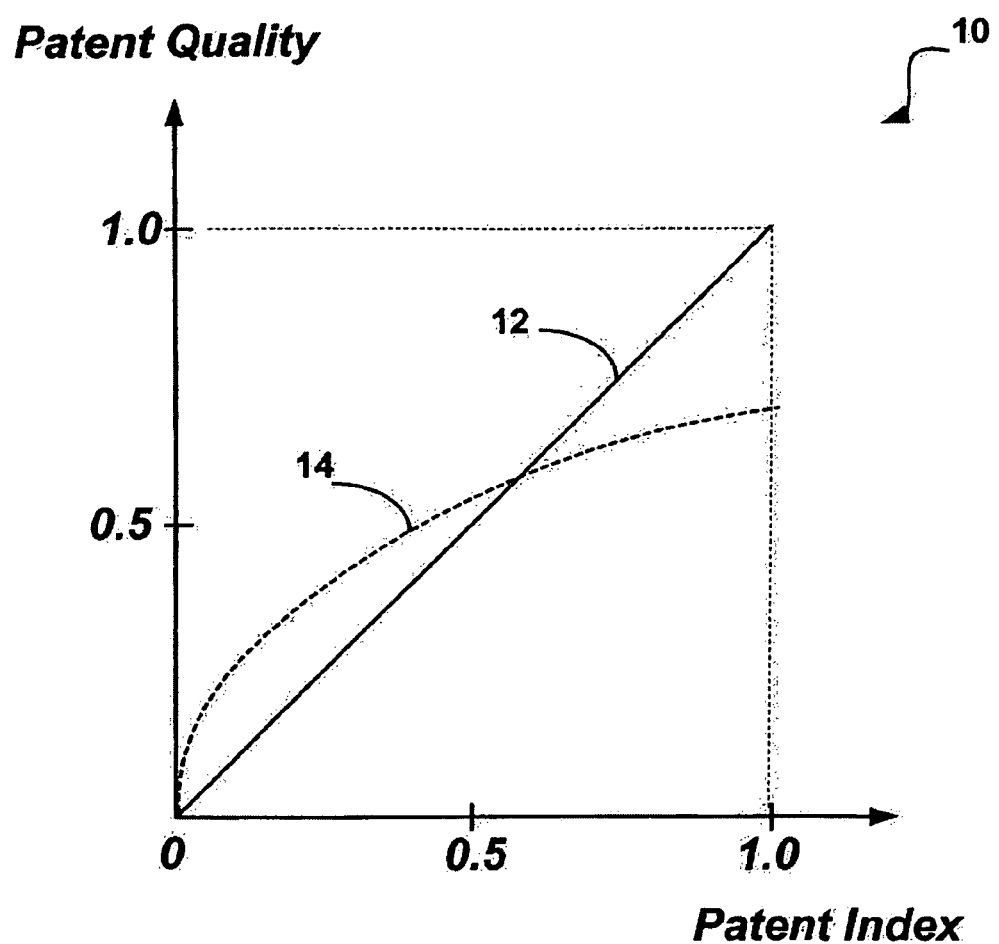
FIG. 1 illustrates a dependence of Patent Quality, determined in accordance with a method for patent evaluation of a first embodiment of the invention, as a function of one of its patent indices with and without presence of other patent indices, the value of said other patent indices being fixed.

The exploitation of patents includes, among other things, establishing their monetary value. Since selling, buying or licensing of patents is quite common activity in the field of patent exploitation, we assume that any patent can be assigned a certain Monetary Value (MV). Establishing the monetary value of a patent can be a daunting exercise, because of the numerous factors to be taken into consideration and a high degree of subjectivity involved. However, the general trend seems to be quite clear—a better patent is considered to have a higher monetary value.

To make the term "better patent" meaningful, we introduce an Etalon Patent (EP), which is an imaginary or existing patent closely associated with the original patent (the patent document under consideration), and a measurable quantity referred to as a Patent Quality (PQ), which is assigned to the original patent following the procedure of comparison of the original patent and its etalon counterpart. The Etalon Patent is the patent devoted to the same problem as the original patent, however the solution which it offers may be different, discloses a breakthrough solution that makes further exploration of other ways of solving the problem unnecessary, holds virtually unlimited potential for commercialization, and puts unbeatable legal barriers for competitors to copy or design around the solution disclosed in the EP. We assume that for any patent there exists the corresponding Etalon Patent. The Etalon Patent can be thought of as a patent perfect in all respects, and therefore its monetary value (MVEP) will depend only on other factors that may change over time, such as current market situation, for example.

The Etalon Patent plays the role of a measuring stick, similar to the role of the meter as the etalon of length. However, the procedure of comparing the original and etalon patents is substantially more complicated than its length-measuring counterpart, since patents have a far more complicated structure that should be taken into account when comparing them. The procedure is directed towards determining how close the original patent approaches the Etalon Patent. The result of the comparison is represented as the value of the Patent Quality to be referred to as Patent Quality for brevity. Using the concept of Patent Quality, a better patent can be defined as the patent with higher Patent Quality.

If the Patent Quality (PQ) for the original patent and the Monetary Value of the corresponding Etalon Patent (MVEP) have been established, then the Monetary Value (MV) of the original patent can be determined as a product of the Monetary Value of the Etalon Patent and the Patent Quality for the original patent:

$$MV = MVEP \cdot PQ \quad (1)$$

The procedure for determining the PQ is as follows.

First, the original patent and its etalon counterpart are characterized by a number of indices, each characterizing a different aspect (feature) of the patent, which are preferably stripped down to only selected indices that are essential for comparison. These indices are arranged into a hierarchical structure of the complexity depending on the required accuracy of the PQ determination, level of objectivity, ease of use etc. Each index contributes to the Patent Quality (or to another index in the higher layer of the index hierarchy), the individual contribution $PQ_c$ of the i-th index $x_i$ into the PQ depending on the value of the index. For comparison purposes, each index of the original patent is considered to determine how close it approaches the corresponding index of the Etalon Patent having its maximal value.

When deciding which indices are essential, it is taken into account that any patent document (a patent or a patent application) should demonstrate legal patentability criteria of Novelty, Utility and Inventive Step (Non-Obviousness) established at Patent Offices around the world in order to issue into a patent. When conducting evaluation of a patent document for sale, licensing or other purposes, a number of other indices, of possibly a broader scope, are taken into account. These indices are selected in a variety of ways to reflect the value of the patent document for a potential transaction, for example as Technical Merit, Commercial Value and Legal Strength of the patent document under consideration. A detailed discussion of possible choices of patent indices is provided in the section entitled "Choice of Patent Indices" below.

Thus, the model for Patent Quality evaluation according to the embodiments of the invention includes "n" patent indices, whose values are normally provided by experts.

The Postulates (The Rules)

We assume that the relationship between the Patent Quality and its patent indices, whatever concrete form it takes, may be expressed by a non-linear function, which is monotonous, continuous and bounded on the interval of variation of patent indices.

Conveniently, the non-linear function is governed by the following first set of rules:

1. For numerical values of patent indices in a certain range [A, B], e.g. [0, 1], the Patent Quality range will be in a range [C, D], e.g. in the same range [0, 1].

2. For any patent index, higher values of Patent Quality correspond to higher numerical values of that patent index.

3. When a numerical value for any patent index tends substantially to its minimal value, e.g. zero, then Patent Quality would also tend substantially to its minimal value, e.g. zero.

Beneficially, the relationship between the PQ and its patent indices is also governed by a second set of rules, which is added to the above noted first set of rules, namely:

4. When numerical values for all patent indices tend to the substantially same value of "p", then the Patent Quality would tend substantially to the value calculated as if the Patent Quality depended solely upon a single index with its numerical evaluation equal to "p".

5. When numerical values for all patent indices tend to their maximal value, e.g. equal to 1, then the Patent Quality would also tend to its maximal value, e.g. also equal to 1.

The above five rules have been developed in the course of research on the patent evaluation process and based on, though not limited to, common sense and best practices of qualified experts. Either the first set of rules, or the first and second sets of rules combined together are considered as a system of postulates upon which a practically viable system for evaluation is being based.

Let us briefly discuss the rationale behind each rule.

Rule No. 1. The range of [0, 1] for both the numerical values of patent indices and the Patent Quality comes naturally from the way we compare original and etalon patents. Any index characterizing the original patent can be, at best, only as good as the corresponding index of the etalon patent. The latter, by design, plays the role of a basic unit of measurement, which is customary to represent numerically by unity (e.g. like 1 meter, or 1 second). It is natural, therefore, to establish the upper limit for the numerical value of any index of the original patent at the level of unity. In other situations, the numerical value of the index can be represented only by a fraction of the upper limit value. In the worst-case scenario, the smallest possible fraction is practically undistinguishable from zero. The same considerations apply to the Patent Quality. Thus, conveniently the range of [0, 1] has been chosen for both numerical evaluation of patent indices and the Patent Quality, although it is understood that that other ranges for both the PQ and patent indices may be chosen if necessary.

Rule No. 2 is self-explanatory, being based on common sense that, for any patent index, higher values of Patent Quality correspond to higher numerical evaluations of that index, all other things being equal.

Rule No. 3. To understand the origins of the Rule No. 3, let us consider a patent, which is perfect in all respects except for its commercial potential, i.e. the Commercial Value index for this patent is close to its minimal value. The low commercial potential of the patent undoubtedly drives the value of the patent down. In the extreme case of a complete lack of any possibility of commercial gain, this patent index alone abolishes the value of the patent as a whole regardless of the value of other patent indices, and consequently drives the Patent Quality close to zero (i.e. its minimal value). Similar considerations may be applied to other situations when patents have, for example, an inadequate legal protection, or lack of technical merits, novelty, utility etc.

Rule No. 4 is a generalization of a property of a simple one-index patent on a patent characterized by multiple indices. Consider, for example, a patent that is characterized solely by its Commercial Value index. In this simple case, the statement of the Rule No. 4 evidently holds true. Let us assume, for clarity, that both Commercial Value and Patent Quality are equal to 0.5, which makes it a patent of an average quality. Suppose we add a second index to the same patent, e.g. a Legal Strength index, which is also equal to 0.5. The common sense suggests that the new addition does not make the patent any more distinguished than previously thought, which means that the Patent Quality value should remain around 0.5. This is precisely what Rule No. 4 requires, namely that the addition of new patent indices of the same value does not change (or substantially change) the perceived value of the Patent Quality. However, the addition of a new index of a different value will change the perceived value of the Patent Quality. For example, if LS value is around 0.1, this will undoubtedly drive the PQ value down.

Rule No. 5 covers a very special case of a patent, which is perfect in all respects without any exception. Such patent gets the highest Patent Quality value, which is equal to unity (PQ=1) for the selected range [0, 1] of the PQ variation according to the Rule No. 1.

First Embodiment of the Invention

To design a method for patent evaluation based on these rules, let us first consider a simplified situation, when the i-th patent index is solely contributing to the Patent Quality as if there were no other patent indices whatsoever.

In the first embodiment of the invention, we assume that the contribution of the i-th index into the Patent Quality $PQ_i$ depends linearly upon this index numerical value as shown below:

$$PQ_i = x_i; \; i = 1 \ldots n; \qquad (2)$$

However, contrary to the popular belief, when several patent indices contribute to the Patent Quality simultaneously, this dependence changes drastically and becomes non-linear. The roots of this non-linearity become apparent if we re-write the equation (2) using the inverted values $$\frac{1}{PQ_i} = \frac{1}{x_i}; \; i = 1 \ldots n; \qquad (3)$$

When several indices contribute to the Patent Quality simultaneously, then the inverted value of the Patent Quality becomes equal to the linear combination of the inverted values of respective patent indices, each contributing into the Patent Quality:

$$\frac{1}{PQ} = K_1 \cdot \frac{1}{x_1} + K_2 \cdot \frac{1}{x_2} + \ldots + K_n \cdot \frac{1}{x_n}; \quad (4)$$

$$K_1 + K_2 + \ldots + K_n = 1;$$

where $K_i$ is the normalized coefficient indicating relative strength of the contribution of the i-th index into the Patent Quality, thus taking into account the relative importance of the patent feature corresponding to the i-th index, which contributes to the PQ.

Thus, the required dependence of the Patent Quality on its patent indices can be written in the form (5) shown below, which follows from the above noted expression (4):

$$PQ = \frac{1}{\frac{K_1}{x_1} + \frac{K_2}{x_2} + \ldots + \frac{K_n}{x_n}} \quad (5)$$

Let us analyze the expression (5) more closely for two special cases.

(a) Suppose that the second index solely contributes to the Patent Quality. This means that $K_1=K_3=\ldots=K_n=0$ and $K_2=1$. This transforms the expression (5) into the form of $$PQ = \frac{1}{\frac{1}{x_2}} \quad (6a)$$

The latter can be simplified into $$PQ = x_2 \quad (6b)$$

This linear dependence (6b) is shown by a solid line 12 on a two-dimensional graph 10 of FIG. 1 illustrating the dependence of the Patent Quality as a function of one of its patent indices (in this case as a function of $x_2$), when only the index upon which the dependence have been drawn is solely contributing to the PQ.

(b) Suppose now that in addition to the above noted second index $x_2$, the first index $x_i$ also contributes to the Patent Quality. In this case, $K_3=\ldots=K_n=0$ and $K_1+K_2=1$. This transforms the expression (5) into the following form $$PQ = \frac{1}{\frac{K_1}{x_1} + \frac{K_2}{x_2}}; \quad (7)$$

Let us fix the value of $x_1$ and analyze the dependence (7) of PQ versus $x_2$ again. It is clearly seen that the dependence of PQ versus $x_2$ now becomes non-linear in the presence of $x_1$. This is illustrated by a dotted line 14 in FIG. 1, which shows the dependence of the Patent Quality as a function of $x_2$, with $x_i$ being present, but fixed to $x_1=0.5$. In FIG. 1, the normalized coefficients $K_1$ and $K_2$ indicating relative strength of the contribution of the first and second indices $x_i$ and $x_2$ into the Patent Quality have been chosen equal, i.e. $K_1=K_2=0.5$.

Similar considerations will yield similar results for any other choice of indices, namely, if the Patent Quality depends on any single index only, then this dependence is a linear function, although if two or more indices contribute to the Patent Quality, then this dependence becomes nonlinear.

Figure 2:
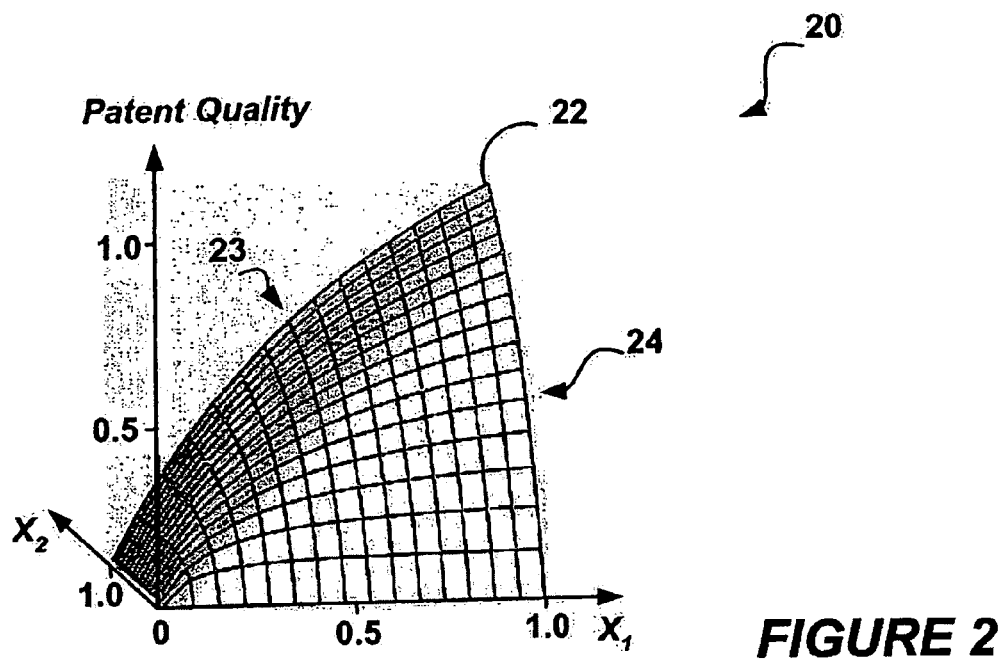
FIG. 2 illustrates a dependence of Patent Quality, determined in accordance with the method for patent evaluation of the first embodiment of the invention, as a function of two patent indices (a Patent Evaluation Space), where both indices provide an equal contribution to the value of the Patent Quality.

A three-dimensional graph 20 illustrating Patent Quality as a function of two Patent indices $x_1$ and $x_2$ according to the expression (7) shown above for $K_1=K_2=0.5$ is illustrated in FIG. 2. It has a shape of a convex mountain-like surface with symmetrical slopes 23 and 24, which is wider at the base, and converges at the top into a single point 22 corresponding to $x_1=x_2=1$ and PQ=1. It means that the higher is the value of the Patent Quality, the smaller is the pool of suitable values of respective patent indices, which provide such a value of the PQ.

If one index contributes to the Patent Quality more than the other one, i.e. $K_1 \neq K_2$, the surface 20 depicted on FIG. 2 loses its symmetry, but otherwise remains similar. This situation is illustrated by a three-dimensional graph 30 of FIG. 3, which is designed in accordance with the expression (7) for $K_1=0.9$ and $K_2=0.1$. It is seen that the graph 30 also has a curved mountain-like surface, which is wider at the bottom, though the slopes 32 and 33 of the surface become asymmetrical, with the steeper slope 33 corresponding to the first patent index having larger normalized coefficient $K_1$ and providing higher contribution to the Patent Quality. Both slopes 32 and 33 still converge at the top into a single point 22 corresponding to $x_1=x_2=1$ and PQ=1.

Figure 3:
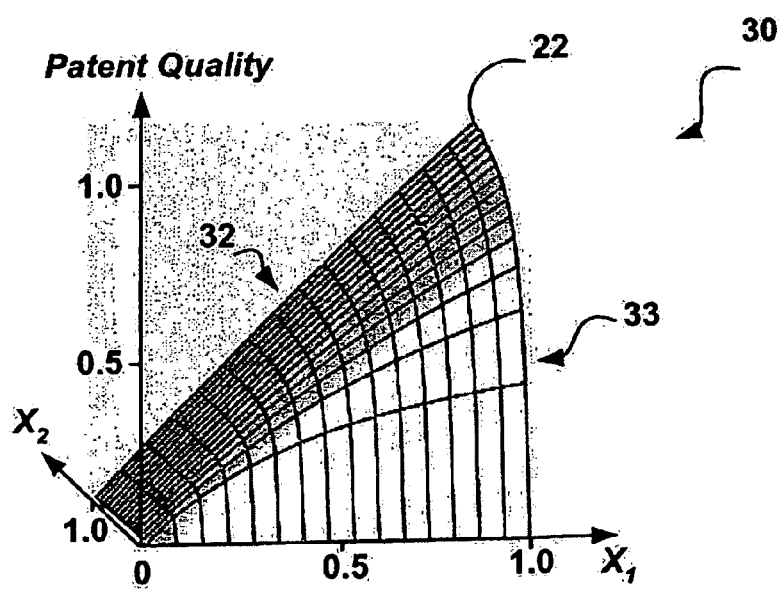
FIG. 3 illustrates the Patent Evaluation Space for the Patent Quality depending on two patent indices, determined in accordance with the method for patent evaluation of the first embodiment of the invention, where contribution of said two indices to the value of the Patent Quality is different.

Each point on the depicted curved surfaces 20 and 30 shown in FIGS. 2 and 3 respectively represents a patent document characterized by two patent indices. The opposite statement also holds true, i.e. for any patent document that is characterized by two patent indices, there is the corresponding point on the respective surface. In this sense, the surface 20 of FIG. 2 (or the surface 30 of FIG. 3) is considered as the Patent Evaluation Space (PES). Accordingly, properties of the patent evaluation method are reflected in the geometrical shape of the PES, and studying the PES provides understanding and effective use of the corresponding patent evaluation method.

Let us determine the PES for the case when Patent Quality depends on three patent indices, e.g. Technical Merit, Commercial Value and Legal Strength as briefly mentioned above. When three patent indices are taken into account, the expression (5) takes the form of $$PQ = \frac{1}{\frac{K_1}{x_1} + \frac{K_2}{x_2} + \frac{K_3}{x_3}} \quad (8)$$

Unfortunately, it is impossible to view the PES in its entirety because it spreads out into a fourth dimension. However, it is possible to get some information about the PES by studying its three-dimensional cross-sections corresponding to different values of PQ.

Figure 4:
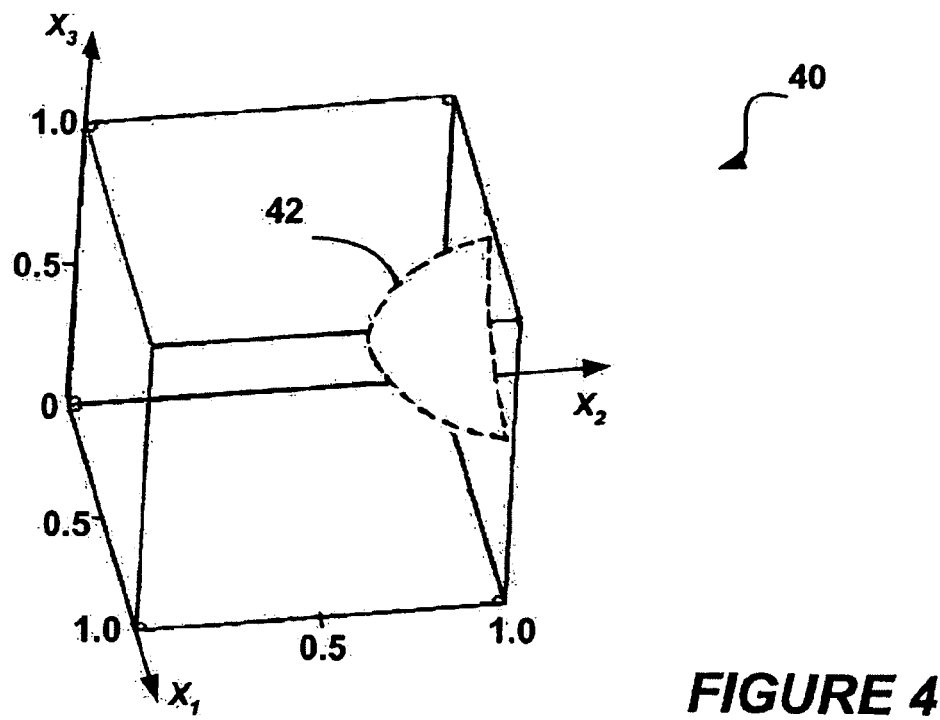
FIG. 4 illustrates a three-dimensional cross-section of the four-dimensional Patent Evaluation Space, determined for the Patent Quality depending on three patent indices in accordance with the method of the first embodiment of the invention, the cross-section corresponding to the value of Patent Quality equal to 0.8.

FIG. 4 shows a three-dimensional graph 40 illustrating a cross-section 42 of the PES designed in accordance with the expression (8) for $K_1=K_2=K_3=\frac{1}{3}$ and corresponding to PQ=0.8. The cross-section 42 is located in the upper right corner (1,1,1) of the Patent Quality cube with side lengths of patent indices equal to one, and it has a curved convex surface.

Figure 5:
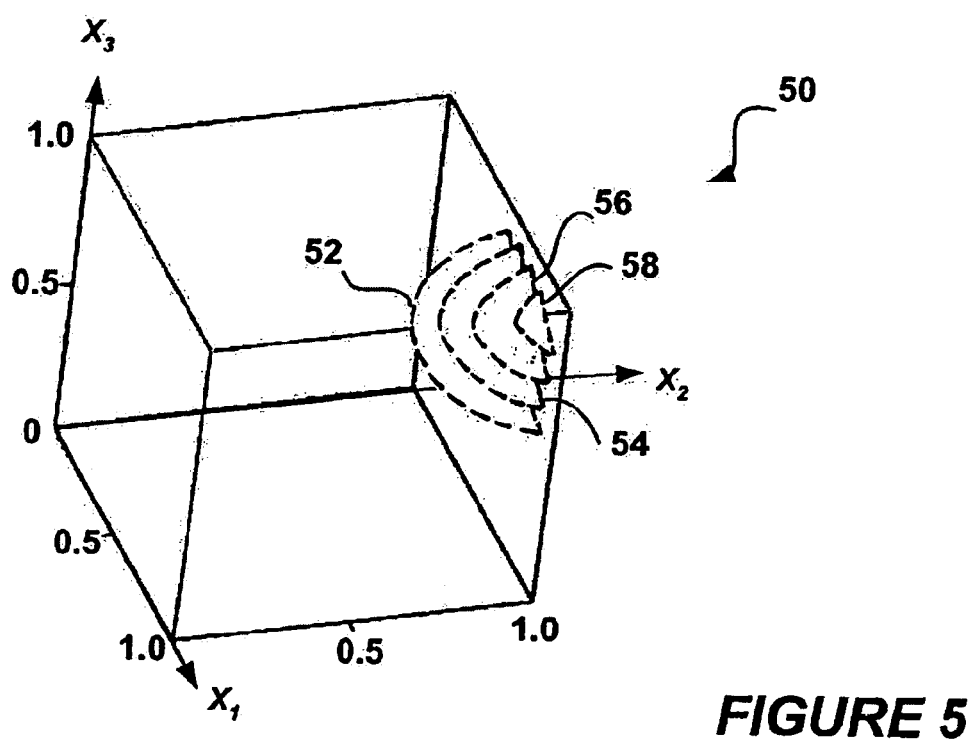
FIG. 5 illustrates a series of three-dimensional cross-sections of the four-dimensional Patent Evaluation Space, determined for the Patent Quality depending on three patent indices in accordance with the method of the first embodiment of the invention, the cross-sections corresponding to the values of the Patent Quality equal to 0.8, 0.85, 0.9 and 0.95 respectively counting from left to right.

A series of cross-sections 50 of the PES designed in accordance with the expression (8) for $K_1=K_2=K_3=\frac{1}{3}$ are shown in FIG. 5, the cross-sections correspond to Patent Quality values of 0.80, 0.85, 0.90, and 0.95 respectively and are correspondingly designated by reference numerals 52, 54, 56 and 58. The cross-sections form a set of three-dimensional shapes of a decreasingly smaller size, such that the higher is the value of Patent Quality, the further away to the right the shape moves, becoming accordingly smaller.

Using the notion of the Patent Quality defined above in the expression (5), the monetary value of a patent can be determined in accordance with the expression (1) as follows:

$$MV = MVEP \cdot \frac{1}{\frac{K_1}{x_1} + \frac{K_2}{x_2} + \ldots + \frac{K_n}{x_n}} \quad (9)$$

$$K_1 + K_2 + \ldots + K_n = 1;$$

Thus, the method for Patent Quality and Monetary Value evaluation according to the first embodiment of the invention, where the PQ is expressed as a non-linear function for any number of patent indices larger than one, has been provided.

Second Embodiment of the Invention

A method for patent quality evaluation according to the second embodiment is also based on a non-linear relationship between the PQ and patent indices, which conveniently satisfies the rules 1-5 set out above. In the second embodiment, contrary to the assumption (2) made in the first embodiment of the invention, we assume that the contribution of the i-th index depends non-linearly upon its numerical value, even though when there are no any other indices contributing to the PQ (i.e. even though the i-th index is solely contributing to the PQ). The degree of non-linearity is determined by a parameter of non-linearity "b". It is measured on the scale of [0, ∞], with b=1 indicating the complete absence of non-linearity.

Let us modify the inverted values of $PQ_i$ and $x_i$ so as to bring them into the range of [0, ∞], coinciding with the range of variations for the parameter of non-linearity "b", i.e. we will use $$\left(\frac{1}{PQ_i} - 1\right)$$

instead of $$\frac{1}{PQ_i},$$

and $$\left(\frac{1}{x_i} - 1\right)$$

instead of $$\frac{1}{x_i}.$$

We also assume that the modified inverted value of the Patent Quality is proportional to the modified inverted numerical evaluation of the i-th index:

$$\frac{1}{PQ_i} - 1 = b \cdot \left(\frac{1}{x_i} - 1\right); \, i = 1 \ldots n; \quad (10)$$

Here n indicates the total number of indices.

Let us re-write the expression (10) in the form that is more convenient for further generalization:

$$\frac{1}{PQ_i} = 1 - b + b \cdot \frac{1}{x_i}; \, i = 1 \ldots n; \quad (11)$$

When several indices contribute to the Patent Quality simultaneously, then the inverted value of the Patent Quality becomes the linear combination of the inverted values of individual contributions of patent indices to the Patent Quality:

$$\frac{1}{PQ_i} = 1 - b + b \cdot \left(K_1 \cdot \frac{1}{x_1} + K_2 \cdot \frac{1}{x_2} + \ldots + K_n \cdot \frac{1}{x_n}\right); \quad (12)$$

$$K_1 + K_2 + \ldots + K_n = 1;$$

where $K_i$ is the normalized coefficient indicating the relative strength of the i-th patent index contribution into Patent Quality. Thus, the dependence (12) can be written in the form of:

$$PQ = \frac{1}{1 - b + b \cdot \left(\frac{K_1}{x_1} + \frac{K_2}{x_2} + \ldots + \frac{K_n}{x_n}\right)} \quad (13)$$

Figure 6:
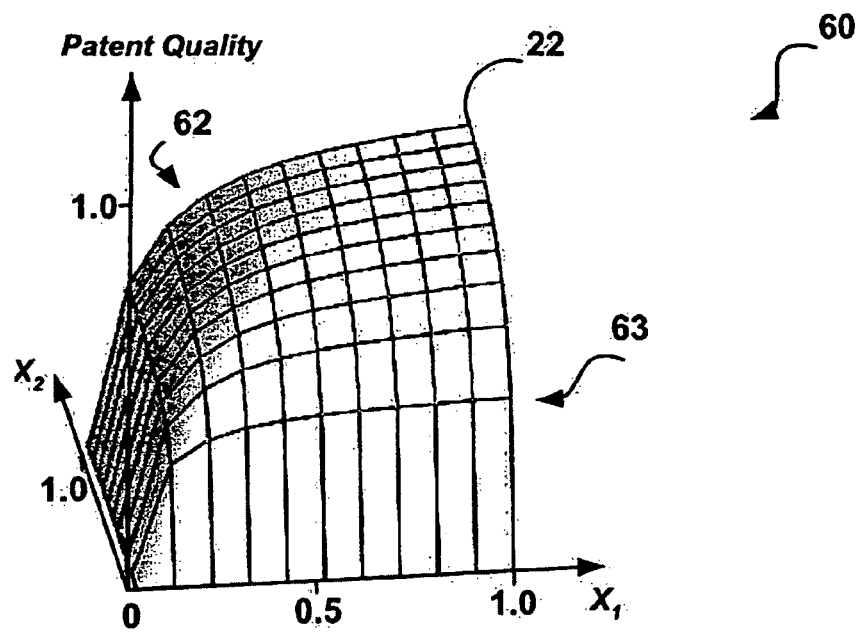
FIG. 6 illustrates the Patent Evaluation Space for the Patent Quality depending on two patent indices, determined in accordance with the method for patent evaluation of the second embodiment of the invention, where the parameter of non-linearity is equal to b=0.2, and both indices provide an equal contribution to the value of the Patent Quality.
Figure 7:
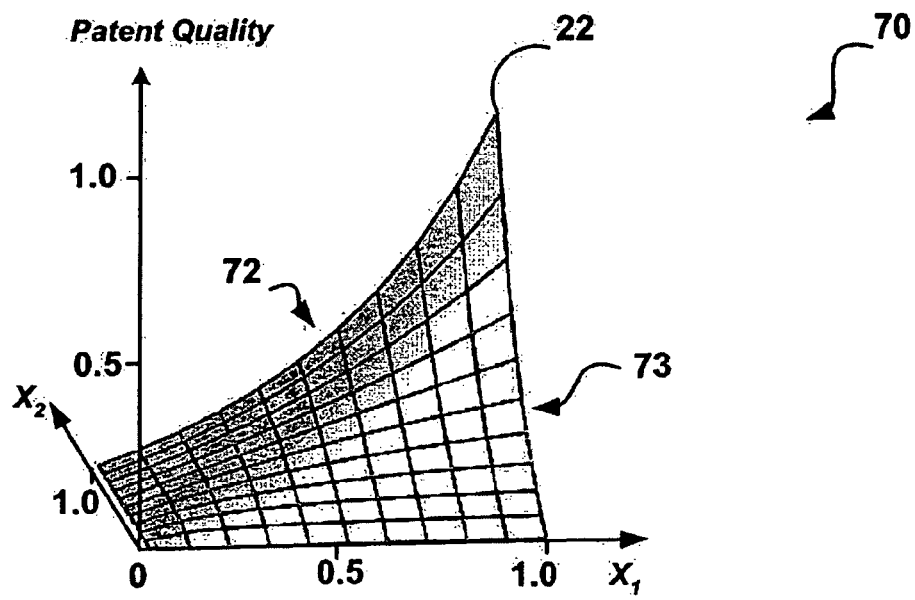
FIG. 7 illustrates the Patent Evaluation Space for the Patent Quality depending on two patent indices, determined in accordance with the method for patent evaluation of the second embodiment of the invention, where the parameter of non-linearity is equal to b=5, and both indices provide an equal contribution to the value of the Patent Quality.

FIGS. 6 and 7 show Patent Evaluation Spaces 60 and 70 designed in accordance with the expression (13) for b=0.2 and b=5 respectively. For clarity, it is assumed that in both cases only two indices $x_1$ and $x_2$ evenly contribute to the Patent Quality, i.e. n=2; $K_1$=$K_2$=0.5.

The surface of FIG. 6 is a curved convex surface, resembling a box shape with rounded edges, having symmetrical convex sides 62 and 63 that converge at the top into a single point 22 corresponding to $x_1$=$x_2$=1 and PQ=1.

In contrast, the surface of FIG. 7 is a curved concave surface, with concave slopes 72 and 73 still converging at the top into a single point 22 corresponding to $x_1$=$x_2$=1 and PQ=1.

In accordance with (1) and (13), the monetary value of a patent can be determined as follows:

$$MV = MVEP \cdot \frac{1}{1 - b + b \cdot \left(\frac{K_1}{x_1} + \frac{K_2}{x_2} + \ldots + \frac{K_n}{x_n}\right)} \quad (14)$$

Thus, the method of Patent Quality evaluation of the second embodiment of the invention, where the PQ is expressed as a non-linear function for any number of patent indices, has been provided.

Method for Determining a Bias of an Expert and a Bias Compensated Method for Patent Evaluation Expressions (13) and (14) have a useful application to the solution of the problem of inconsistency of patent evaluation provided by different experts. Normally, experts are expected to determine values of various Patent Indices objectively, which would result in objective determination of the Patent Quality (PQ) of a patent. However, in real life each expert inevitably brings certain bias into evaluation based on his/her skills, education, experience, views etc. This bias makes some experts systematically overestimate contribution of a certain index into the Patent Quality, while others tend to systematically underestimate it. As a result, evaluation of a patent may differ substantially from what would be expected in the absence of such bias. If the resulting Patent Quality is higher than expected, the evaluation is referred to as overly optimistic. If it is lower, the evaluation is overly pessimistic.

Figure 8A:
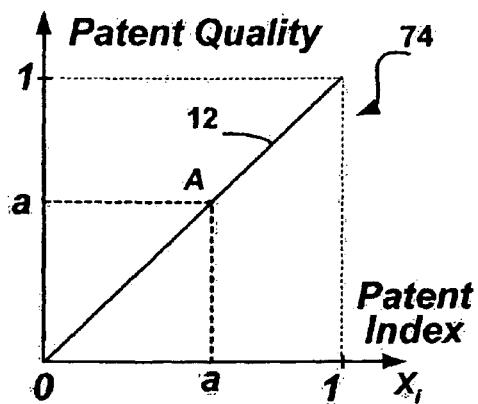
FIGS. 8A to 8E illustrate patent evaluations performed by experts having no bias, a positive bias, and a negative bias, and proposed solutions how to compensate said bias.
Figure 8B:
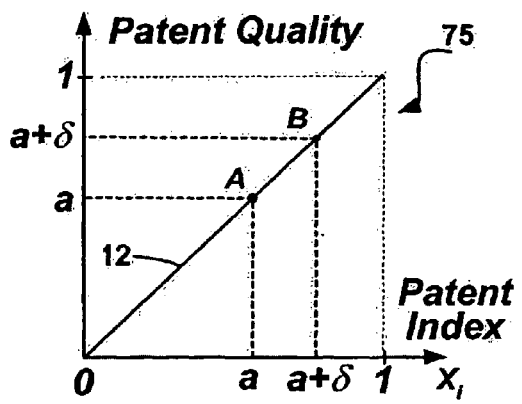
Figure 8C:
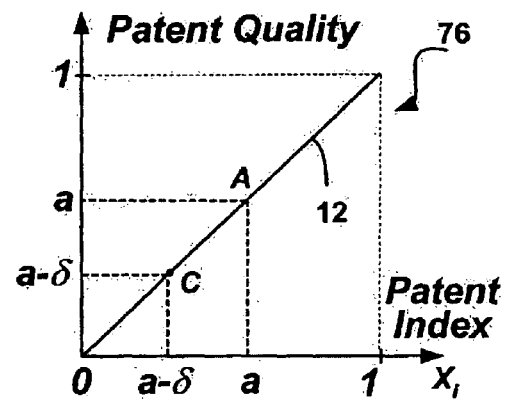

Diagrams 74, 75 and 76 shown in FIGS. 8A, 8B, and 8C illustrate this situation. For illustrative purposes, we assume that a single Patent Index characterizes the patent. In this simple case, the Patent Quality is proportional to the Patent Index as shown in FIG. 8A (line 12) in accordance with the expression (2) described above. Thus, if the value of the Patent Index is "a", the corresponding value of the Patent Quality is also "a". This correspondence is represented on line 12 by point "A". Ideally, an unbiased expert assigns the same value "a" to the Patent Index during the patent evaluation, which results in correct determination of the Patent Quality to be also equal to "a". If an expert overestimates the value of the Patent Index to be "a+δ", as shown in FIG. 8B, the corresponding Patent Quality value becomes "a+δ", which is higher than the expected value of "a". This correspondence is shown on line 12 by point "B". Similarly, an underestimation of the value of the Patent Index to be "a−δ", as shown in FIG. 8C, brings the corresponding Patent Quality value down to "a−δ", which is lower than the expected value of "a". This correspondence is shown on line 12 by point "C".

The situation gets even worse when multiple experts need to be involved as, e.g. in the case of evaluating a large patent portfolio. Since different experts have different levels of bias, the consistency of evaluation may suffer to the point of rendering the evaluation project nearly useless. The insufficient consistency may also prevent a team of experts to work in parallel on evaluation of the patent portfolio.

To reduce the harmful effect of the bias of an expert on the Patent Quality evaluation, we offer to distort the Patent Quality versus Patent Indices dependence in such a way as required to compensate for mistakes in assigning values to the Patent Indices. For this purpose, a suitable function from the family of non-linear functions (13) described earlier is chosen to combine Patent Indices into the Patent Quality. A diagram 77 of FIG. 8D illustrates how such compensation works for the above noted single patent index example shown in FIGS. 8A to 8C in the case of the overestimation of the Patent Index.

Let us choose a parameter of non-linearity "b" in the expression (13) so that b>1 and the new dependence of the Patent Quality upon the Patent Index is now represented by a curved line 12d following from the expression (13), the line 12d being disposed generally lower than the line 12.

Figure 8D:
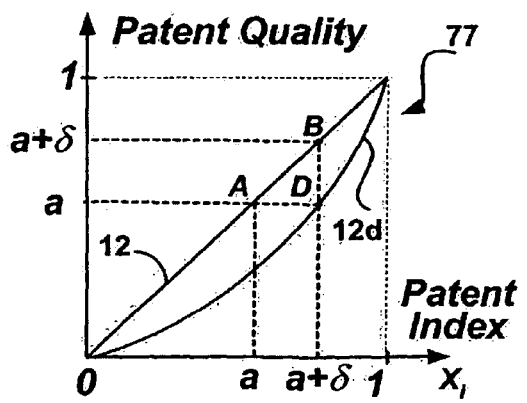

If an expert overestimates the value of the Patent Index to be "a+δ", which is illustrated by point "B" in FIGS. 8B and 8D, the new dependence represented by line 12d nevertheless brings the correct value of "a" of the corresponding Patent Quality as illustrated by point "D" belonging to the line 12d in FIG. 8D. Thus, the harmful effect of the expert's overestimation of the Patent Index on the determination of the Patent Quality has been corrected.

Figure 8E:
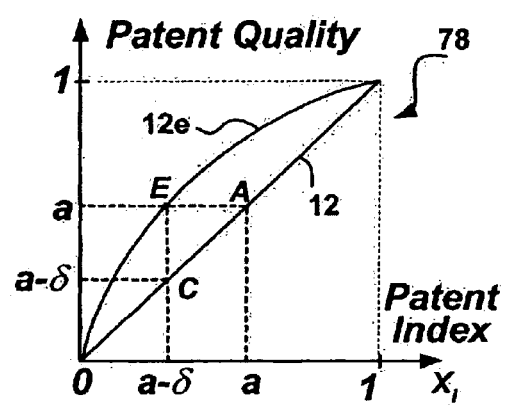

Similar considerations apply to the case of Patent Index underestimation, illustrated by a diagram 78 in FIG. 8E. The parameter of non-linearity "b" in the expression (13) is chosen this time so that b<1 and the new dependence of the Patent Quality upon the Patent Index is now represented by a curved line 12e following from the expression (13), the line 12d being disposed generally higher than the line 12.

If an expert underestimates the value of the Patent Index to be "a−δ", which is illustrated by point "C" in FIGS. 8C and 8E, the new dependence represented by line 12e nevertheless brings the correct value of "a" of the corresponding Patent Quality as illustrated by point "E" belonging to the line 12e in FIG. 8E. Thus, the harmful effect of the expert's underestimation of the Patent Index on the determination of the Patent Quality has been corrected.

To characterize the bias of an expert, we offer to introduce a measurable quantity, called a bias coefficient "B". Conveniently, the bias coefficient "B" is measured on a scale of [−1, 1], with B=0 indicating a complete absence of bias, B>0 indicating an overly optimistic patent evaluation by an expert, and B<0 indicating an overly pessimistic evaluation. The value of the bias coefficient "B" of an expert determines the value of the parameter of non-linearity "b" required for compensation of the experts' bias according to the technique described above.

In the third embodiment of the invention, we assume that parameter of non-linearity "b" depends upon the bias coefficient B of an expert in the following manner:

$$b = \frac{1+B}{1-B} \tag{15}$$

Correspondingly, the parameter of non-linearity "b" is expressed in terms of the bias coefficient "B" as follows:

$$B = \frac{b-1}{b+1} \tag{16}$$

Substituting (15) into (13), we will get the following expression for calculating Patent Quality using bias coefficient of an expert as a parameter, that compensates the bias introduced by the expert:

$$PQ = \frac{1-B}{-2 \cdot B + (1+B) \cdot \left(\frac{K_1}{x_1} + \frac{K_2}{x_2} + \ldots + \frac{K_n}{x_n}\right)} \tag{17}$$

The corresponding expression for determining the Monetary Value of the patent takes the form of $$MV = MVEP \cdot \frac{1-B}{-2 \cdot B + (1+B) \cdot \left(\frac{K_1}{x_1} + \frac{K_2}{x_2} + \ldots + \frac{K_n}{x_n}\right)} \tag{18}$$

The Patent Evaluation Spaces 60 and 70 of FIGS. 6 and 7 described above, while illustrating the shapes of PESs for various parameters of non-linearity "b", at the same time illustrate the PESs for different bias coefficients, when the relationships (15) and (16) between the parameter of non-linearity "b" and a bias coefficient B are taken into account.

For example, the PES 60 of FIG. 6 corresponds to the parameter of non-linearity b=0.2, or according to the expression (15), to the associated bias coefficient B=(0.2−1)/(0.2+1)=−⅔<0, which is negative and therefore represents an overly pessimistic patent evaluation by an expert. This is reflected in the rounded box-shaped surface of the PES 60, where most of the surface 60 corresponds to high values of Patent Quality that are around or close to unity, thus compensating for underestimation of the values of the PQ by the expert.

In contrast, the PES 70 of FIG. 7 corresponds to the parameter of non-linearity b=5, or according to the expression (15), corresponds to the associated bias coefficient B=(5−1)/(5+1)=⅔>0, which is positive and therefore represents an overly optimistic patent evaluation by an expert. Similarly, this is reflected in the gently sloping shape of the surface of the PES 70, where most of the surface 70 corresponds to low values of Patent Quality that are around or close to zero, thus compensating for overestimation of the values of the PQ by the expert.

Thus, a bias compensated method for Patent Quality and Monetary Value evaluation according to the third embodiment of the invention, where the PQ is expressed as a non-linear function of patent indices, which takes into account a bias of an expert influencing the evaluation of the patent document, has been provided.

Calibration of an Expert

To determine the value of the bias coefficient specific to a certain expert, i.e. to calibrate the expert's input, the expert is presented with a carefully engineered test patent, having a pre-determined test value of the Patent Quality $PQ_p$ assigned to the test patent by a trusted expert. Alternatively, the trusted expert may provide his/her input with regard to the $PQ_p$ according the selected function, e.g. such that $$PQ_p = \frac{1}{\frac{K_1}{x_{1p}} + \frac{K_2}{x_{2p}} + \ldots + \frac{K_n}{x_{np}}} \quad (19)$$

where $x_{1p}, \ldots, x_{np}$ are numerical values of the Patent Indices assigned by the trusted expert.

The expert, whose input is to be calibrated, is asked to evaluate the same test-patent by assigning the Patent Quality value $PQ_c$ to the test patent, or preferably, by assigning values to the respective patent indices, which are combined into the resulting Patent Quality $PQ_c$ according to the same selected function:

$$PQ_c = \frac{1}{\frac{K_1}{x_{1c}} + \frac{K_2}{x_{2c}} + \ldots + \frac{K_n}{x_{nc}}} \quad (19a)$$

where $x_{1c}, \ldots, x_{nc}$ are numerical values of the Patent Indices assigned by the expert to be calibrated.

The so assigned or calculated $PQ_c$ is then compared with the corresponding pre-determined test value of $PQ_p$, which is considered to be the correct value of the Patent Quality for the test patent. To ensure more reliable results, a number of trusted experts may evaluate the same test patent, and the $PQ_p$ may be taken as the average value across the Patent Quality values provided by the number of trusted experts. It is understood that if values of the $PQ_p$ and $PQ_c$ provided by the trusted expert and the expert to be calibrated are equal, then the expert must be considered to be unbiased. Any difference between the $PQ_p$ and $PQ_c$ is attributed to the expert's bias, the larger difference being considered as an indication of the stronger bias. The amount of difference is conveniently expressed in terms of the parameter of non-linearity "b". Let us re-write the formulae (19) and (19a) emphasizing modified inverted Patent Quality:

$$\frac{K_1}{x_{1p}} + \frac{K_2}{x_{2p}} + \ldots + \frac{K_n}{x_{np}} - 1 = \frac{1}{PQ_p} - 1 \quad (19b)$$

$$\frac{K_1}{x_{1c}} + \frac{K_2}{x_{2c}} + \ldots + \frac{K_n}{x_{nc}} - 1 = \frac{1}{PQ_c} - 1 \quad (19c)$$

Let us multiply both parts of (19c) by the parameter of non-linearity b:

$$b \cdot \left( \frac{K_1}{x_{1c}} + \frac{K_2}{x_{2c}} + \ldots + \frac{K_n}{x_{2c}} - 1 \right) = b \cdot \left( \frac{1}{PQ_c} - 1 \right) \quad (19d)$$

Let us also choose b to be such that $$b \cdot \left( \frac{K_1}{x_{1c}} + \frac{K_2}{x_{2c}} + \ldots + \frac{K_n}{x_{nc}} - 1 \right) = \frac{K_1}{x_{1p}} + \frac{K_2}{x_{2p}} + \ldots + \frac{K_n}{x_{np}} - 1 \quad (19e)$$

effectively compensating the difference in assigning values of Patent Indices $x_{1c} \ldots x_{nc}$ compared to $x_{1p} \ldots x_{np}$. Substituting (19d) and (19b) into (19e) we get the following equation for determining b:

$$\frac{1}{PQ_p} - 1 = b \cdot \left( \frac{1}{PQ_c} - 1 \right) \quad (19f)$$

Solving (19f) for b, the following expression can be obtained:

$$b = \frac{\frac{1}{PQ_p} - 1}{\frac{1}{PQ_c} - 1} \quad (20)$$

Taking into account (15), the expression (20) can be modified to determine the expert's bias coefficient B for the test patent given the Patent Quality $PQ_p$ assigned to the test patent by a trusted expert and the Patent Quality $PQ_c$ assigned to the test patent by the expert to be calibrated:

$$B = \frac{PQ_c - PQ_p}{PQ_p + PQ_c - 2 \cdot PQ_p \cdot PQ_c} \quad (21)$$

The described procedure of determining a bias coefficient B is repeated a number of times for a set of test patents, and the resulting set of calculated bias coefficients $B_1, B_2, \ldots, B_m$, where m is the total number of test patents in the set, is used for determining the average value <B> of the bias coefficient B of the expert across the set of test patents:

$$\langle B \rangle = \frac{B_1 + B_2 + \ldots + B_m}{m} \quad (22)$$

Accordingly, the average value <B> is considered to represent the bias coefficient specific to the expert. Using <B> instead of B in the expression (17), we get the bias corrected formula for calculating the Patent Quality specific to a given expert, wherein the correction is achieved by introducing certain distortions into the expression (17) associated with the <B> coefficient, which would compensate for the expert's bias.

Thus, a method for determining a bias of an expert has been provided.

Choice of Patent Indices

Various models for Patent Quality evaluation may include a various number of patent indices of a different scope.

Figure 9A:
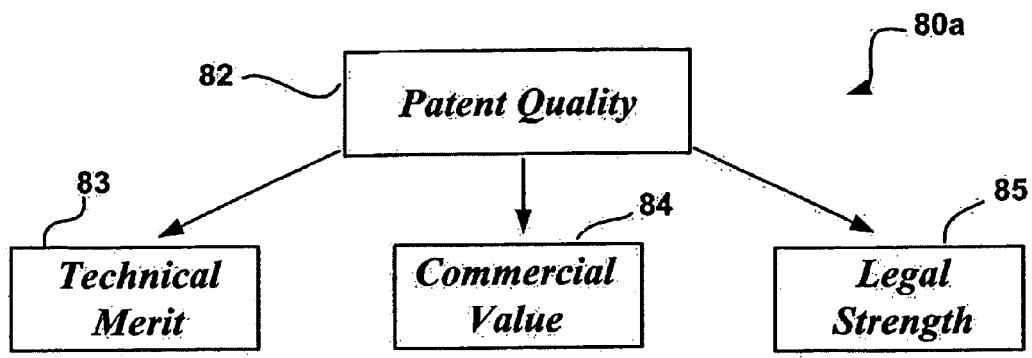
FIGS. 9A and 9B show two models for Patent Quality evaluation, illustrating different choices of patent indices.

For example, one model 80*a* for evaluating Patent Quality 82 shown in FIG. 9A includes three indices $x_1$, $x_2$ and $x_3$, which characterize Technical Merit, Commercial Value and Legal Strength of the patent document respectively. The above noted indices are designated by reference numerals 83, 84 and 85 in FIG. 9A accordingly.

Figure 9B:
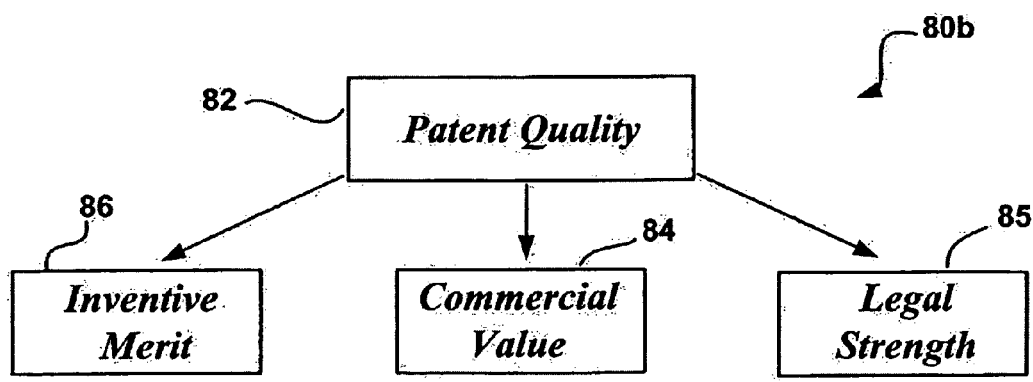

An alternative model 80*b* for Patent Quality (82) evaluation schematically shown in FIG. 9B includes another selection of patent indices $x_1$, $x_2$ and $x_3$, this time characterizing Inventive Merit (86), Commercial Value (84) and Legal Strength (85) of the patent document respectively.

It is contemplated that additional patent indices may be introduced in the above-noted models 80*a* to 80*c* for patent quality evaluation, or some indices may be taken away and/or replaced with other indices, the total number of indices not being limited, e.g. a new index of importance to a particular business may be introduced in addition to three indices described above, or alternatively, the patent document may be characterized by two patent indices only.

It is assumed that selected patent indices may or may not include, or partially include, the legal patentability criteria of Novelty, Utility and Inventive Step as parts thereof, assuming that the selected patent indices may be defined differently and of a broader scope. For example, Technical Merit may include some aspects of the Inventive Step and/or Utility, while Legal Strength may take into account whether Novelty and Utility have been actually demonstrated by the invention, and Utility may include some aspects of the Commercial value if this index has not been introduced separately.

In turn, all or some of the Patent Indices may be defined more thoroughly by introducing their own sub-indices contributing to the respective patent indices, thus creating another layer of the hierarchy of indices, all of them ultimately contributing to the integral value of the Patent Quality.

A model 100 for Patent Quality 82 evaluation illustrated in FIG. 109 is similar to that of FIG. 9A described above, except for each of said three indices of Technical Merit (83), Commercial Value (84) and Legal Strength (85) now being broken down into a number of sub-indices 120 to 146 as shown in detail below.

Namely, the Index $x_1$ of Technical Merit (83) includes the following sub-indices:

$x_{11}$, characterizing a Degree of technical importance to a particular business (120);

$x_{12}$, characterizing Technical difficulty of manufacturing, from very easy to very difficult (122);

$x_{13}$, characterizing a Degree of technical solution of a problem, from partial solution to full solution (124);

$x_{14}$, characterizing Difficulty of designing around, from very easy to almost impossible (126); and $x_{15}$, characterizing a number of existing alternative solutions to this problem (128).

The Index $x_2$ of Commercial Value (84) includes the following sub-indices:

$x_{21}$, characterizing the Life cycle stage of the patent document, from the patent application to the issued patent close to its expiry (130);

$x_{22}$, characterizing the Size of the market to serve (132); and $x_{23}$, characterizing the required investment (134) to commercialize the invention.

The Index $x_3$ of Legal Strength (85) includes the following sub-indices:

$x_{31}$, characterizing Scope of claims 140);

$x_{32}$, characterizing Detectability for infringement purposes (142);

$x_{33}$, characterizing Chances of invalidity of the patent document (144); and $x_{34}$, characterizing Chances of infringing 3rd party patents by the product described in the patent under consideration (146).

Figure 11:
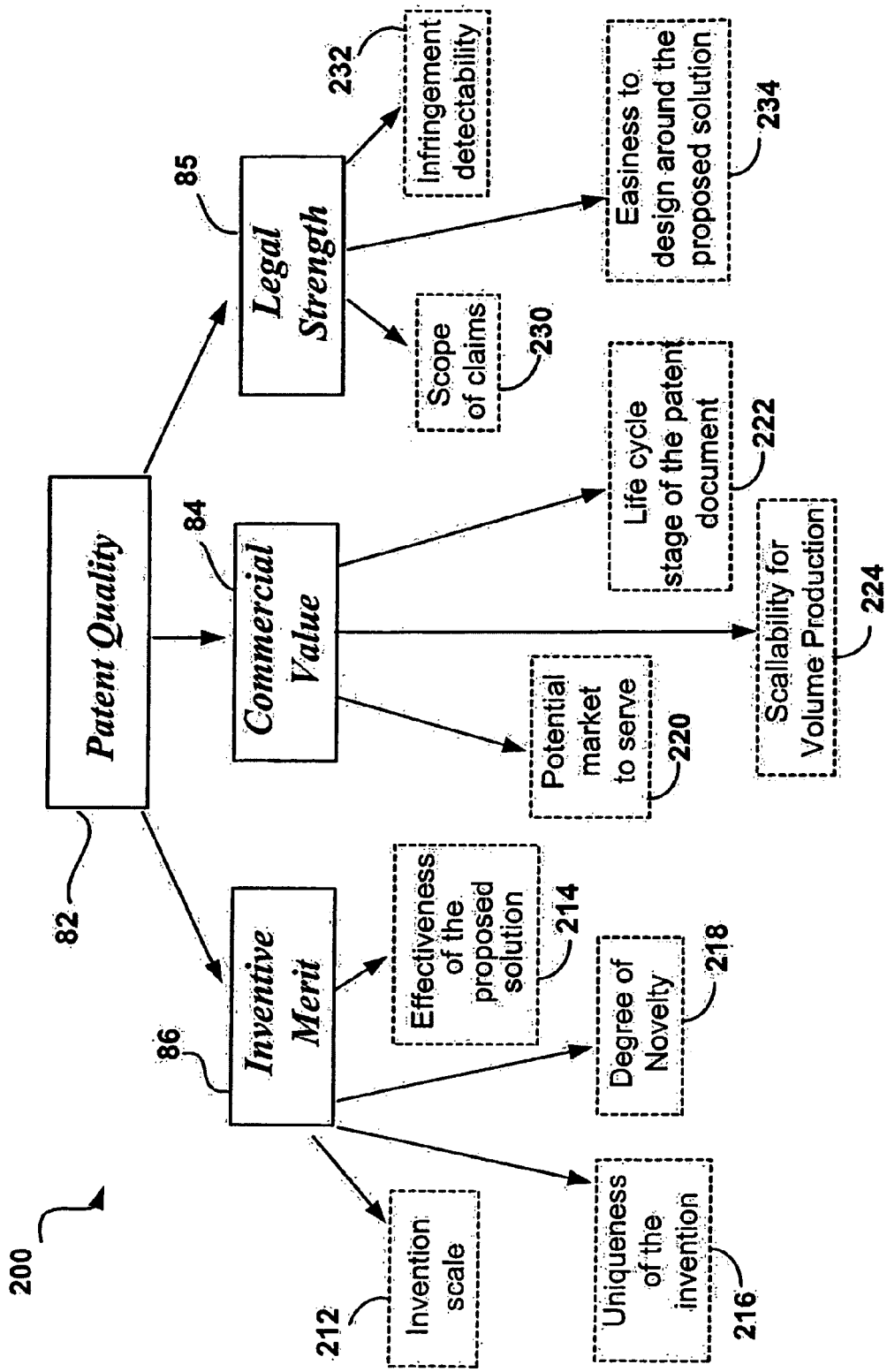
FIG. 11 shows a model for Patent Quality evaluation corresponding to the model of FIG. 9B, which further illustrates the expansion of the patent indices into respective sub-indices.

A model 200 for Patent Quality 82 evaluation illustrated in FIG. 11 is similar to that of FIG. 9B described above, except for each of said three indices of Inventive Merit (86), Commercial Value (84) and Legal Strength (85) now being broken down into a number of sub-indices 212 to 232 as shown in detail below.

Namely, the Index $x_1$ of Inventive Merit (86) includes the following sub-indices:

$x_{11}$, characterizing Invention scale (212), from a minor improvement to a land mark invention;

$x_{12}$, characterizing Effectiveness of the proposed solution (214), i.e. whether this is a partial or complete solution of the problem to be provided by the invention;

$x_{13}$, characterizing Uniqueness of the invention (216); and $x_{14}$, characterizing Degree of Novelty of the invention (218).

The Index $x_2$ of Commercial Value (84) includes the following sub-indices: $x_{21}$, characterizing the Potential Market to serve (220);

$x_{22}$, characterizing the Life cycle stage of the patent document (222), i.e. whether this is a patent application, a newly issued patent, or a patent close to its expiry; and $x_{23}$, characterizing the Scalability for Volume production (224), i.e. if required, whether it is easy to increase the production volume of the product described by the invention.

The Index $x_3$ of Legal Strength (85) includes the following sub-indices:

$x_{31}$, characterizing Scope of claims 230);

$x_{32}$, characterizing Infringement detectability (232); and $x_{33}$, characterizing easiness to design around the proposed solution (234).

Figure 10:
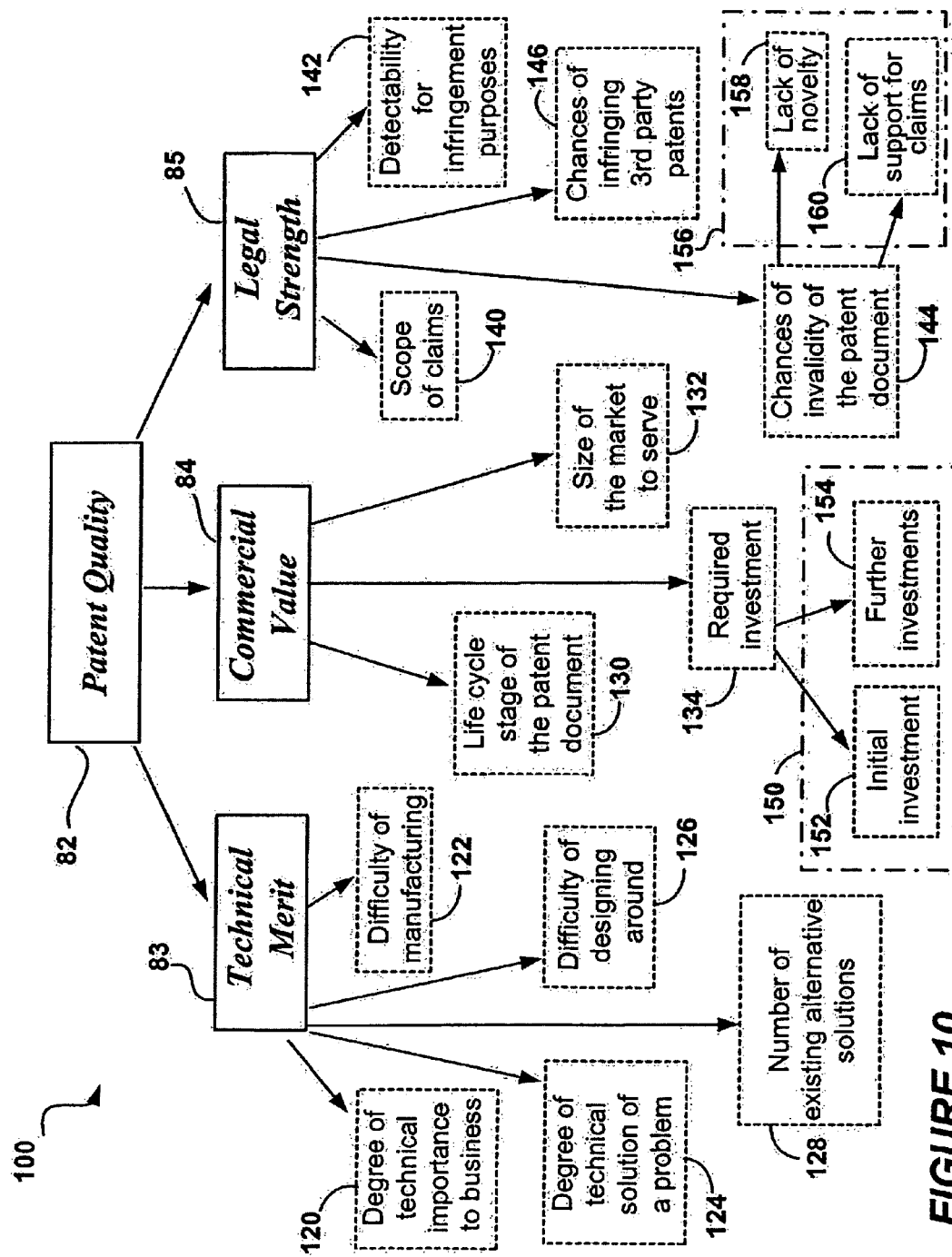
FIG. 10 shows a model for Patent Quality evaluation corresponding to the model of FIG. 9A, which further illustrates the expansion of the patent indices into respective sub-indices.

Thus, in models for Patent Quality evaluation 100 and 200 of FIGS. 10 and 11, experts provide only estimation of patent sub-indices $x_{ij}$ instead of the direct estimation of Patent Indices $x_{1,2,3}$, the sub-indices being combined into the respective Patent Indices, and then the Patent indices being combined into the Patent Quality without the involvement of experts.

Beneficially, the sub-indices are chosen so that to allow their combination into Patent Indices according to a non-linear function, which is similar (or identical) to one of the functions (5), (13) or (17) that have been used for combining Patent Indices into the Patent Quality according to the embodiments of the invention.

It is also understood that patent sub-indices may or may not be combined into Patent Indices according to the non-linear formulae (5), (13), (17) or variations thereof. Some or all of the sub-indices may be selected so that to allow their combination according to some other linear or non-linear formulae, which may or may not satisfy the rules No. 1-5 set out above.

The number of sub-indices for each of the Patent Indices may vary, and the sub-indices may have their own sub-sub-indices etc, thus forming a hierarchy of indices. For example the hierarchy may have "M" layers, the 1st layer corresponding to the PQ index, wherein each of the patent indices of a layer in the hierarchy (indices of a higher layer) except for the M-th layer, is further characterized by its respective patent sub-indices (indices of a lower layer). For example, the sub-index $x_{23}$ (Required Investment 134) may have a number of sub-sub-indices 150 shown in FIG. 9, only two of them being shown: $x_{231}$ (Initial Investment 152) and $x_{232}$ (Further Investments 154), while the sub-index $x_{33}$ (Chances of invalidity of the patent document 144) may include a number of sub-sub-indices 156, such as $x_{331}$ (Lack of novelty 158), and $x_{332}$ (Lack of support for claims in the specification 160) being illustrated. If required, sub-sub-indices 152, 154, 158 and 160 may be further broken down into their own layer of indices in the hierarchy, thus introducing finer granularity of indices to be evaluated by experts. Beneficially, the experts estimate only the indices of the finest (lowest) layer in the hierarchy of indices, and the results of the expert's evaluation are combined into the next (higher) layer of indices automatically according to the chosen evaluation method. In turn, the so combined indices are then automatically combined into the next (yet higher) layer of patent indices according to the same (or another chosen) method, and so on, until the Patent Quality 82 is determined.

Numerous further modifications may be made to the embodiments described above. Instead of the non-linear function for patent quality evaluation as expressed by equations (5), (13) and (17), other non-linear functions, combinations of linear and non-linear functions, or other mathematical non-linear transformations, such as integral or differential transformations, may also be used to combine the selected patent indices into the integral Patent Quality index. Beneficially, such non-linear functions are chosen to satisfy all the rules No. 1-5 set out above, or alternatively only selected rules from the rules No. 1-5, in order to ensure consistency with the common sense evaluation provided by industry experts.

It is contemplated that in a further modification to the above embodiments of the methods, an additional step of automatic analyzing and interpreting the patent indices may be introduced, e.g. with the aid of an Artificial Intelligence (AI) unit, the details of which will be described below.

The methods for patent quality and monetary value evaluation of the embodiments of the invention have the following advantages.

Firstly, they allow separating the process of evaluating Patent Indices by experts from the process of combining said indices into the Patent Quality, which is performed automatically and consistently, thus reducing harmful effect of experts' mistakes in determining Patent Quality.

Secondly, the methods allow taking into account the importance of different patent indices and their relative contributions to the PQ by choosing corresponding values of normalized coefficients $K_i$.

Thirdly, the introduction of a bias coefficient in the evaluation method reduces the harmful effect of a bias associated with a given expert on the patent Quality evaluation. It also imposes less stringent requirements on expert qualifications as patent indices are much easier to estimate than the integral PQ index, and any isolated mistake or an arbitrary judgment with regard to a patent index in one of the layers in the hierarchy of patent indices may distort the integral Patent Quality characteristic only slightly. As a result, the level of subjectivity of patent evaluation is substantially reduced, and consistency of evaluation between different experts and different patents is increased.

Finally, combining of the Patent Indices into the Patent Quality according to a non-linear scale, especially when satisfying all or selected rules 1-5 set out above, provides more reliable results of patent evaluation compared to the prior art, which comply with best evaluation practices used by trusted experts and avoid contradictory results demonstrated by the prior art. An automatic analysis and interpretation of patent indices by an AI unit further increases consistency and reliability of the patent evaluation process.

The results of patent quality and monetary value evaluation of the methods of the embodiments of the invention may be used for various purposes, e.g. for determining a dollar value and/or licensing potential of a patent or a large patent portfolio, determining structure of a patent portfolio, making various decisions regarding maintenance of a patent portfolio such as paying maintenance fees, requesting examinations, responding to examiners' reports, just to name a few.

Monetary Value of an Etalon Patent

Determining a fair monetary value of a patent has always been a difficult problem to tackle. Various attempts to attack this problem have resulted in the development of several solutions as cited in the Background section of this patent application, but none of them is considered completely satisfactory. There is a certain amount of confusion about validity of these solutions, because most of them can be applied to a patent simultaneously, though each solution produces a different result. In our opinion, much of the confusion stems from mixing for one another two different values, namely the value of the patent on an invention, and value of the invention itself. It also adds to confusion that inventors and society appreciate inventions and patents drastically different. Society values inventions greatly for the benefits arising from their implementation and is not much interested in patents per se. Patents are just the tools of convenience to facilitate generation of more inventions. To the contrary, inventions per se have relatively little value for inventors since the prospective for commercial gain is very slim. Patents greatly improve this prospective and therefore become of a great value by themselves to inventors.

Inventions provide multitude of benefits to the society, which can be roughly divided into two groups that are quite different in nature. The first group includes benefits of improving existing goods and services and providing new ones, which were previously unheard of. The second group includes much thought of benefits of providing tools, knowledge, insight and inspiration for researchers, other inventors or would-be inventors. One can appreciate the fact that it is relatively easy to measure the value of the benefits in the first group in monetary terms. However, when it comes to the benefits in the second group, attaching a fair dollar figure to insight or inspiration is a challenge, if possible at all. The value of these benefits is better measured by other means, for example, by the citation index et al. The different nature of two groups of benefits of the invention makes it impossible to apply a single unified measure to them, such as a monetary value.

To encourage inventors to share their knowledge within the society, the inventors are granted patents on their inventions, which is in essence a time-limited monopoly on selling goods and services based on the inventions. Patents themselves can be on sale, and therefore a question about their monetary value arises. Since patents do not restrict the use of inventions for research, educational purposes, and spreading the knowledge in the society, the benefits in the second group, however important for the society, play no role in the monetary value of the patents. Accordingly, we will consider that the price of a patent is determined solely by the value of the benefits arising from improvements in existing goods and services or creation of the new ones.

As a byproduct of this analysis we may conclude that any method of patent evaluation based on the use of parameters characterizing benefits in the second group, such as citation index for example, are bound to produce confusing results, which have little, if at all, to do with the real monetary value of the patent.

Though establishing a monetary value of a patent under consideration can be tricky, it is easier to do for an Etalon Patent, since it can be thought of as a patent ideal in all respects. We can safely assume that every product or service created or improved using the patented method based on the Etalon Patent will take the market by storm, blow competitors away and will hold its dominant position until its expiry date etc. Thus, the price of the Etalon Patent will depend mainly on the size of the potential market for these products or services, and can be based on the estimation of the potential profit generated thereof.

Accordingly, we suggest to determine the monetary value of the etalon patent according to the following formula:

$$MVEP = k \cdot \sum_{i=1}^{n} \frac{MS_i \cdot P_i - CP_i}{t_{si}} \cdot t_p,$$

where $MS_i$ is the size of the market for the i-th product or service, $P_i$ is the price of the i-th product or service, $CP_i$ is the cost of production of the i-th product or providing the i-th service, $t_{si}$ is the estimated life time of the i-th product, $t_p$ is the life time of a patent, n is the total number of products or services, and k is an empirical coefficient 0<k<1. If k is too close to unity, it makes little sense to buy the patent since the potential profit from the products and services for the purchaser will be low. If it is too close to zero, it makes little sense to sell the patent since the potential profit for the patent owner will be low.

Patent Quality Calculator

A corresponding system (Patent Quality Calculator) for patent quality and monetary value evaluation, implementing the above patent evaluation methods of the embodiments of the invention, is also provided. It comprises a general purpose (or specialized) computer having a memory (computer storage means) for storing a computer program code causing said computer to perform patent evaluation according to the method of one of the embodiments described above, followed by displaying the results of the evaluation to a user. In more detail, experts evaluate a predetermined set of patent indices of a particular layer in the hierarchy of indices (e.g. sub-sub-indices), which they rate based on expert(s) experience and knowledge of the subject matter. The system receives inputs from experts with the regard to the patent indices to be evaluated, and then combines the normalized indices into the respective indices of the higher layers in the patent index hierarchy, which are ultimately combined into the integral Patent Quality index according to the methods described above. The analysis and interpretation of patent indices values assigned by experts is provided by an Artificial Intelligence system as will be described in detail below.

Figure 12:
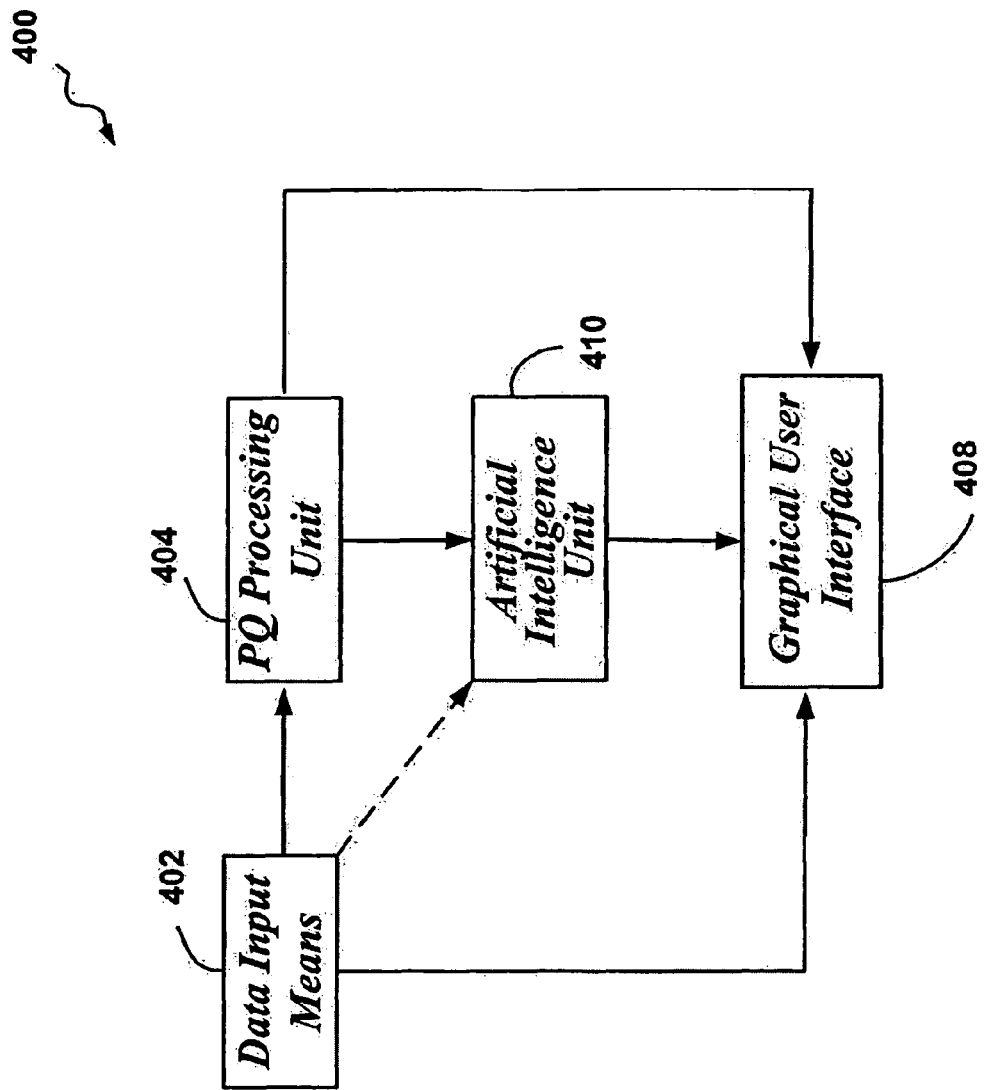
FIG. 12 shows a system for patent evaluation (Patent Quality Calculator) implementing methods of the embodiments of the invention.

FIG. 12 shows a Patent Quality Calculator (PQC) 400 suitable for implementing the methods of the embodiment of the invention. The PQC 400 comprises Data Input Means 402 for entering an input data, e.g. experts' input on patent indices of a particular layer in the index hierarchy. The input data is forwarded to a PQ Processing Unit 404, comprising a means for processing in the form of a computer program code stored in a memory, for calculating the Patent Quality and the corresponding Monetary Value as a function of the hierarchy of its indices. The function is one of the non-linear functions (5), (13) or (17) described above or any other linear or non-linear function or mathematical transformation, which is used for combining patent indices into the PQ. The results of the PQ Processing Unit 404 are supplied to a Graphical User Interface (GUI) 408 for preparing the results of the processing and displaying them to a user. The Graphical User Interface 408 is implemented as a computer readable program code stored in a computer memory, which when executed, provides graphical means for entering and displaying the input data, and graphical means for displaying the output data (PQ and Monetary Value of a patent) along with other patent indices in the patent index hierarchy calculated by the PQ Processing Unit 404. The patent indices of the higher layer in the index hierarchy calculated within the PQ Processing Unit 404 are also supplied to an Artificial Intelligence (AI) Unit 410, comprising an AI computer program, which provides an automatic interpretation of the patent indices in a manner that mimics interpretation thereof by human experts. A conclusion generated by the AI Unit 410 is forwarded to the Graphical User Interface 408 for the display to a user. A corresponding reason, explaining why the AI Unit has arrived at the conclusion, is also produced within the AI Unit 410 and displayed on a screen via GUI 408, if requested. Alternatively, the patent indices of the higher layer in the index hierarchy, if provided directly by experts via the Data Input Means 402, may be supplied directly to the AI Unit 410 for the AI analysis and interpretation, which is illustrated by a dashed line between the data Input Means 402 and the AI Unit 410.

Figure 13:
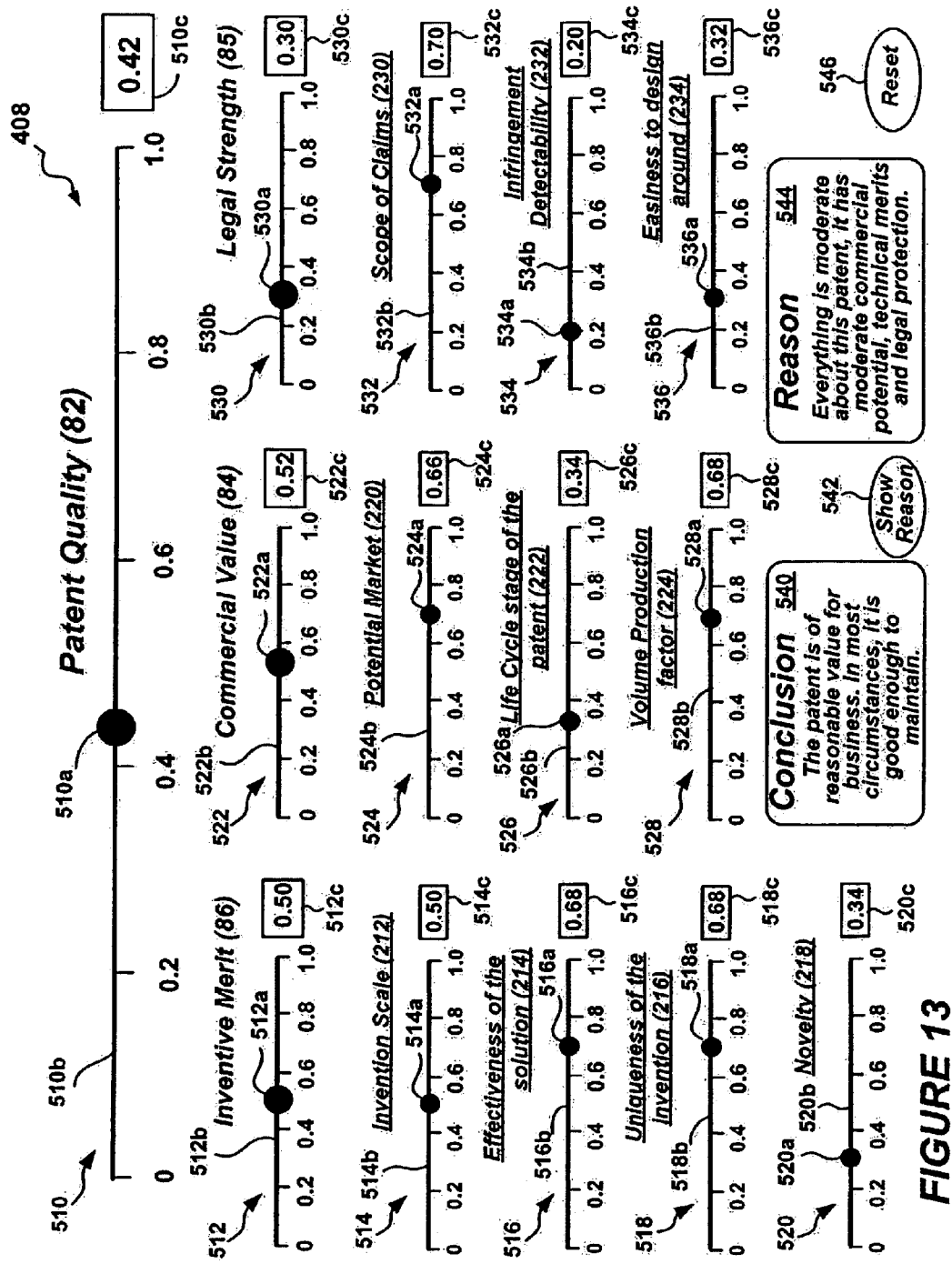
FIG. 13 shows a graphical user interface for the Patent Quality Calculator of FIG. 12.

The Graphical User Interface 408 for the Patent Quality Calculator 400 is schematically shown in FIG. 13. By way of example, it corresponds to the model 200 of Patent Quality 82 evaluation of FIG. 10, including three indices of Inventive Merit 86, Commercial Value 84 and Legal Strength 85 respectively, each index having corresponding sub-indices, the number of sub-indices being 10 in total.

The Graphical User Interface 408 has been designed as a set of sliding objects (marbles) 510a to 536a movable along respective horizontal linear scales 510b to 536b in a left to right direction, together with corresponding odometer-style counters 510c to 536c reflecting the current positions of the sliding objects, thus letting experts to express their estimation of patent indices graphically, by pushing a sliding object along the respective linear scale. The respective sliding objects, the linear scales and the counters are collectively referred to as sliders 510 to 536.

The sliders 510 to 536 are divided into two groups, the active sliders and the passive sliders. The active sliders (to be also referred to as graphical means for entering and displaying the input data) allow experts to change a position of their sliding objects by pushing them in the desired direction, e.g. by placing the mouse pointer on the nearest element of a linear scale, or by clicking the left button at the desired location on the scale. In contrast, passive sliders do not respond to the input of experts directly, instead positions of their sliding objects depend upon the positions of a predetermined subset of other sliders, e.g. certain active sliders. In the GUI 408 shown in FIG. 13, there are four passive sliders 510, 512, 522 and 530 corresponding to the Patent Quality and its three indices $x_1$, $x_2$, $x_3$ of Inventive Merit, Commercial Value and Legal Strength respectively. Thus, the slider 510 provides a graphical displaying of the output data (the PQ), and the sliders 512, 522 and 530 provide a graphical displaying of the calculated patent indices in the patent index hierarchy.

The relation between the Patent Quality and the three indices represented by the passive sliders 512, 522 and 530 is governed by the expression derived from the expression 17 shown above:

$$PQ = \frac{1-B}{-2 \cdot B + (1+B) \cdot \left(\frac{K_{IM}}{x_1} + \frac{K_{CV}}{x_2} + \frac{K_{LS}}{x_3}\right)} \quad (27)$$

wherein $K_{IM}+K_{CV}+K_{LS}=1$, and B is a bias coefficient of the expert conducting the evaluation.

There are also ten active sliders 514, 516, 518, 520, 524, 526, 528, 532, 534 and 536 corresponding to the sub-indices $x_{11}$, $x_{12}$, $x_{13}$, $x_{14}$, $x_{21}$, $x_{22}$, $x_{23}$, $x_{31}$, $x_{32}$ and $x_{33}$ of the above three patent indices.

The relation between the Inventive Merit index $x_i$ and its four sub-indices $x_{11}$, $x_{12}$, $x_{13}$ and $x_{14}$ is governed by the following expression:

$$x_1 = \frac{1-B}{-2 \cdot B + (1+B) \cdot \left(\frac{K_1}{x_{12}} + \frac{K_2}{x_{12}} + \frac{K_3}{x_{13}} + \frac{K_4}{x_{14}}\right)} \quad (28)$$

wherein $K_1+K_2+K_3+K_4=1$; B is a bias coefficient; and $x_{12}$, $x_{12}$, $x_{13}$ and $x_{14}$ are sub-indices characterizing Invention Scale (212), Effectiveness of the Proposed solution (214), Uniqueness of the invention (216), and Novelty (218) respectively.

The relation between the Commercial Value index $x_2$ and its three sub-indices $x_{21}$, $x_{22}$ and $x_{23}$ is governed by the similar expression:

$$x_2 = \frac{1-B}{-2 \cdot B + (1+B) \cdot \left(\frac{K_5}{x_{21}} + \frac{K_6}{x_{22}} + \frac{K_7}{x_{23}}\right)} \quad (29)$$

wherein $K_5+K_6+K_7=1$; B is a bias coefficient; and $x_{21}$, $x_{22}$ and $x_{23}$ are sub-indices characterizing a Potential Market to serve (220), a Life cycle stage of the patent document (222) and a Volume production factor (224).

Similarly, for the Legal Strength index $x_2$ and its three sub-indices $x_{31}$, $x_{32}$ and $x_{33}$ we use the expression $$x_3 = \frac{1-B}{-2 \cdot B + (1+B) \cdot \left(\frac{K_8}{x_{31}} + \frac{K_9}{x_{32}} + \frac{K_{10}}{x_{33}}\right)} \quad (30)$$

wherein $K_8+K_9+K_{10}=1$; B is a bias coefficient; and $x_{31}$, $x_{32}$ and $x_{33}$ are sub-indices characterizing Scope of Claims (230), Infringement detectability (232) and the Easiness to design around the proposed solution (234).

Configuration parameters $K_{IM}$, $K_{CV}$, $K_{LS}$, $K_1$ to $K_{10}$ and the bias coefficient B are chosen by default as follows:

$K_{IM}=0.6$; $K_{CV}=0.2$; $K_{LS}=0.2$; $K_1=K_2=\ldots=K_{10}=0.5$, and B=1.

It is understood, however, that these parameters can be customized as required and may replace the default values.

A "Conclusion" box 540, located below the sliders 510-536c in the lower portion of the GUI 408, shows a conclusion generated by the AI Unit 410 with regard to the patent document under consideration. A button "Show Reason" 542 beside the "Conclusion" box 540 serves the purpose of requesting the display of reasons leading to the above conclusion, the reasons being shown in a "Reason" box 544 located nearby the "Conclusion" box 540. A "Reset" button 546 serves the purpose of resetting all sliding objects on respective linear scales to zero positions.

Figure 14:
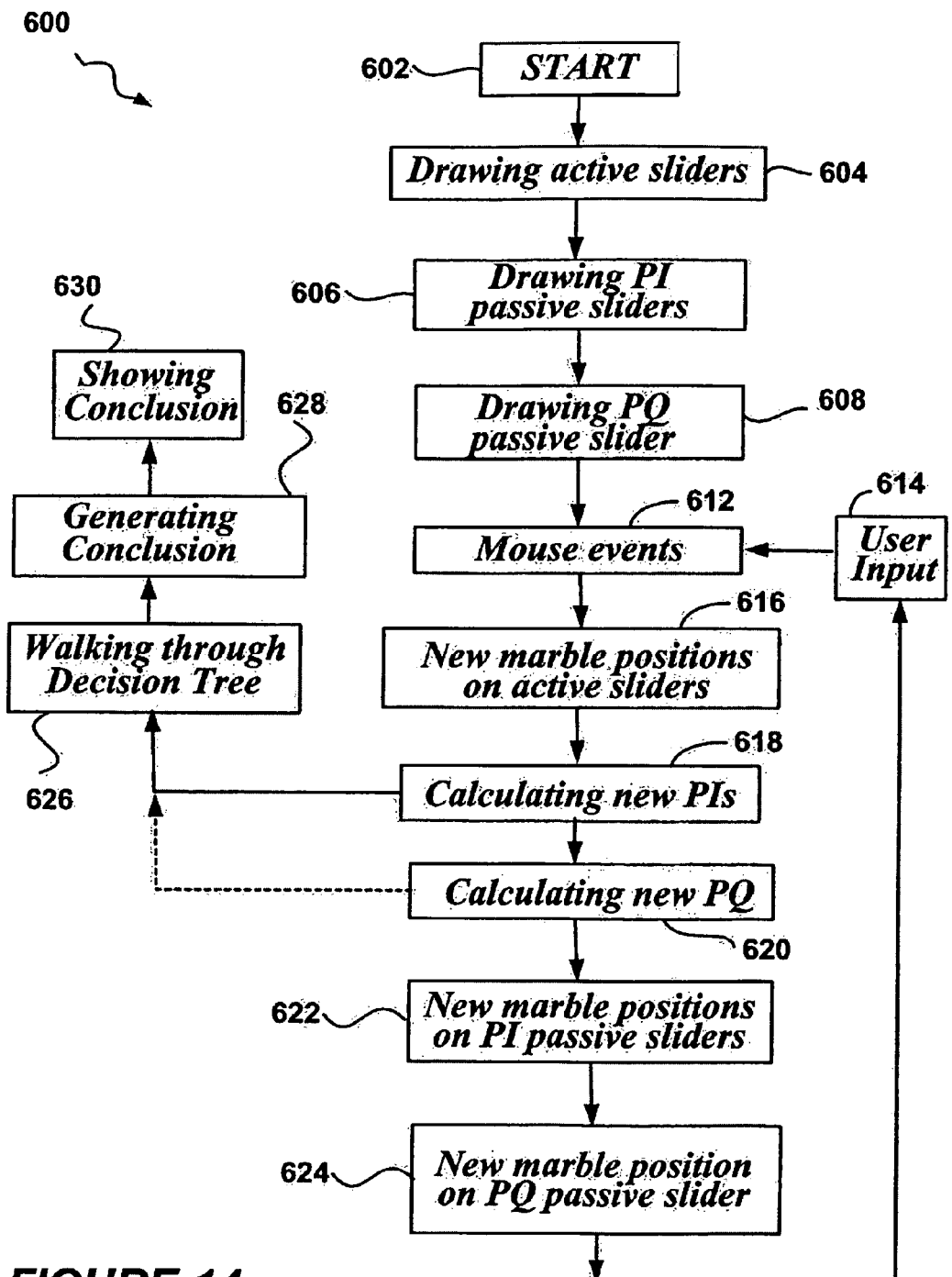
FIG. 14 is a flow-chart illustrating operation of the Patent Quality Calculator of FIG. 12.

Operation of the PQC 400 is described in detail with reference to FIG. 14. Upon Start (block 602), the routine 600 representing the steps involved in the operation of the PQC 400, prepares the GUI 408 for displaying and entering the input data on a screen. First, it draws sliders 510 to 536c for the PQ, IM, CV, LS and its respective sub-indices (blocks "Drawing active sliders", "Drawing PI passive sliders", and "Drawing PQ passive slider" labeled 604, 606 and 608 respectively), wherein the marbles on the respective linear scales reside in their initial zero positions. The conclusion box 540 is also drawn, but it is empty, as no patent evaluation has been performed yet. At this stage, the PQC 400 is waiting for the expert's (user) input 614. The expert's input regarding a certain sub-index in the form of a mouse button click or a mouse pointer placement into a proper position along the respective scale is processed by the "Mouse Events" block 612 to determine the action requested by the expert. The next block "New marble positions on active sliders" (block 616) changes position of the marble along the scale of the respective active slider.

Block "Calculating new PIs" 618 re-calculates new values of the related Patent Indices based on new values of their respective sub-indices, and, in turn, block "Calculating new PQ" 620 re-calculates the PQ index, which depends upon the three re-calculated patent indices.

The values of the re-calculated patent indices are submitted to the AI unit 410, which performs walking through the decision tree (block 626) based on the submitted values of PIs, and generates a conclusion (block 628) with regard to the patent document under consideration, the conclusion being displayed (block 630) in the conclusion box 540 of the GUI 408. Optionally, the value of the PQ may also be supplied to the AI Unit 410, if required.

Accordingly, block "New marble positions on PI passive sliders" 622 changes positions of the marbles along their respective scales on the screen, and, finally, block "New Marble Position on PQ passive slider" 624 brings the position of the PQ marble on the screen into correspondence with the new re-calculated PQ value.

Afterwards, the PQC 400 waits for a new user input 614, and the whole process from bocks 614 to 630 starts all over again.

A System for Determining a Bias of an Expert

Figure 15:
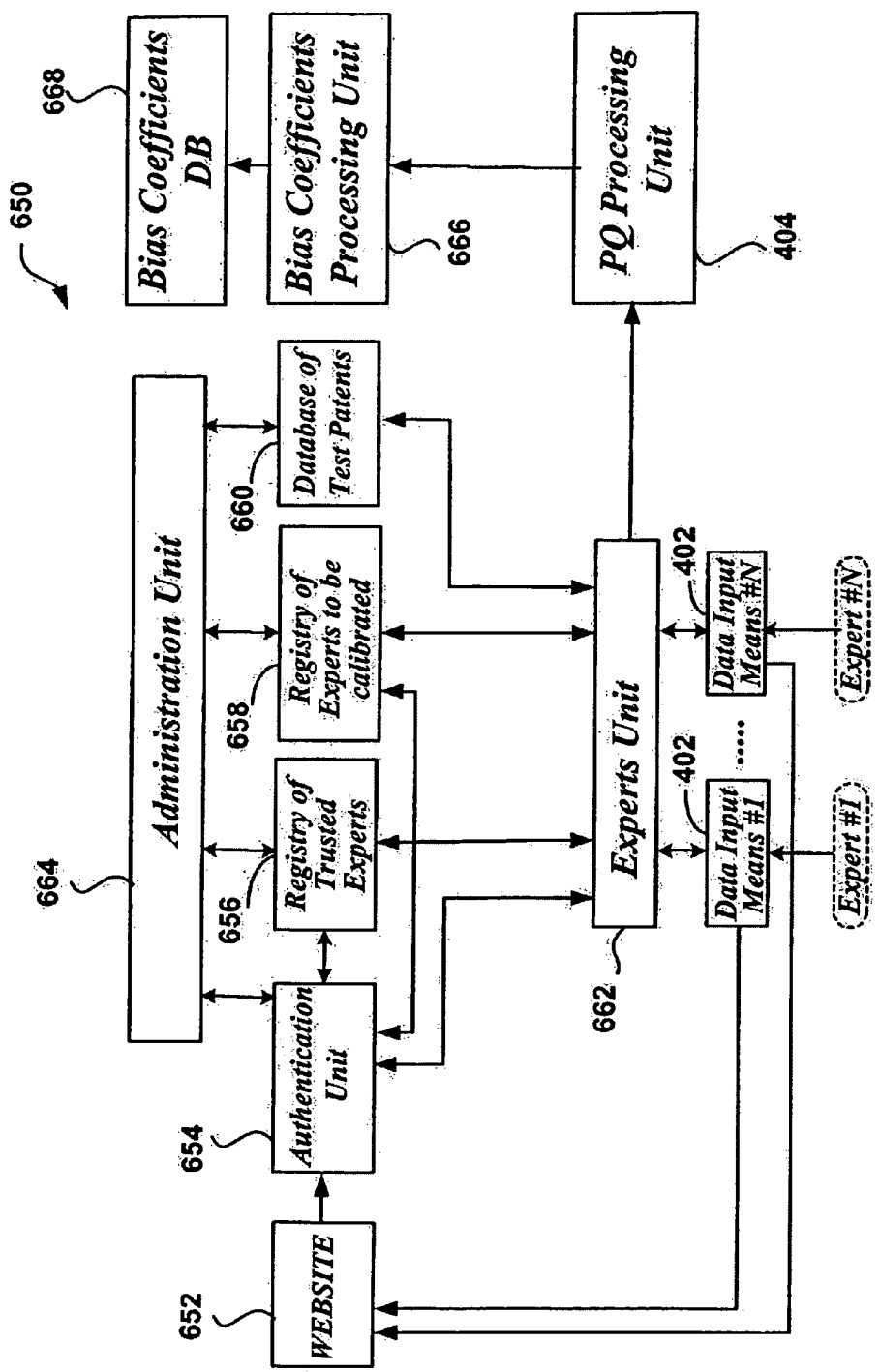
FIG. 15 shows a system for determining a bias of an expert.

A system 650 for determining a bias of an expert influencing the process of evaluating a patent document is shown in FIG. 15. The system 650 comprises a means for evaluating a test patent document by a trusted expert according to a selected evaluation method, thus providing a Patent Quality value $PQ_p$ of the test patent document assigned by the trusted expert; a means for evaluating said test patent document by an expert whose input to be calibrated by using the same selected evaluation method, thus providing a Patent Quality value $PQ_c$ of said test patent document assigned by the expert to be calibrated; and a means for determining a bias of said expert to be calibrated as a dependency on the $PQ_p$, $PQ_c$ and the selected evaluation method. In more detail, the system 650 comprises a Data Input Means 402a to 402n for logging onto a website 652 by Experts #1 to #N respectively, the website comprising a link to an Authentication unit 654, which in turn has access to a Registry of Trusted Experts 656 and a Registry of Experts to be calibrated 658. The system 650 further comprises a database of Test Patents 660 to be offered for evaluation to one or more trusted experts, and afterwards to one or more experts whose input needs to be calibrated. The information from the Authentication unit 654, Registry of Trusted Experts 656, Registry of Experts to be calibrated 658, and the database of test patents 660 is available to an Experts Unit 662, which manages evaluation of various test patents by various experts. The Experts Unit 662 comprises a means for keeping track of test patents that have been evaluated by a given expert; means for supplying a GUI 408 to experts #1 to #N for entering an input data, i.e. experts' input on patent indices of a particular layer in the index hierarchy, through respective Data Input Means 402a to 402n; means for supplying a sub-set of the test patents from the database of test patents 660 to a given expert and allowing the expert to select the test patent for evaluation; means for forwarding the input data to the PQ Processing Unit 404; and means for storing the input data and the results of evaluation in a database (not shown). The system 650 further comprises an Administration Unit 664 which manages experts' privileges, e.g. access level, expert status (such as trusted expert, or an expert to be calibrated) et al., and the database of the test patents 660, including inclusion, exclusion or modification of test patents in the database 660. The Administration Unit 664 has access to the Authentication unit 654, to the Registries of trusted experts 656 and experts to be calibrated 658, and to the database of test patents 660. The Administration unit 664 comprises means for assigning test patents for evaluation to various experts, means for monitoring the current list of experts who have any test patents assigned for evaluation, and the current list of test patents under evaluation and their status.

An output of the PQ Processing Unit 404 is supplied to an input of a Bias Coefficients Processing Unit 666, which calculates a bias coefficient "B" of an expert to be calibrated. The results of the calculations are stored in a database of Bias Coefficients 668.

The system 650 for determining a bias of an expert operates in the following manner. An administrator, through the means of the Administration Unit 664, assigns a test patent to a trusted expert who is registered in the registry of trusted experts 656. The trusted expert, when notified in some manner, enters the website 652 (including the authentication performed by the Authentication unit 654) in order to have access to the test patent assigned by the administrator. The trusted expert evaluates patent indices $x_{1p}, \ldots, x_{np}$ of the test patent and enters them through one of the data input means 402a to 402n and sliders of the GUI 408, which is supplied to the trusted expert by the Experts Unit 662. The values $x_{1p}, \ldots, x_{np}$ of the patent indices are supplied to the PQ Processing Unit 404, which calculates the $PQ_p$ according to a selected function, e.g. according to the expression (19) shown above, the value of the $PQ_p$ is being stored in a database (not shown).

After the test patent has been evaluated by the trusted expert, an administrator, through the means of the Administration Unit 664, assigns the same test patent to an expert whose input needs to be calibrated and who is registered in the registry of experts to be calibrated 656. The expert to be calibrated, when notified in some manner, enters the website 652 (including the authentication performed by the Authentication unit 654) in order to have access to the test patent assigned by the administrator. The expert to be calibrated evaluates patent indices $x_{1c}, \ldots, x_{nc}$ of the test patent and enters them through one of the data input means 402a to 402n and sliders of the GUI 408, which is supplied to the expert to be calibrated by the Experts Unit 662. The values $x_{1c}, \ldots, x_{nc}$ of the patent indices are supplied to the PQ Processing Unit 404, which calculates the $PQ_c$ according to a selected function, e.g. according to the expression (19a) shown above, the value of the $PQ_c$ is being optionally stored in a database (not shown).

Both values of the Patent Quality $PQ_p$ and $PQ_c$ resulting from the respective evaluations provided by the trusted expert and the expert to be calibrated are supplied to the Bias Coefficients Processing Unit 666 for determining a bias coefficient "B" of the expert to be calibrated in accordance with the expression (21) shown above. The results of the calculations are stored in a database of Bias Coefficients 668.

Thus, a system for determining a bias of an expert influencing evaluation of a patent document has been provided.

Artificial Intelligence Unit 410

The AI unit 410, which provides the analysis and interpretation of the Patent Indices is a decision-tree based AI system, including an AI computer program code stored in a memory, which sufficiently accurately mimics actions of human experts.

Figure 16:
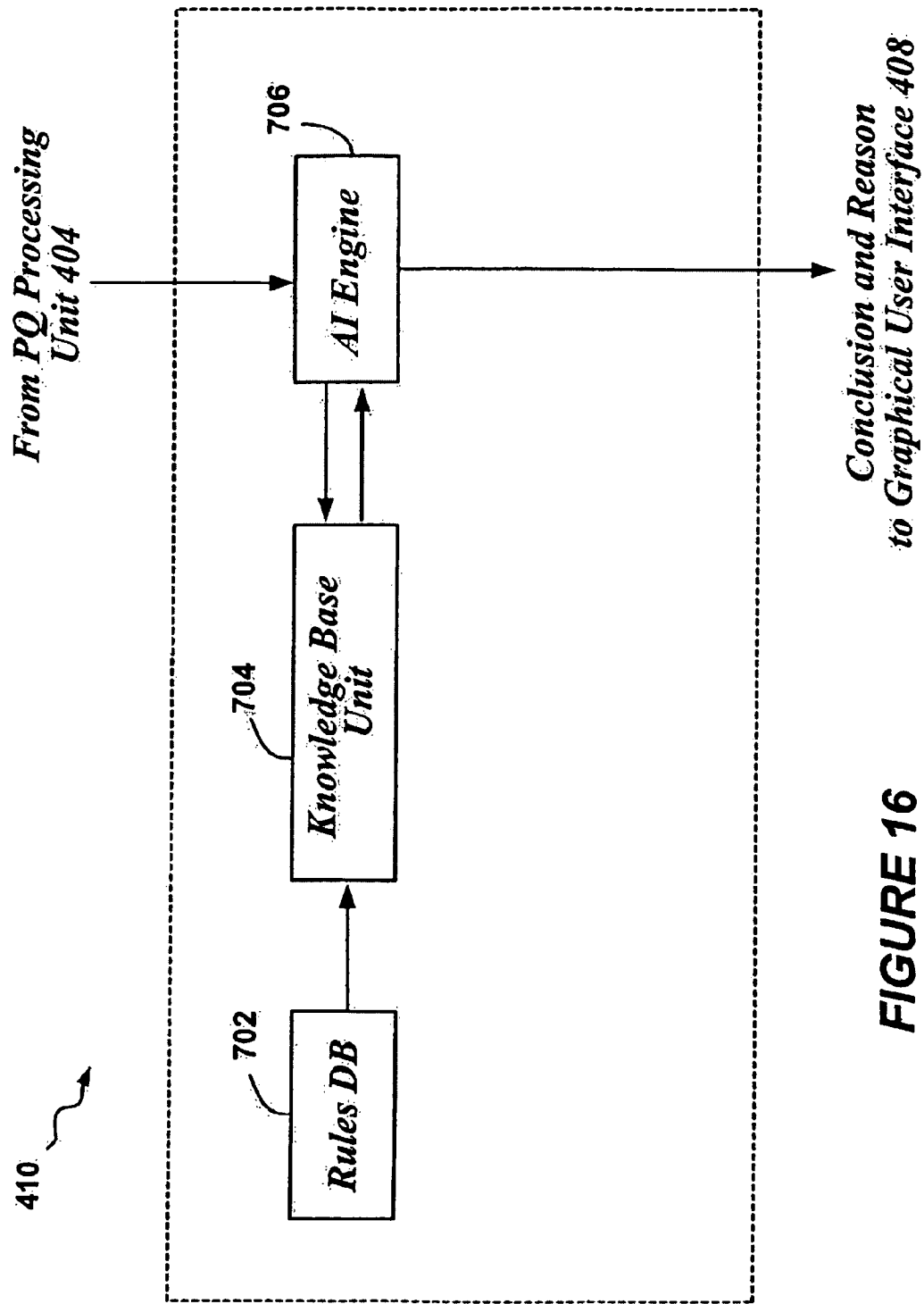
FIG. 16 shows an Artificial Intelligence (AI) Unit of the Patent Quality Calculator of FIG. 12 in more detail.

The AI Unit 410 is shown in more detail in FIG. 16. It includes a Rules Database 702, a Knowledge Base (decision tree) Unit 704, and an AI Engine 706. The Rules Database (DB) 702 stores all the rules that the AI unit 410 applies for the interpretation of Patent Indices. The Knowledge Base Unit 704 defines the decision-tree structure, based on the rules stored in the Rules DB 702, while the AI Engine 706 provides a mechanism for actually walking the knowledge base until a proper conclusion is reached. The Rules DB 702 is stored in a text file in a humanly readable form, which allows for quick and easy modification of the rules, if necessary.

The AI unit 410 operates in the following manner. The AI Engine receives data from the PQ processing Unit 404 in the form of values of patent indices, and invokes generation of the decision tree within the Knowledge base Unit 704 according to the rules stored in the Rules database 702. The AI Engine 706 takes into account the received values of the patent indices and walks through the generated decision tree until the proper conclusion is reached, which is supplied to the GUI 408 and displayed in the box 540 on a computer screen. If requested, a respective reason underlying the reached conclusion is also supplied to the GUI 408 and displayed in the box 542 on a computer screen.

By way of example, the process of designing a decision tree for the Knowledge Base Unit 704 will be illustrated for a patent document characterized by two patent indices, e.g. the indices characterizing Commercial value (CV) and Legal Strength (LS) of the patent document. For each of the chosen indices, there are introduced two configuration parameters, namely $CV_1$, $CV_2$ for CV; and $LS_1$, $LS_2$ for LS. These parameters are chosen so that to satisfy the following conditions:

$$0 < CV_1 < CV_2 < 1 \tag{31}$$

$$0 < LS_1 < LS_2 < 1 \tag{32}$$

Geometrically, a CV-LS point represents a combination of the chosen indices, where the coordinates of the CV-LS point are equal to the actual values of the indices, and all possible combinations of CV and LS values fill in a square 750 labeled Commercial Value—Legal Strength and shown in FIG. 17A, the square 750 being referred to as a space of the patent indices variations. The configuration parameters $CV_1$, $CV_2$, $LS_1$, and $LS_2$ divide the square 750 into a number of areas (nine sub-squares (sub-rectangles) labeled "Conclusion 1" to "Conclusion 9") such that each area has a meaningful interpretation with regard to the value of the patent document. For example, patent documents represented by CV-LS points within the upper right sub-square labeled "Conclusion 6" are characterized by patent indices whose values are close to the highest possible values, which means that these patent documents are of high quality and therefore are of a considerable value for businesses. On the contrary, patent documents represented by CV-LS points within the bottom left sub-square labeled "Conclusion 8" are characterized by patent indices whose values are close to the lowest possible values, which means that these patent documents are of very low quality and therefore are of little, if at all, value for business. Similar considerations apply to the remaining sub-squares leading to the conclusions 1-5, 7, 9, which are formulated below.

Conclusion 1. The patent is of a reasonable value for business. In most circumstances, it is good enough to maintain.

Conclusion 2. The patent is of a little value for business. When trimming patent portfolio, consider abandoning the patent.

Conclusion 3. The patent has a moderate value for business. In most circumstances it is worth maintaining.

Conclusion 4. The patent has a substantial value for businesses. It is well worth maintaining.

Conclusion 5. The value of the patent is questionable because of its poor legal strength. It may be worth maintaining under special circumstances.

Conclusion 6. Well balanced patent of an exceptional quality. It contributes considerably to the value of the patent portfolio. Well worth maintaining.

Conclusion 7. The patent is of a low value for business. In most cases, the best course of action is to abandon it.

Conclusion 8. The patent has little to no value at all. It is a prime candidate for abandoning.

Conclusion 9. Under special circumstances, this patent might have some value for businesses and therefore might be worth maintaining.

The decision tree of the Knowledge Base Unit 704 is built by forming chains of comparisons of actual values of the patent indices CV, LS, denoted herein as $CV_0$, $LS_0$, and configuration parameters $CV_1$, $CV_2$, $LS_1$, and $LS_2$. The chains of comparisons are designed to identify to which of said nine sub-squares the actual values of the patent indices belong, and to ensure that the comparisons will lead to all formulated conclusions when numerical values of the patent indices vary within the square 750.

There are four basic comparisons, different combinations of which lead to different conclusions:

$$CV_0 < CV_1 \tag{33}$$

$$CV_0 > CV_2 \tag{34}$$

$$LS_0 < LS_1 \tag{35}$$

$$LS_0 > LS_2 \tag{36}$$

Each comparison has only two possible outcomes, the outcomes being either TRUE or FALSE. On the decision tree diagram, the comparison is represented by a diamond with the diamond number "N" inside, and "Yes" and "No" arrows corresponding to the "TRUE" or "FALSE" outcomes, as illustrated in FIG. 17B.

A conclusion is represented on the decision tree diagram by a rectangle with the conclusion number "M" inside as illustrated in FIG. 16C.

Each diamond is connected either to another diamond or to a conclusion rectangle. A connection to a conclusion rectangle indicates the end of a chain of comparisons. The chains of comparisons are formed with the guidance of FIG. 17A in the following manner.

First, we start with determining whether the patent document under consideration can be represented by a CV-LS point in a lower row in the square 750 (sub-squares "Conclusions 8, 7, 9") by checking whether the comparison $CV^0 < CV_1$ (diamond 1) holds TRUE as shown in FIG. 17B.

If the outcome is "Yes", we determine whether the patent document is represented by a CV-LS point in the sub-square "Conclusion 8" by checking the comparison $LS_0 < LS_1$ (diamond 7) holds true as shown in FIG. 17D.

If the outcome is "Yes", it means that the Conclusion 8 has been reached, thus forming a chain of comparisons shown in FIG. 17E.

Figure 18:
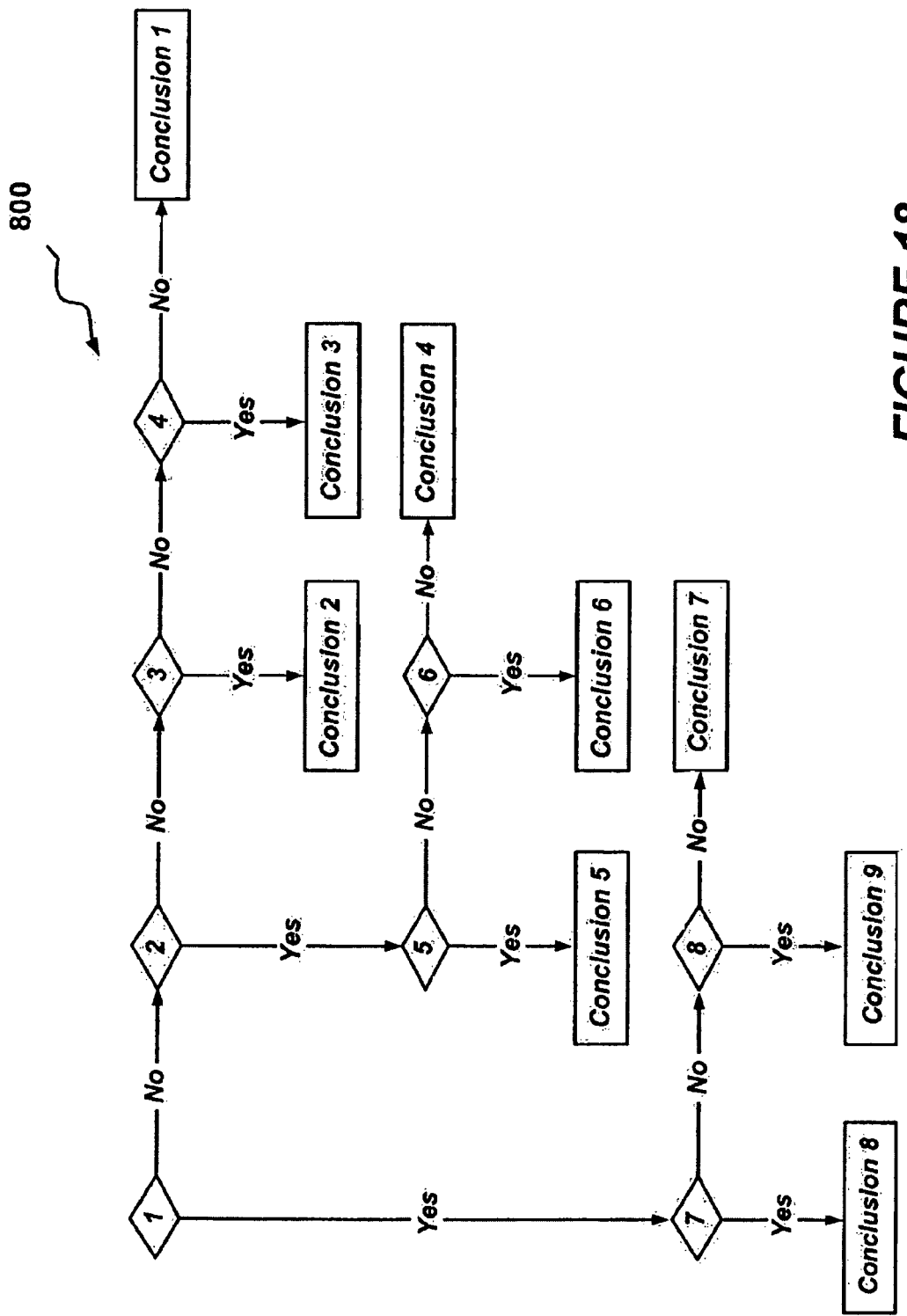
FIG. 18 shows a detailed structure of the Knowledge base (decision tree) of the AI Unit of FIG. 16 for analyzing a patent document characterized by two patent indices.

A complete decision tree 800 for the Knowledge Base Unit 704 analyzing a patent document characterized by two patent indices is shown in FIG. 18. It is designed by repeating the process described above by following combinations of "Yes" and "No" outcomes until all the chains of comparisons are explored and all conclusions are reached. The following designations have been used in FIG. 18: diamond 1 corresponds to the comparison $CV_0 21 CV_1$; diamond 2 corresponds to the comparison $CV_0 > CV_2$; diamonds 3, 5, 7 correspond to the comparison $LS_0 < LS_1$; and diamonds 4, 6, 8 correspond to the comparison $LS_0 > LS_2$.

The AI Unit 410 analyzes the patent indices CV and LS by walking the decision tree 800, which is performed by the AI Engine 706. The analysis includes comparisons of actual values of CV and LS with the corresponding configuration parameters defined above. The comparisons start from the diamond 1. If the current comparison holds TRUE, then the next comparison pointed to by the "Yes"-arrow becomes current, otherwise it is the comparison pointed to by the "No"-arrow. For example, if the starting comparison (diamond 1) holds TRUE, the AI Engine 706 checks the comparison 7 (diamond 7), otherwise it checks the comparison 2 (diamond 2). This process continues until the AI Unit 410 collects sufficient information to make a conclusion. Then the AI Unit 410 generates the relevant conclusion and stops.

If a user is interested why the AI Unit 410 has arrived at a certain conclusion, the AI Unit reveals the corresponding reason. The set of reasons corresponding to the above formulated conclusions is shown below:

Reason 1. Everything is moderate about this patent, it has moderate commercial potential, technical merits and legal protection.

Reason 2. Poor legal protection and moderate chances on commercial success make this patent of little interest for businesses.

Reason 3. The patent has moderate value from commercial point of view, but it provides excellent legal protection of the inventive idea.

Reason 4. The patent is characterized by excellent commercial potential and reasonably good legal protection.

Reason 5. Excellent commercial potential of this patent is practically negated by its poor legal protection.

Reason 6. Excellent commercial potential and outstanding legal protection makes this patent a jewel in the patent portfolio.

Reason 7. This patent hardly can help to generate any significant money, and it provides only moderate legal protection for the inventive idea.

Reason 8. This patent should not have been filed in the first place since it has very low commercial potential and the inventive idea is hardly protected legally. It is a complete waste of time and money.

Reason 9. The patent has low commercial potential, but the inventive idea is well protected legally.

When the decision tree 800 has been generated, it is stored in the Rules DB 702 in the form of a text file. The basic comparison shown in FIG. 17B, being the basic building block of the decision tree 800, is represented in the text file by three expressions, each recorded in a separate line:

$$D: \text{Comparison } N$$
$$Y$$
$$N$$

where "D" stands for "Diamond", "N" indicates the number of the diamond, "Comparison N" stands for "Comparison corresponding to the diamond number N", "Y" stands for "Yes"-arrow, "N" stands for "No"-arrow, and ":" is a symbol-separator, which helps to automatically distinguish between different parts of the expression.

Similarly, the conclusion rectangle shown in FIG. 17C is represented by the expression:

$$C: \text{Conclusion} M$$

where C stands for "Conclusion", and "Conclusion M" is one of the nine conclusions introduced above determined by the number M.

For example, the diamond 1 shown in FIG. 17B is represented in the Rules DB file as follows:

$$D: CV_0 < CV_1$$
$$Y$$
$$N$$

When two diamonds are combined together, the insertion points are in the second and third lines after the respective symbols "Y" and "N". For example, combination of the diamonds 7 and 1, resulting in the structure shown in FIG. 17D, will be schematically expressed as follows:

| Diamond 1 | Diamond 7 | Combination of diamonds 7 and 1 |
|---|---|---|
| D: $CV_0 < CV_1$<br>Y<br>N | D: $LS_0 < LS_1$<br>Y<br>N | D: $CV_0 < CV_1$<br>YD: $LS_0 < LS_1$<br>Y<br>N<br>N |

Here the insertion point is in the second line immediately after "Y" since diamonds 1 and 7 are connected by the "Yes"-arrow. Adding a conclusion is performed in the similar manner. For example, the addition of the Conclusion 8, resulting in the chain of comparisons shown in FIG. 17E, will be stored in the Rules DB as follows:

| Diamond 1 and 7 | Rectangle 8 | Chain leading to the Conclusion 8 |
|---|---|---|
| D: $CV_0 < CV_1$<br>YD: $LS_0 < LS_1$<br>Y<br>N<br>N | C: Conclusion 8 | D: $CV_0 < CV_1$<br>YD: $LS_0 < LS_1$<br>Y C: Conclusion 8<br>N<br>N |

The complete decision tree 800 shown in FIG. 18 is stored in the Rules DB file in the following manner:

D: $CV_0 < CV_1$
YD: $LS_0 < LS_1$
YC: Conclusion 8
ND: $LS_0 > LS_2$
YC: Conclusion 9
NC: Conclusion 7
ND: $CV_0 > CV_2$
YD: $LS_0 < LS_1$
YC: Conclusion 5
ND: $LS_0 > LS_2$
YC: Conclusion 6
NC: Conclusion 4
ND: $LS_0 < LS_1$
YC: Conclusion 2
ND: $LS_0 > LS_2$
YC: Conclusion 3
NC: Conclusion 1

Thus, an AI system for analyzing and interpreting the value of a patent document characterized by two patent indices has been provided.

While the AI system described above has been illustrated with regard to patent indices characterizing Commercial Value and Legal Strength, it is understood that similar AI systems may be designed for analyzing patent documents characterized by other sets of two patent indices, e.g. the indices described above in the section "Choice of Patent Indices".

If a patent document is characterized by more than two patent indices, or if the analysis and interpretation of patent sub-indices is required, the square 750 becomes a cube, or a hypercube, and the sub-squares of the square 750 become correspondingly sub-cubes or sub-hypercubes, the number of conclusions and their complexity increases, and the structure of the decision tree becomes more complicated. However, the principles of generating the decision tree and storing it in the Rules DB file remain the same as discussed above.

Figure 19:
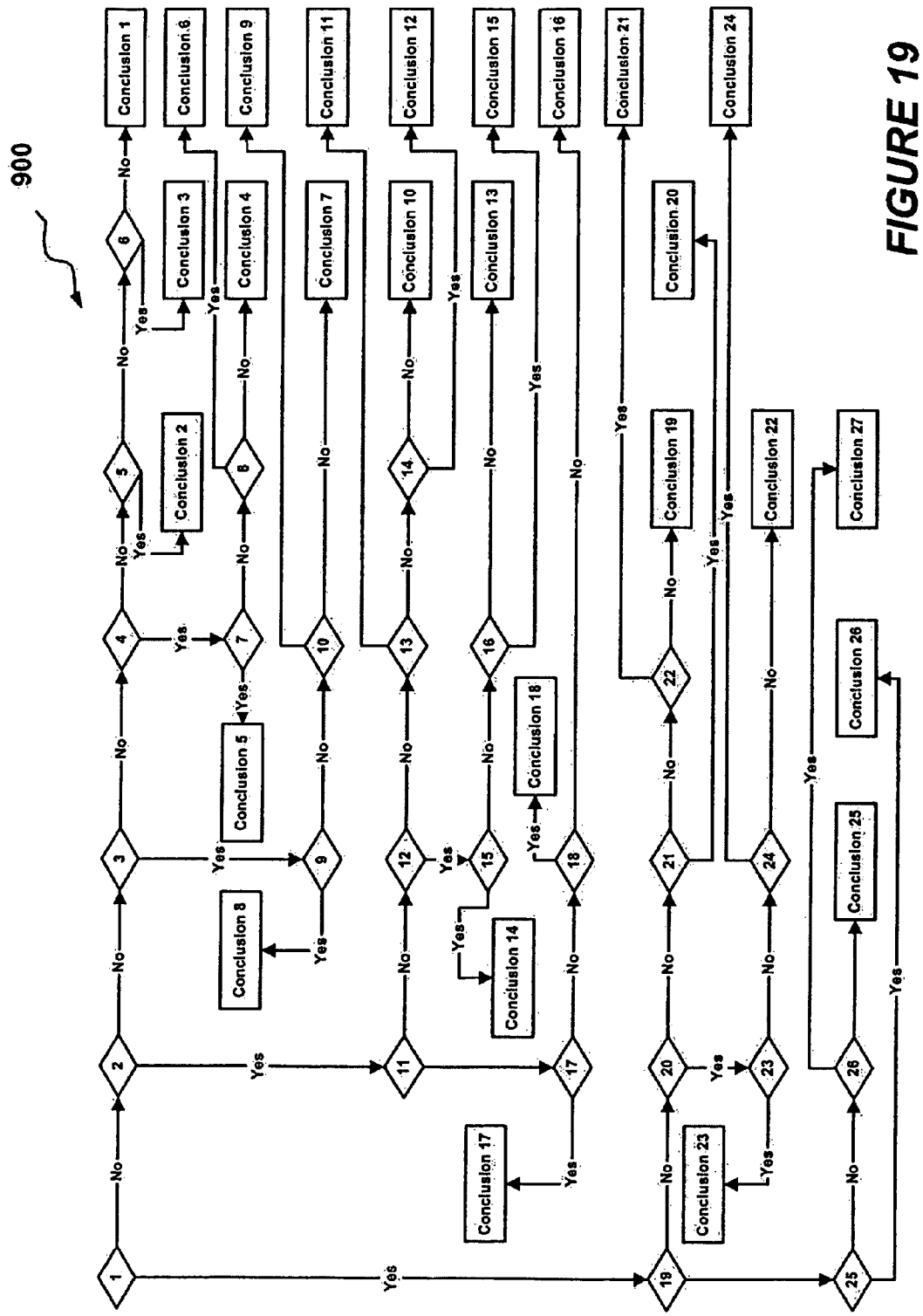
FIG. 19 shows a detailed structure of the Knowledge base (decision tree) of the AI Unit of FIG. 16 for analyzing a patent document characterized by three patent indices.

FIG. 19 illustrates generation of a decision tree 900 of the Knowledge base unit 704 for analyzing a patent document characterized by three patent indices. By way of example, the three patent indices are chosen as Technical Merit (TM), Commercial Value (CV) and Legal Strength (LS). For each of the patent indices, there are established two configuration parameters, namely $TM_1$, $TM_2$ for TM; $CV_1$, $CV_2$ for CV; and $LS_1$, $LS_2$ for LS. These parameters are chosen to satisfy the following conditions:

$$0 < TM_1 < TM_2 < 1 \tag{37}$$

$$0 < CV_1 < CV_2 < 1 \tag{38}$$

$$0 < LS_1 < LS_2 < 1 \tag{39}$$

The analysis includes a number of comparisons of actual values of TM, CV and LS, denoted here as $TM_0$, $CV_0$, $LS_0$, with the corresponding configuration parameters defined above. The comparisons are represented in FIG. 19 by diamonds with the diamond number shown inside:
$TM_0 < TM_1$—diamond 1;
$TM_0 > TM_2$—diamond 2;
$CV_0 < CV_1$—diamonds 3, 11, and 19;
$CV_0 > CV_2$—diamonds 4, 12, and 20;
$LS_0 < LS_1$—diamonds 5, 7, 9, 13, 15, 17, 21, 23, and 25; and
$LS_0 > LS_2$—diamonds 6, 8, 10, 14, 16, 18, 22, 24, and 26.

The comparisons start from the diamond 1. If the current comparison holds TRUE, then the next comparison pointed to by the "Yes"-arrow becomes current, otherwise it is the comparison pointed to by the "No"-arrow. For example, if the starting comparison (diamond 1) $TM_0 < TM_1$ holds TRUE, the AI Engine 706 checks comparison 19 (diamond 19), otherwise it checks comparison 2 (diamond 2). This process continues until the AI Engine 706 collects enough information to make a relevant conclusion. The AI Engine 706 reaches a relevant conclusion, indicated on FIG. 18 by a rectangle, and then stops.

By way of example, a path illustrating how the AI Engine 706 reaches the conclusion 26 is described below. At diamond 1, the AI Engine 706 determines that $TM_0 < TM_1$ using the value $TM_0$ of the patent index TM received from the PQ processing unit 404 (outcome "Yes" from the diamond 1), thus leading to diamond 19. At diamond 19, the AI Engine 706 determines that $CV_0 < CV_1$ using the value $CV_0$ of the patent index CV received from the PQ processing unit 404 (outcome "Yes" from the diamond 19), thus leading to diamond 25. At diamond 25, the AI Engine 706 determines that $LS_0 < LS_1$ using the value $LS_0$ of the patent index LS received from the PQ processing unit 404 (outcome "Yes" from the diamond 25), thus leading to conclusion 26.

Overall, for the AI system analyzing the above noted three patent indices, the AI Engine 706 is capable of reaching 27 different conclusions, which are listed below.

Conclusion 1. The patent is of a reasonable value for business. In most circumstances, it is good enough to maintain.

Conclusion 2. Poor legal protection makes maintenance of the patent questionable.

Conclusion 3. The patent is of a reasonable value for business. In most circumstances, it is good enough to maintain.

Conclusion 4. The patent is of a reasonable value for business. In most circumstances, it is good enough to maintain.

Conclusion 5. The patent is of more value for competitors than for the business. Probably, it is one of the candidates for abandonment.

Conclusion 6. It is a good patent, well worth maintaining. Periodical re-evaluation is recommended.

Conclusion 7. The patent is of a little value for businesses because of the lack of a significant commercial potential.

Conclusion 8. The patent is not worth maintaining. In fact, it was not even worth filing. Conclusion 9. The patent is of a little value for business because of the lack of substantial commercial potential.

Conclusion 10. The patent is of a moderate value for business. Conclusion 11. The patent is of little value for business, except as a training material. However, in this capacity it does not require to maintain it.

Conclusion 12. Solid patent with moderate commercial potential. Conclusion 13. Overall, it is a good patent, though potentially vulnerable to "design around" attack.

Conclusion 14. The patent may be considered as an open invitation to design around. In this capacity, it has good chances to attract attention of competitors with big money.

Conclusion 15. Well balanced patent of an exceptional quality. Conclusion 16. It is an excellent source of ideas for future development, but practically useless for business.

Conclusion 17. The patent has mainly academic interest, an article in a scientific journal would be more appropriate and much less expensive alternative. However, it might be considered as an excellent source of ideas for future development.

Conclusion 18. It is an excellent source of ideas for future development, but otherwise is practically useless for business.

Conclusion 19. The value of the patent for business is quite limited, and it may quickly become obsolete. There may or may not be reason to maintain it, depending on circumstances. Consider frequent reviews of the patent, to avoid wasting money on it.

Conclusion 20. The patent mainly educates competitors in the underlying technology while providing little value for the business. It may quickly become obsolete.

Conclusion 21. The patent might have some limited value for business in the short term, but may quickly become obsolete. There may or may not be reason to maintain it, depending on circumstances. Consider frequent reviews of the patent, to avoid wasting money on it.

Conclusion 22. The patent has some short-term value but may quickly become obsolete. If you decide to keep it, frequent reviews are recommended (e.g. every 1-2 years).

Conclusion 23. It is best referred to as a gift for competitors, big or small.

Conclusion 24. The patent has some short-term value but may quickly become obsolete. If you decide to keep it, frequent reviews are recommended (e.g. every 2-3 years).

Conclusion 25. The patent has little value for business. There is little reason to maintain it.

Conclusion 26. The patent has next to no value at all. Maintaining it looks like a complete waste of money. It is a prime candidate for abandoning.

Conclusion 27. The patent has little value for business. There is little reason to maintain it. However, it can be used as a training material for those who want to learn how to write patent applications.

If a user is interested to know why the AI Unit 410 has arrived at a certain conclusion, it shows a proper reason. A set of reasons corresponding to the above noted set of conclusions is shown below.

Reason 1. Everything is moderate about this patent; it has moderate technical merits, moderate commercial potential, and moderate legal protection.

Reason 2. The patent is characterized by moderate technical merits, moderate commercial potential, and poor legal protection.

Reason 3. The patent is characterized by moderate technical merits and moderate commercial potential. Inventive idea is well protected legally.

Reason 4. The patent is characterized by moderate technical merits, high commercial potential, moderate legal protection.

Reason 5. In spite for significant commercial value, the patent has poor legal protection. Reason 6. This patent has good commercial potential and adequate legal protection. The only drawback is a moderate scale of the inventive idea.

Reason 7. Utter lack of commercial protection is the main drawback of this invention. Its moderate legal protection of inventive idea does not save the situation.

Reason 8. Moderately important inventive idea is the only good thing to tell about this patent. Everything else is less then attractive—non-existent legal protection, slim chances for commercial gain.

Reason 9. Moderate inventive idea, well protected legally. However, lack of substantial commercial potential makes it a little value for businesses.

Reason 10. The underlying inventive idea is excellent, but legal protection is only satisfactory. Commercial potential is moderate.

Reason 11. Excellent inventive idea, poor legal protection, and moderate chances on commercial success make this patent of little interest for businesses. However, it is good source of ideas for future development.

Reason 12. The patent is based on an excellent idea, well protected legally. The only drawback is moderate potential for commercial gain.

Reason 13. Substantial technical merits of the patent coupled with the excellent commercial potential make it a good addition to any patent portfolio. However, its legal protection is weaker than expected, and therefore, it can be a subject to "design around" attack.

Reason 14. It could be a precious jewel in any portfolio, being based on the strong inventive idea and having excellent commercial potential. However, a poor legal protection kills it, making it relatively easy to work around it.

Reason 15. Everything is good about this patent. It is based on an excellent idea, well protected legally, and enjoys an outstanding commercial potential.

Reason 16. The patent is based on an excellent idea, and is satisfactorily protected legally. However, commercial potential is far from sufficient.

Reason 17. The patent is based on an excellent idea. However, it is hardly protected legally, and the prospective to profit from it looks grim because of the far too small commercial potential.

Reason 18. The patent is based on an excellent idea, and is very well protected legally. However, the prospective to profit from it looks grim because of the far too small commercial potential.

Reason 19. The patent has a moderate commercial potential, and the inventive idea is moderately well protected legally. However, the underlying inventive idea is rather weak.

Reason 20. The patent has a moderate commercial potential. However, the inventive idea is poorly protected legally, and is rather weak. It is, therefore, easy to design around even for a small competitor with a limited budget for R&D. Thus, the patent has more value for competitors than for the business itself.

Reason 21. The patent has a moderate commercial potential. The inventive idea is well protected legally, but is rather weak. There might be found stronger solutions in the future, making the patent obsolete.

Reason 22. The main attraction of this patent is its fantastic commercial potential. However, its legal protection is kind of average quality. Probably, there are many other comparable or even better solutions.

Reason 23. Technical merits of the invention are not significant, but commercial potential is very good indeed. Unfortunately, legal protection falls far behind in quality making it relatively easy to work around it. Thus, it might make sense for competitors, big or small, to learn from the teachings of the patent and quickly design around.

Reason 24. The inventive idea is very weak, but commercial potential is fantastic, and it is protected very well legally. Probably, there are many other comparable or even better solutions. If a substantially better solution is found, the patent can quickly become obsolete.

Reason 25. The inventive idea lacks any significance. Combined with low commercial value and satisfactory, at best, legal protection, it hardly gets anyone excited about.

Reason 26. The inventive idea is very weak from technical point of view. It is highly improbable to make any serious money out of it because of severely limited commercial potential. On top of that, the patent does not protect the idea properly, if at all.

Reason 27. Technical merits of the invention are questionable. There are big doubts about its commercial potential, though it enjoys good legal protection.

Thus, the AI system for interpreting results of patent evaluation of a patent document characterized by three patent indices has been provided.

While the AI system described above has been illustrated with regard to the three patent indices characterizing Technical Merit, Commercial Value and Legal Strength, it is understood that similar AI systems may be designed for analyzing patent documents characterized by other sets of three patent indices, e.g. the indices described above in the section "Choice of Patent Indices". It is also contemplated that similar principles may be applied for designing AI systems suitable for the analysis of patent documents characterized by more than three patent indices. Alternatively, simpler decision trees may be designed if the number of patent indices is lower, e.g. for interpreting PQ and/or MV of the patent document.

While the AI system described above has been implemented in the form of a decision tree based AI system, it is understood that other types of the AI systems may be also used for analyzing and interpreting patent indices.

It is worth mentioning that the computer program code of the AI system stored in a memory, when executed, may have a dual purpose. It may be used to perform a step of analyzing patent indices in addition to (or instead of) the step of combining patent indices of the methods of embodiments described above. Alternatively, when the AI computer program code is stored in a computer readable memory, it becomes a part of the AI Unit 410 of the PQC 400.

Implementation Versions of the Patent Quality Calculator

There have been two versions of the Patent Quality Calculator implemented in the computer software code, the client-side version and the client-server version.

The client-side version has been written entirely in JavaScript, it loads into a user's browser and if necessary, may be displayed in a separate window on a screen. It does not need any communication with the server, and accordingly there is no waiting between mouse clicks for the user. This version is highly interactive, wherein any changes in the expert's (user) input to the patent sub-indices, i.e. any changes in the position of the active sliding objects (marbles), is immediately reflected in the value of PQ and in the position of the respective marble. The results are shown numerically and graphically.

The client-server version is written partly in JavaScript (mainly the graphical user interface), and partly in Perl (PQ calculation, database handling et al). It needs communication with the server, but the values of the PQ and its respective indices (sub-indices) can be stored in a database for future reference if required, or sent over a network.

Conveniently, the PQC is used on a stand-alone computer and/or in a network environment, e.g. on a corporate Intranet or the Internet. If required, the computer code for executing the methods of the embodiments may be stored in a memory of a computer, or in a product such as a floppy, CD-ROM, DVD or the like.

Preferably, the system for evaluating a patent document comprises a computer, a web site for receiving an input data with regard to the patent indices, and a program executing on this computer to determine the PQ as a function of the patent indices.

Conveniently, a website for evaluating a patent document is provided, including means for logging on to the web site, and a link to the Patent Quality Calculator, causing the PQC to execute as presented as described above.

Modifications to the PQC described above may include other graphic designs for the interface to the Patent Calculator, including, but not limited to, using numerical values for capturing experts' input, and/or a combination of graphical and numerical means for this purpose. For example, additional active and/or passive sliders may be added to the fourteen sliders 510 to 536 shown FIG. 13, such as the active slider for entering the monetary value of the etalon patent, and the passive slider for the monetary value of the patent under consideration calculated in accordance with one of the expressions (1), (9), (14) or (18).

Thus, a computerized system for patent quality and monetary value evaluation, implementing the methods for patent evaluation of the embodiments of the invention, has been provided.

The system for patent quality evaluation has the same advantages as the above-mentioned method, as well as the additional advantages of having a friendly graphical user interface, being conveniently accessible via a corporate Intranet or the Internet, and increasing expert's efficiency. For example, experts make estimations of respective patent indices graphically, by pushing a sliding object along a linear scale, which is highly intuitive and extremely effective, while the numerical expressions of the positions of the sliding objects that are automatically placed at the right end of the scales to help the experts monitor their inputs in real time. The experts are also requested to provide their inputs with regard to the patent indices only, leaving the task of combining the indices into the PQ (or into the indices of a higher layer in the index hierarchy) for the computerized system to perform. As a result, such system is much less prone to errors, provides more consistent results of patent evaluation, and substantially increases the productivity of experts. An automatic analysis and interpretation of patent indices with the aid of the AI system makes the evaluation process even more consistent, reliable and expedient.

System and Method for Forming a Team of Experts

For evaluating a large patent portfolio, an involvement of multiple experts may be required to provide timely evaluation and to cover the necessary areas of expertise.

Beneficially, each expert's contribution would blend seamlessly into the final evaluation of the portfolio as if a single expert conducted the evaluation. Approaching this ideal situation as close as possible would require selecting a team of experts, wherein each member of the team is assigned a role to ensure timely and high quality evaluation of the portfolio.

Figure 20:
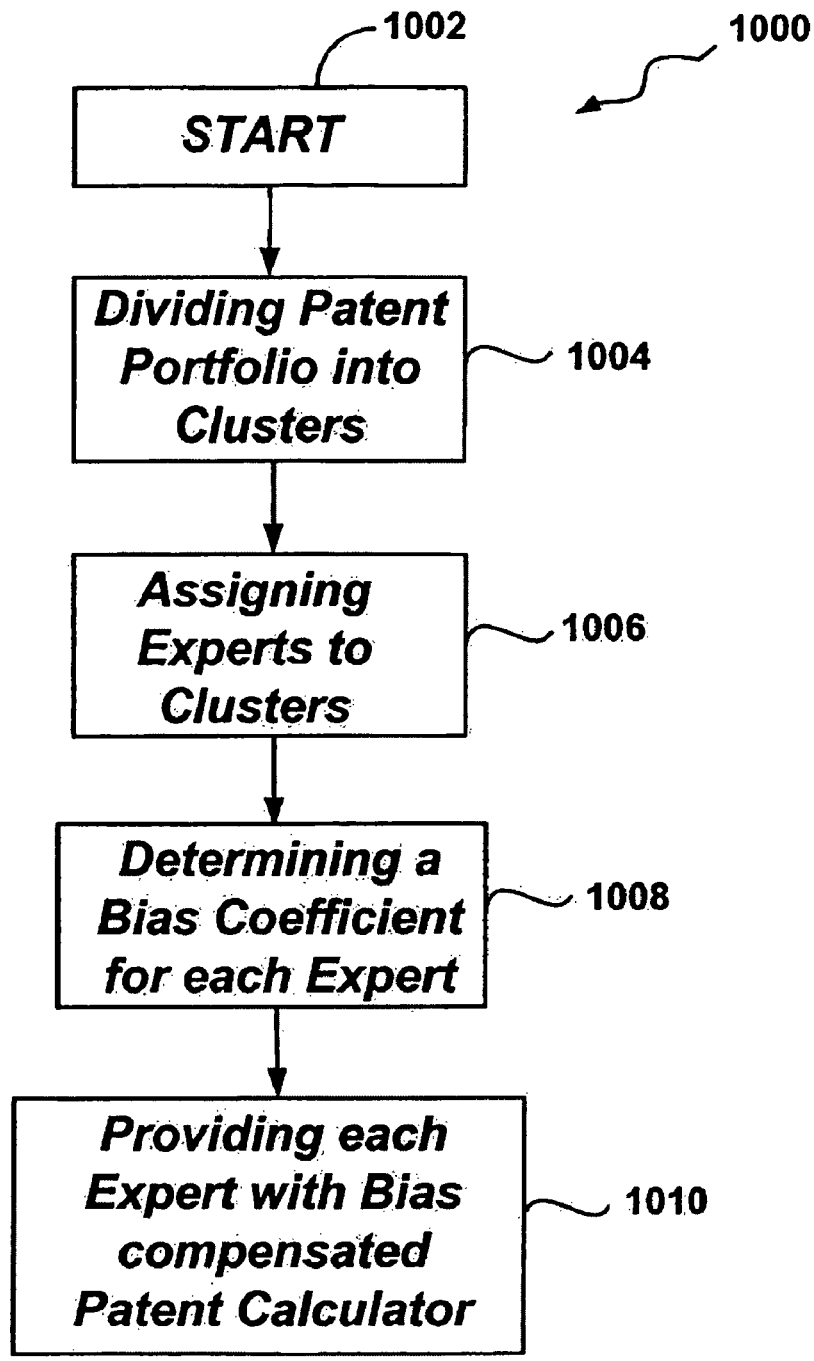
FIG. 20 shows a flow chart illustrating a method for forming a team of experts.

A method for forming a team of experts is illustrated by flowchart 1000 in FIG. 20. It includes the following steps. Upon start (box 1002), the patent portfolio is divided into clusters of patents (box 1004), such that patents in each cluster are sufficiently close to each other by subject matter to fall within the area of expertise of a reasonably qualified expert. Then the required number of experts for each cluster is determined, and the experts with matching expertise are assigned to each cluster (box 1006). In order to provide consistency of evaluation, each expert is calibrated to determine his/her bias coefficient "B" as described previously (box 1008), followed by the step of providing each expert with individualized Patent Quality Calculator, which is configured to compensate for the expert's bias as described earlier (box 1010). Since that moment, the team is considered to be formed and ready to start evaluations.

Figure 21:
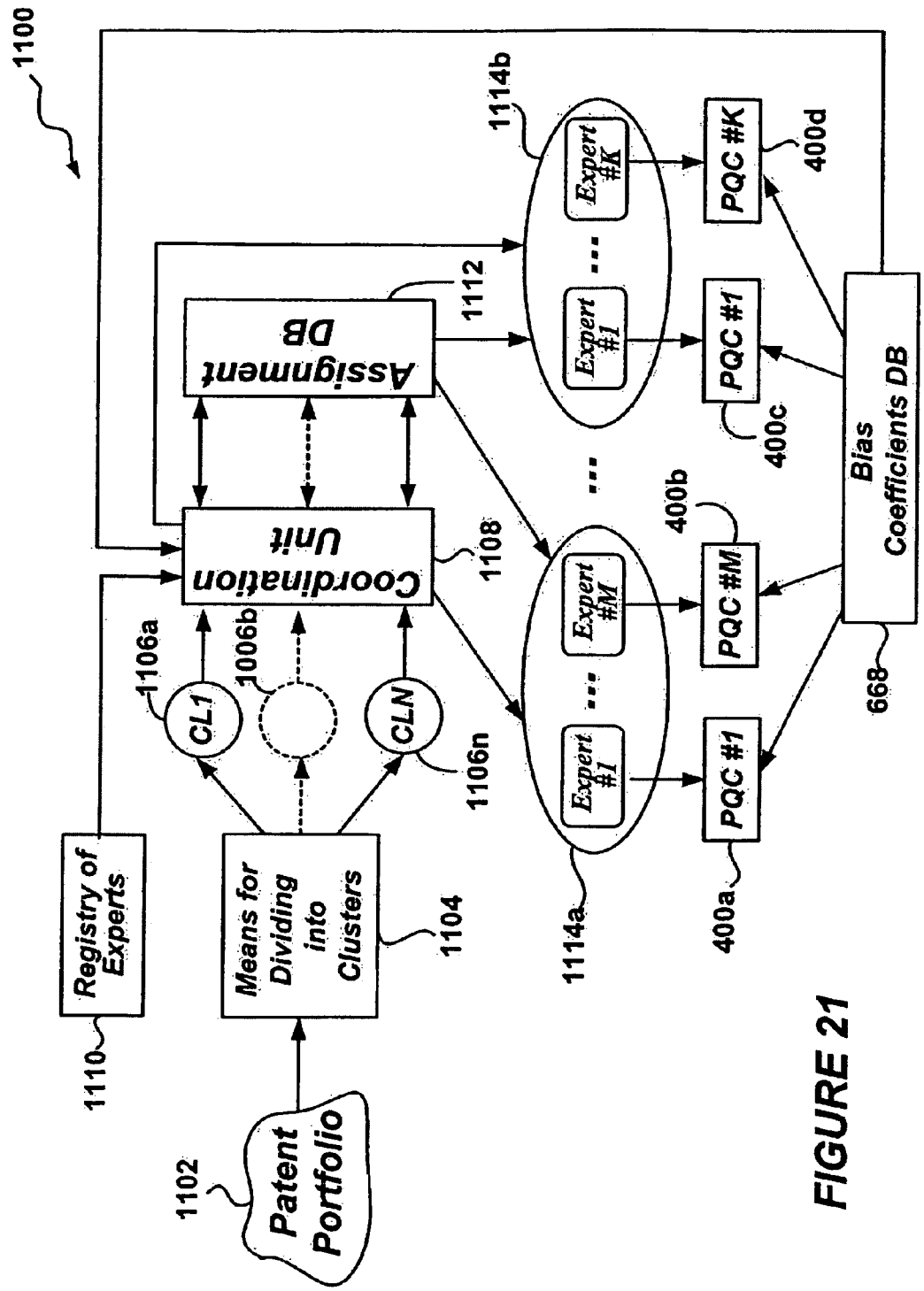
FIG. 21 shows a system for forming a team of experts.

A corresponding system 1100 for forming a team of experts is shown in FIG. 21. It comprises means 1004 for dividing a patent portfolio 1002 into clusters, e.g. automatically sorting the patent portfolio by International classes and/or sub-classes, the clusters being labeled 1106a to 1106n respectively. The clusters of patents 1106a to 1106n are supplied to a Team Coordinator, who has access to a Coordination Unit 1108 and to the Registry of Experts 1110. The Coordination Unit 1008 includes means for dividing designated experts into groups of experts 1114a to 1114b, each group being assigned to a cluster for evaluation patents within the cluster. The Coordination Unit 1008 is linked to an assignment database (the Assignment DB 1112) and to each expert within each group of experts 1114a to 1114b (please note that for simplicity, only links from the Coordination Unit 1108 to the groups of experts 1114a and 1114b are shown instead of multiple links to individual experts). Each expert is also linked to an assignment database (the Assignment DB 1112) to pick one of the available patents for evaluation.

The Coordination Unit 1008 includes means for assigning a patent for evaluation to any expert within a cluster, and means for providing experts with respective Individualized Patent Quality Calculators 400a to 400d, which are similar to the PQC 400 of FIG. 12, except for being bias-corrected according to the experts' personal bias coefficients stored in the Bias Coefficient database 668, thus compensating for the bias introduced by each expert. Thus, a system for forming a team of experts ready to evaluate a patent portfolio has been provided.

Let us consider each step of the method 1000 and operation of the system 1110 in greater detail.

The procedure of patent portfolio evaluation starts with dividing the portfolio into the clusters of patents by subject matter. At this step, the size of the clusters does not matter. The only concern is that a reasonably qualified expert should be able to evaluate any patent in the cluster without the outside help.

When the size of each cluster becomes available, the number of experts is determined, which is required for evaluation of all patents in each cluster in a timely manner. The main concern is to balance the clusters evaluation process by ensuring that each cluster, whatever its size might be, is evaluated in the same time frame as any other cluster. The approximate number of experts can be determined by dividing the number of patents in the cluster on the productivity of the average expert. However, this approximate number may require several adjustments, if we take into account that large and complicated patents require more time and effort to evaluate.

Available experts with the matching expertise and qualifications are assigned to each cluster. If the number of the available experts is insufficient, new experts are brought in to fill the gap.

To ensure consistency of patent portfolio evaluation each expert is tested to determine his/her bias coefficient as described in the sections "CALIBRATION OF AN EXPERT" and "A SYSTEM FOR DETERMINING A BIAS OF AN EXPERT" above.

The next step is to provide each expert with an individualized Patent Quality Calculator, which is configured to compensate for expert's bias as described earlier.

To increase objectivity of evaluation, the Patent Quality Calculator 400 provided for experts is modified to exclude all Passive Sliders 512, 522 and 530, including the Patent Quality slider 510 from expert's view. This way experts are less likely to be overwhelmed by a number of patents of lower or higher quality they had already evaluated, which otherwise could influence their opinions.

Thus, a system and method for forming a team of experts, suitable for evaluating a patent portfolio have been provided.

Patent Portfolio Quality Calculator (PPQC)

Figure 22:
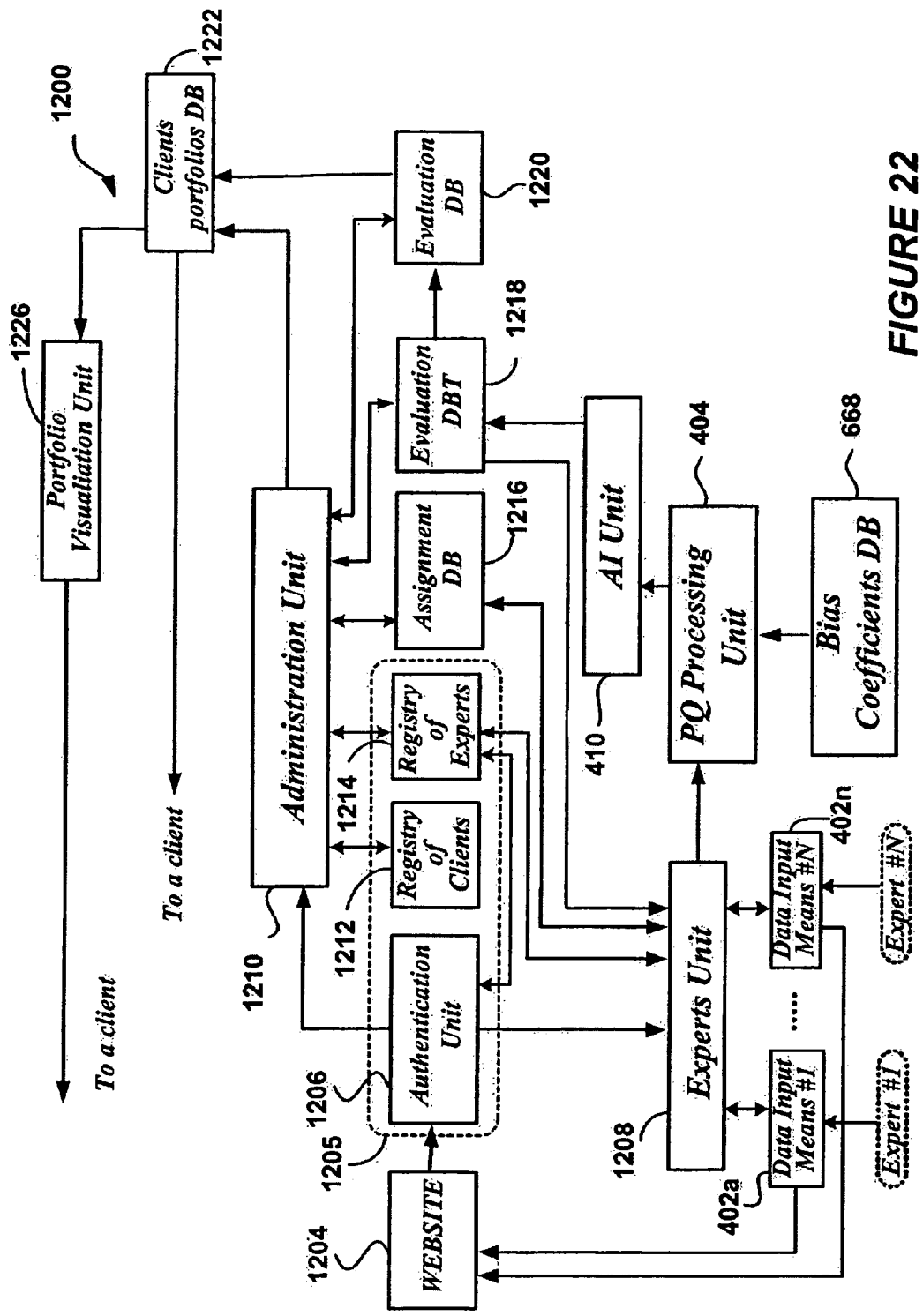
FIG. 22 shows a system for evaluating a patent portfolio (Patent Portfolio Quality Calculator)

To aid the formed team of expert to provide timely, accurate and consistent evaluation of the patent portfolio, a system for patent portfolio evaluation has been designed to be referred to as the Patent Portfolio Quality Calculator 1200. FIG. 22 shows units of the Patent Portfolio Quality Calculator (PPQC) 1200 and their relations. It comprises means for determining a bias of each expert as described above, and means for evaluating patent documents in the patent portfolio by said experts according to an evaluation method, which is bias corrected for each expert so that to compensate for the bias associated with each of said experts.

The PPQC 1200 comprises of two parts, a server side and a client side, the client side enables experts to provide their opinions electronically and enables clients to have access to the results of evaluation, while the server side provides all the processing required for patent evaluation. The system administrator has control over the assignments flow and experts workload. The PPQC 1200 helps the administrator and experts to interact over a network in an orderly and organized manner.

In more detail, the PPQC 1200 comprises a Data Input Means 402a to 402n for logging onto a website 1204 by Experts #1 to #N respectively, the website comprising a link to a Login Unit 1205, including an Authentication unit 1206 and respective Registries of Clients and Experts 1212 and 1214, the Login unit 1205 providing authentication of users and their access to the PPQC 1200. The PPQC further comprises an Experts Unit 1208, which provides experts with the means necessary to evaluate patents, and an Administration Unit 1210, which provides means for managing experts' evaluation activities and keeping track of various stages of the evaluation process, both the Experts Unit 1206 and the Administration Unit 1210 having access through the Authentication Unit 1206. The Experts Unit 1208 provides each expert with the following means:

- means for getting acquainted with the current list of patents assigned for review by the administrator;
- means for choosing one of the available patents for evaluation;
- means for filling-in the patent evaluation template until it is ready for submission;
- means for saving the patent evaluation (finished or not) in a database for further consideration.

The Administration Unit 1210 allows users with administrative privileges to manage experts effectively, to keep track of various stages of the evaluation process and to ensure timely delivery of completed evaluations to a user accessible database. The Administration Unit 1210 provides an administrator with the following means:

- means for getting acquainted with the current list of active experts, and the current list of patents under evaluation and their status;
- means for assigning a patent for evaluation to one of the experts; means for checking a workload of any expert;
- means for checking patents assigned for evaluation to any given expert and their status;
- means for checking status of any patent evaluation;
- means for reviewing any patent evaluation whether finished or not;
- means for forwarding a patent evaluation, when it is ready, to the user accessible database.

Each expert has access to an individualized PQC 400, which is bias corrected to compensate for the bias of the expert. The individualized PQC 400 comprises one of the Data Input Means 402a to 402n, a PQ Processing Unit 404 receiving a bias coefficient of an expert from the Bias Coefficient database (DB) 668 and performing calculations of the PQ as described above, the AI Unit 410 of FIG. 12, and a GUI 408 (not shown).

The PPQC 1200 includes the following databases: a Registry of Clients 1212, a Registry of Experts 1214, an Assignment database (DB) 1216, an Evaluation DBT 1218, an Evaluation DB 1220, and a Client Portfolios DB 1222.

The Registry of Clients 1212 and the Registry of Experts 1214 databases contain records regarding clients and experts respectively, who are allowed to use the PPQC 1200, their passwords and privileges, e.g. an administrator or an expert.

The Registry of Clients 1212 and the Registry of Experts 1214 are accessible by the administrator through the Administration Unit 1210.

The Assignment database 1216 contains lists of patents assigned by the administrator to each expert for evaluation, and status of the assigned patents, e.g. waiting for evaluation, being worked on, and ready for submission. This database is accessible by experts through the Experts Unit 1208, and by the administrator through the Administration Unit 1210.

The Evaluation DBT 1218 contains patent evaluations still being worked on, and those considered by experts as ready, but still to be approved by the administrator. It is accessible by the experts through the Experts Unit and through the individualized PQC 400 (through the PQ Processing Unit 404 and the AI Unit 410), and by the administrator through the Administration Unit 1210.

The Evaluation DB 1220 is the main database where final versions of individual patent evaluations are stored, waiting for a client's request. Optionally, this database is accessible by the registered users of the system listed in the Registry of Clients 1212 and Registry of Experts 1214.

The Client Portfolios DB 1222 is the database containing evaluation of patent portfolios, which are formed from selected individual patent evaluations. This database is accessible by the administrator through the Administration Unit 1210, and by clients listed in the Registry of Clients 1212.

It is contemplated that the number of databases may be reduced, if required, provided the databases are suitable for storing the necessary information. For example, the Registry of Clients 1212 and the Registry of Experts 1214 may be stored in one database. Similarly, the Evaluation DBT 1218, the Evaluation DB 1220, the Clients portfolios DB 1222 and optionally the Assignment DB 1216 may form another database. Alternatively, additional databases may be added if needed. For example, separate databases for storing results of evaluation of patent portfolios of different clients may be introduced instead of or in addition to the Clients Portfolios DB 1222.

The PPQC 1200 further includes a Portfolio Visualization Unit 1226, which provides visualization of the results of the portfolio review supplied from the Clients portfolios DB 1222.

The PPQC 1200 operates as follows. An expert (e.g. any of the Experts #1 to #N) accesses the PPQC 1200 through the web site 1204, where he/she goes through the authentication procedure via the Authentication Unit 121 and verification whether the expert is registered in the Registry of Experts 1214. Once the access to the PPQC has been granted, the expert gets access to the assignment DB 1216 through the Experts Unit 1208, where he/she can look through the list of current patents assigned to him/her for evaluation by the administrator. If the list of assignments is not empty, the expert selects a patent for evaluation and starts populating the evaluation template (which will be illustrated in detail below in FIG. 25). When the expert is requested to provide his/her input with regard to a number of patent indices required for determining the Patent Quality of the patent, the expert is provided with the individualized Patent Quality Calculator 400 which is bias corrected to compensate for the bias of the expert. As it has been mentioned above, the individualized PQC 400 comprises one of the data Input Means #1 to #N, the PQ Processing Unit 404 that takes into account the Bias Coefficient for the expert from the Bias Coefficient DB 668, the AI Unit 410, and a GUI 408 (not shown in FIG. 22). The results of the patent evaluation, whether finished or not, are stored in the Evaluation DBT 1218, which is available to the administrator through the Administration Unit 1210. The administrator looks through the evaluations submitted to the Evaluation DBT, and those of them that are completed and approved by the Administrator, are moved to the Evaluation DB 1220 for storing evaluations belonging to different clients. Conveniently, the evaluation of the patent portfolio belonging to a particular client (which is sub-set of the evaluations from the Evaluation DB 1220) is stored in a separate Client Portfolio Database (DB) 1222, accessible by the respective client through the web site 1204. Alternatively, the results of the patent portfolio evaluation may be sent to the client via a network, e.g. via e-mail. If needed, the analysis of the client's portfolio is further enhanced by the Portfolio Visualization Unit 1226, where the results of the portfolio evaluation are presented in a graphical and/or color coded form. The details of operation of the Portfolio Visualization Unit 1226 will be described in detail below.

Figure 23:
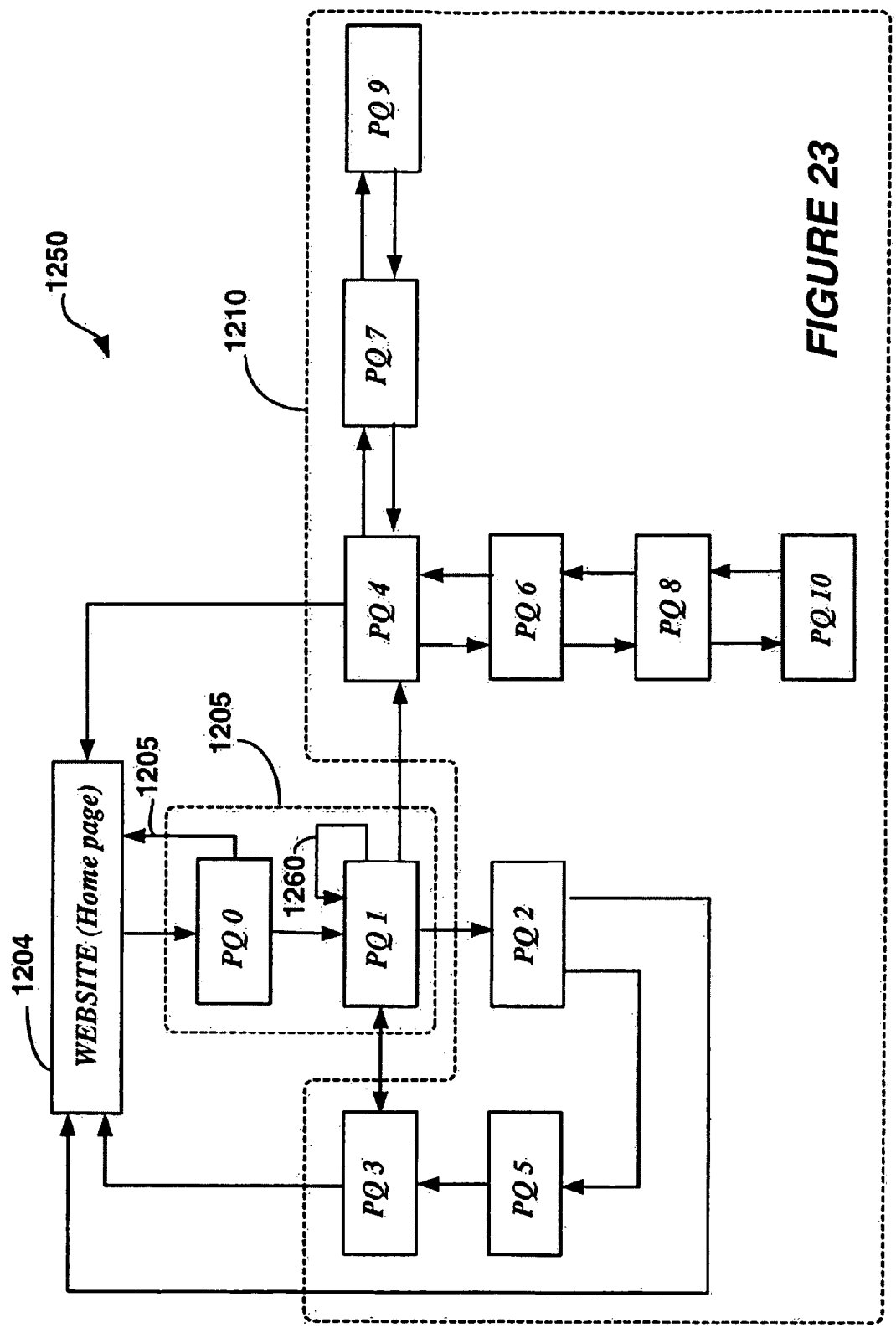
FIG. 23 shows the structure of the Authentication Unit, the Administration Unit, the Experts Unit, and the PQ Processing Unit of the Patent Portfolio Quality Calculator of FIG. 22 in more detail.

A flow chart 1250 shown in FIG. 23 illustrates the structure and operation of the Authentication Unit 1205, the Administration Unit 1210, the Experts Unit 1208, and the PQ Processing Unit 404 of FIG. 22 in more detail.

As soon as the PPQC 1200 is invoked from the web site 1204 through a HTML-link, a user's request is directed to the "PQ 0" script. The purpose of the script is to open a new session and to register the user in order the PPQC 1200 could recognize the user during subsequent service requests. This ensures uninterrupted communication with the user in an orderly manner for the session duration. The script checks the input data validity and normally sends the user an invitation to identify himself through a Login Name and Password screen. If something is wrong, the user is redirected back to the calling web site 1204 as shown by reference numeral 1259. The Login and Password information is processed by another block "PQ 1".

The "PQ 1" block checks that the user is permitted to use the PPQC 1200, determines the level of his access privileges (e.g. an administrator, an expert or a client), and determines whether the list of assignments is not empty. There are four possible outcomes of the PQ 1 operation:

1. The user is not permitted to the PPQC 1200 (wrong password or unknown login name). In this case, a new invitation to provide the login information is sent to the user, giving him a chance to enter correct login information. The PQ 1 will process new data, if any. This is illustrated by a loop 1260 in FIG. 23.

2. The user is permitted to the PPQC 1200 and identified as an expert, but there are no assignments waiting for him to work on. In this case, the "PQ 1" block informs the user about the current situation and asks the user to confirm his understanding of the situation. The confirmation is directed for processing to block "PQ 3".

3. The user is permitted to the system, identified as an expert, and there is at least one assignment (a patent evaluation) waiting for him to work on. If the user has already started to work on a patent evaluation but not finished it yet, this and only this assignment will be available to this expert. No other assignments, if any, will be shown to the user to choose from. Patent evaluations already submitted to the administrator, when they are ready, will also not be shown to the expert, because there is no need to work upon them. If all assignments are new, the whole list of them will be shown to the expert to choose from. The "PQ 2" block will process the expert's choice.

4. The user is permitted to the system and identified as an administrator. The system quickly gathers the current statistics, and shows it to the administrator in an aggregated form. For example, the "PQ 1" block shows how many patent evaluations are ready, how many of patent evaluations are in progress, and how many are waiting to be worked upon. The "PQ 1" waits for an indication from the administrator if he/she would like to know certain statistics in more detail. The administrator can request more information about the status of the patent evaluations assigned to a particular expert, or more information about a particular patent evaluation regardless to which expert it has been assigned. The block "PQ 4" will process the administration choice.

Block "PQ 3" just redirects the user to the Web site 1204 or back to the block "PQ 1".

The purpose of the block "PQ 2" is to generate a template of a particular patent evaluation requested by an expert. First, it looks into the Evaluation DBT 1218 trying to find a corresponding record. If the record is found, all available information is used to fill in an empty template. If not, the empty template is prepared. This template (empty or not) is sent to the expert to work on it further. The filled-in template is to be processed by the block "PQ 5".

The block "PQ 5" accepts the evaluation template, partially or completely filled-in by the expert. This is where the input data entered by the expert is analyzed, and patent indices and patent quality itself are calculated. All the data, received from the expert and calculated by the individualized PQC 400 are put in the database Evaluation DBT 1218. Then block "PQ 5" looks through the list of assignments, trying to determine whether there is something for the expert to further work on. If the list of assignments is empty, the user is informed about the situation and asked to confirm his understanding of it. The confirmation is directed to the block "PQ 3" for processing. If the list of assignments is not empty, the block "PQ 5" displays the list and waits for the expert to choose a new assignment. The block "PQ 3" will process the expert's choice again, and the next cycle "PQ 1"-"PQ 2"-"PQ 5"-"PQ 3" starts all over again until either the list of assignments becomes empty, or the expert quits from the evaluation process.

The block "PQ 4" gathers a detailed statistics regarding the evaluation process to the administrator, i.e. either a list of available experts and their current workload, or a list of patents accepted for evaluation by experts. In either case, the list is sent to the administrator to choose from, but different scripts will process this list. The block "PQ 7" processes the list of patents, and the block "PQ 6" processes the list of experts.

The block "PQ 7" looks in the Evaluation DBT 1218 database for a patent evaluation template specified by the administrator, generates a patent evaluation (even if data are incomplete) and sends it to the administrator. The administrator's response is to be processed by the block "PQ 9". The PPQC 1200 distinguishes between ready and not-finished-yet evaluations, and limits the choice of administrator actions accordingly. If the evaluation is ready, the PPQC 1200 allows the administrator to transfer the evaluation to the client accessible database, if the administrator decides so. If it is not finished yet, the administrator does not have such an option.

The block "PQ 9" does one of the two actions depending on the administrator's instructions:

1. It looks whether the administrator considers the current patent review to be ready for submission to the client accessible database. If yes, the block "PQ 9" moves the evaluation there.

2. It prepares an updated list of patents (i.e. taking into account new developments) and sends it to the administrator to choose from.

The expert's choice is processed again by the block "PQ 7", and the next cycle "PQ 4"-"PQ 7"-"PQ 9"-"PQ 7"-"PQ 4"

starts all over again until either the list of assignments becomes empty, or the administrator bails out of the reviewing the situation with patents.

The block "PQ 6" shows to the administrator the list of experts to choose from. When the administrator decides which expert he wants to review, the administrator's choice is sent to the block "PQ 8" for processing.

Blocks "PQ 8" and "PQ 10" perform essentially the same job as blocks "PQ 7" and "PQ 9" respectively, but taking into account only patents assigned to a particular expert for evaluation, as opposed to all available patents.

Figure 24A:
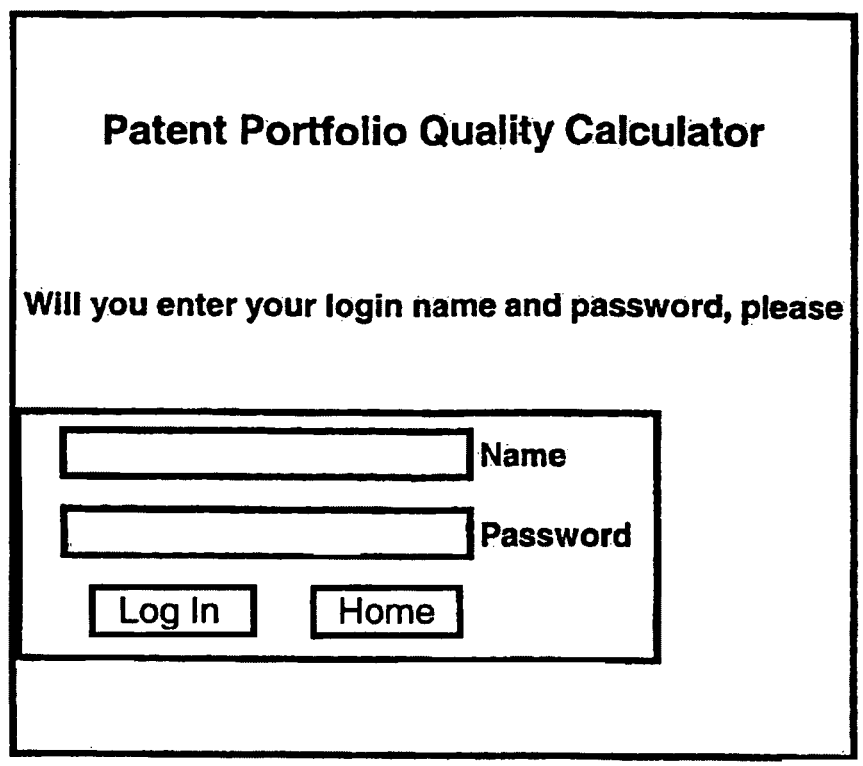
FIGS. 24A to 24F show various screens of the Patent Portfolio Quality Calculator of FIG. 22.
Figure 24B:
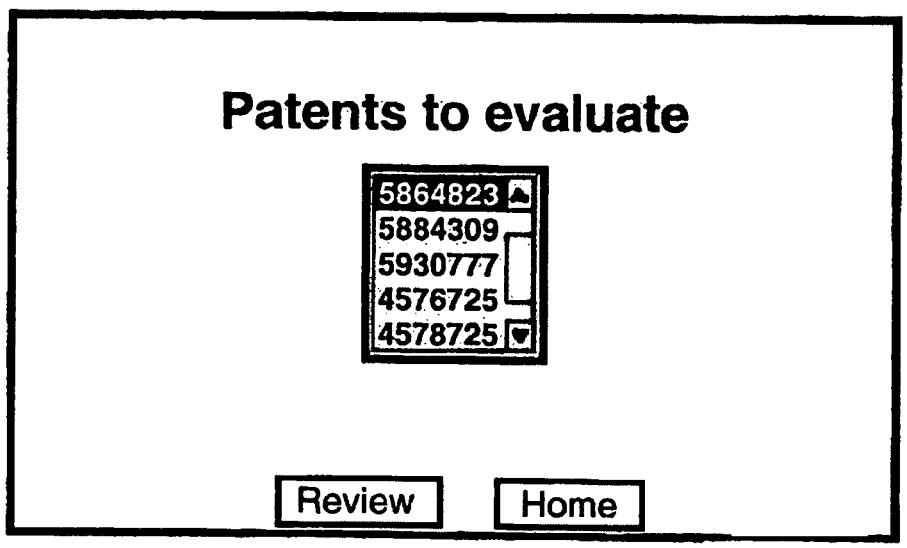
Figure 24C:
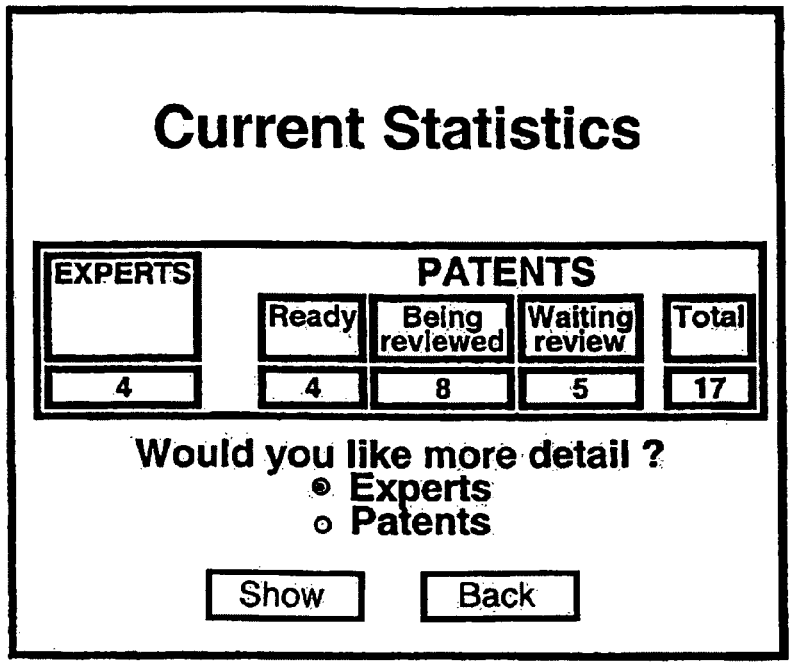
Figure 24D:
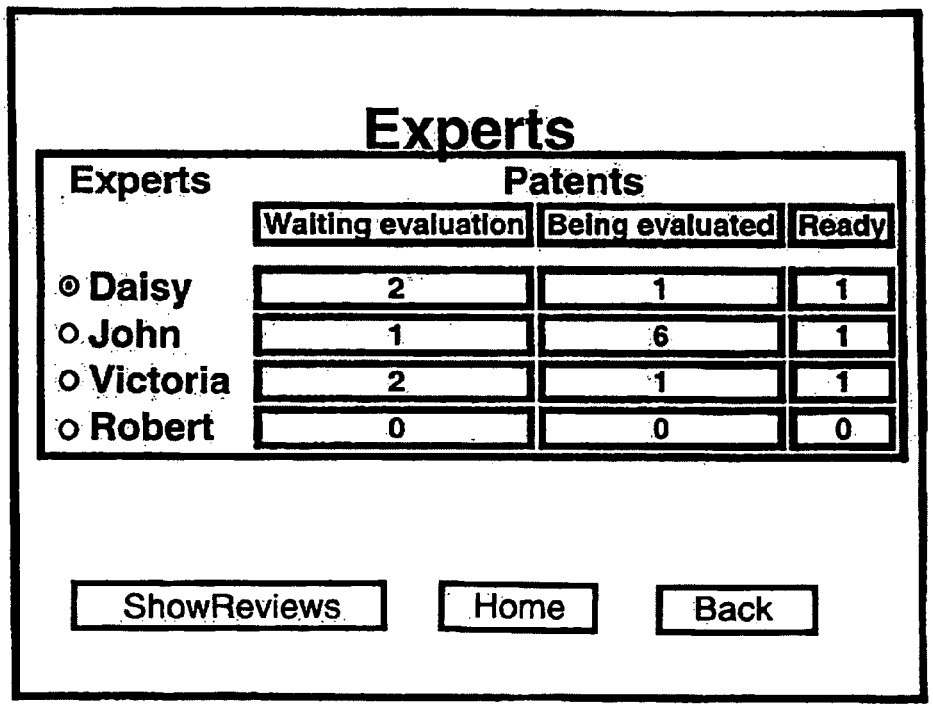
Figure 24E:
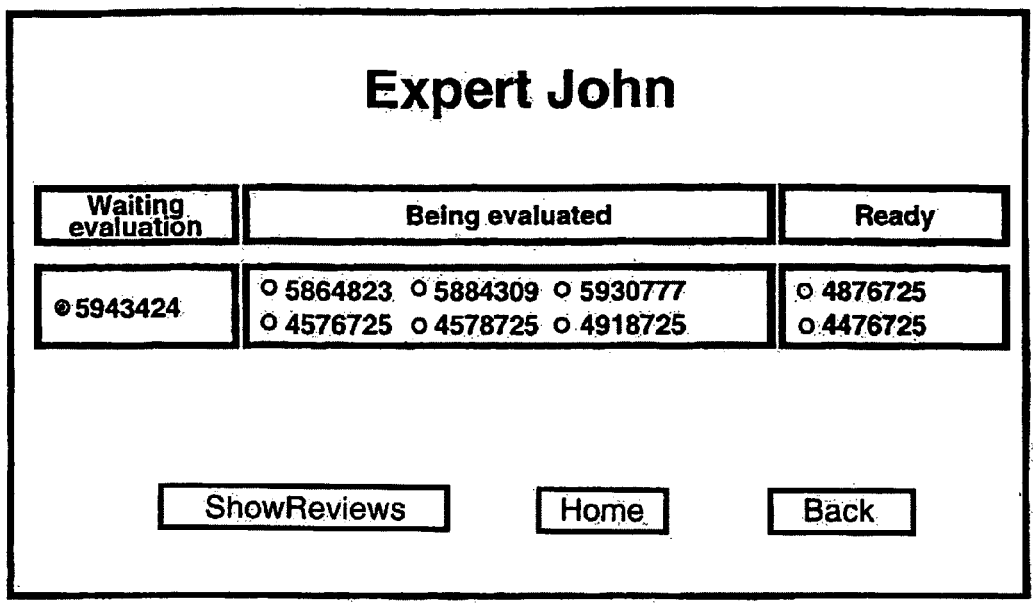
Figure 24F:
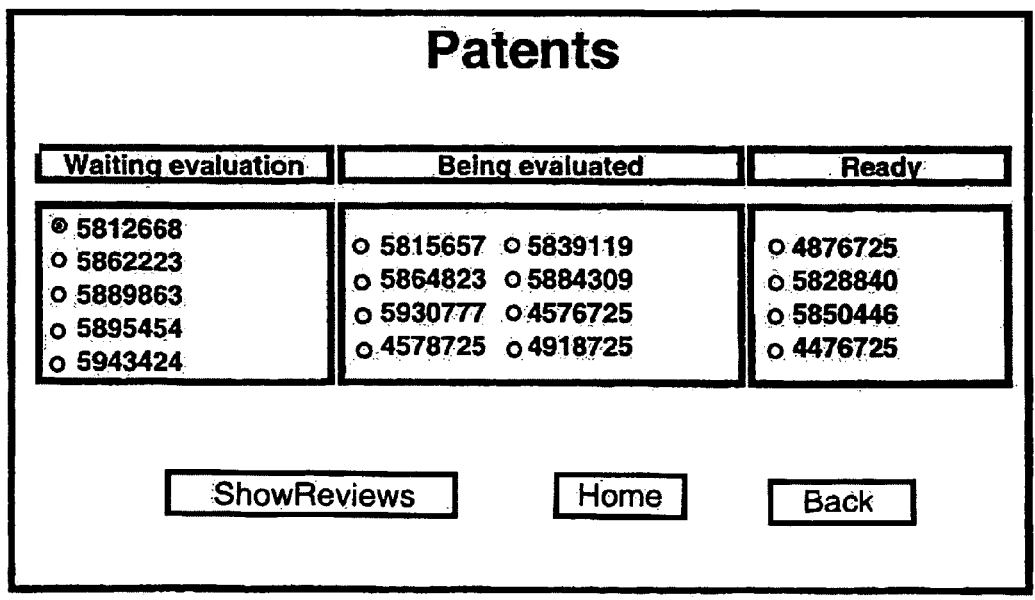

FIGS. 24A to 24F illustrate various screens of the Patent Portfolio Calculator 1200 of FIG. 22. FIG. 24A shows a Login screen, FIG. 24B shows a list of patents available for evaluation to a particular expert, FIG. 24C shows a Current statistics on how many experts are involved in the evaluation process, and how many patents are at various stages of the evaluation process, i.e. ready, being evaluated, waiting for evaluation, and the total number of patents to be evaluated. FIG. 24D shows a more detailed statistics for various experts and their assignments, FIG. 24E shows a detailed workload for a selected expert, i.e. how many patents have been already evaluated by this expert, how may patents are being evaluated and waiting for evaluation by this expert. FIG. 24F shows a detailed aggregated statistics by patents evaluated by all currently involved experts, and patent status, i.e. how many patents in total have been evaluated by all experts, how many are being evaluated by all currently involved experts and how many are waiting to be evaluated.

Figure 25B:
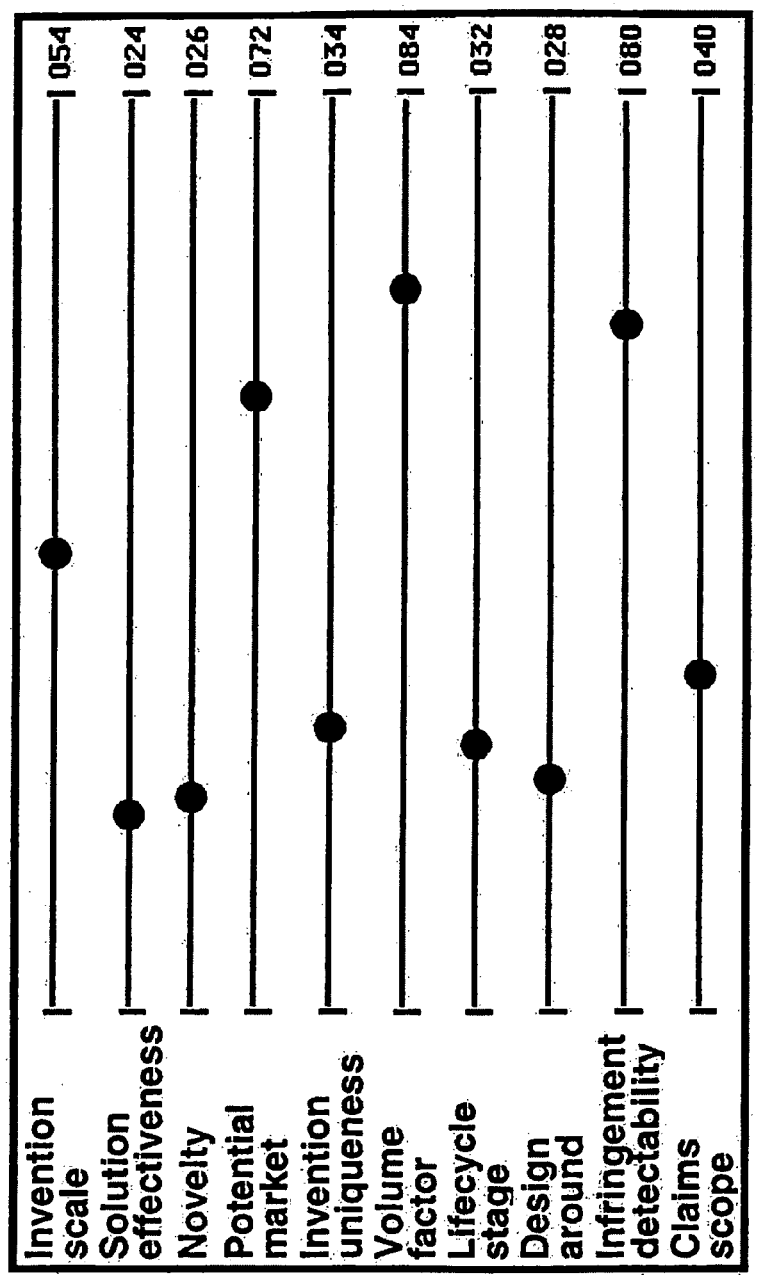

Diagrams 1300, 1310 and 1320 on FIGS. 25A to 25C show respectively an upper section, a middle section and a lower section of a sample patent evaluation (an evaluation template) of a patent document as it is presented to the administrator, the middle section 1310 including active sliders of the Patent Quality Calculator 400 of FIG. 12, which is bias corrected to the expert evaluating the patent, and the GUI 408 of FIG. 13. The evaluation template includes a number of input boxes, text areas and sliders for patent indices to be filled in by experts. When the patent evaluation, which is partially or completely filled in, is presented to the administrator, the positions of marbles on all sliders of the middle section 1310 are frozen so that the administrator can review them but not change. In contrast, when the evaluation template is presented to an expert, the middle section presents a fully functioning PQC 400. The lower section 1320 of the evaluation template, as it is presented to the administrator, shows a conclusion (either produced by an expert, and/or generated by the AI Unit 410 as described above) along with the value of the PQ, and values of the TM, CV and LS patent indices.

When the evaluation template is presented to an expert, the lower portion of the template is slightly modified so that to exclude the results displayed on the active sliders of the PQC 400, i.e. to exclude the combined indices TM, CV and LS and the final value of the PQ, in order not to influence experts' opinion unnecessary. This ensures more consistency in evaluation of patents. A modified "Conclusion" box 1330 of the lower section 1320 of the patent evaluation as it is presented to an expert is shown in FIG. 25D.

Thus, a method and system for patent portfolio evaluation have been provided.

Visualization of the Patent Quality of an Individual Patent and of a Patent Portfolio The numerical value of the Patent Quality, coupled with conclusions provided by the AI Unit 410 gives users valuable information for making an informed decision regarding the patent under evaluation. However, it requires a certain amount of time and effort to get familiar with this information. Alternatively, for a preliminary familiarization with the results of the patent evaluation, i.e. just to have a general idea about quality of the patent, it might be enough to take a glance at the Patent Quality slider 510 of the GUI 408 to note the position of the marble on the scale 510b.

However, when multiple patents have to be evaluated quickly, this method becomes inconvenient as the number of patents grows. For example, when looking through the catalog of patents to select a patent for a detailed consideration, there is just not enough available screen space to display the Patent Quality scale against each item in the catalog.

Accordingly, there is a need for a simple, quick and virtually effortless way to get a general idea about quality of an individual patent, a group of patents, or entire patent portfolio.

To solve this problem, a number of graphical representations of the results of a patent evaluation have been developed. The Portfolio Visualization Unit 1226 analyzes the evaluation results for a patent portfolio and presents them in a graphical form for easier comprehension and familiarization with the evaluation results.

Figure 26A:
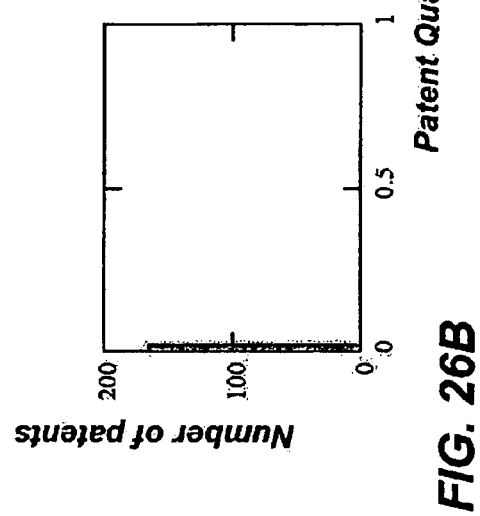
FIGS. 26A to 26D show one form of visualization representation of the results of patent portfolio evaluation for an ideal, useless, low quality and high quality patent portfolios respectively.
Figure 26B:
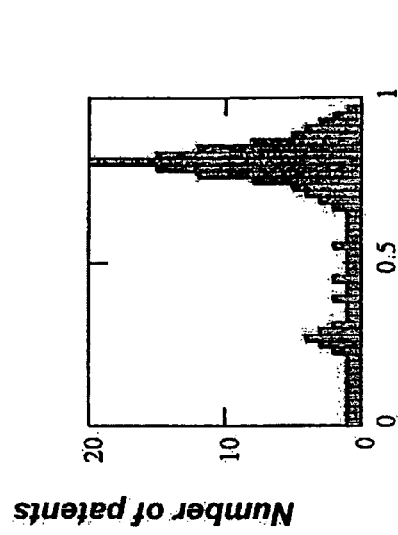

In one form of graphical representation, the number of patents having substantially the same Patent Quality value are determined and then depicted in the form of a bar in a bar graph. An ideal patent portfolio would contain only patents with Patent Quality equal to 1, while a completely useless patent portfolio would have only patents whose value is equal or close to zero. The bar graphs corresponding to these two extreme situations are shown in FIGS. 26A and 26B for the patent portfolio including 164 patents.

Figure 26C:
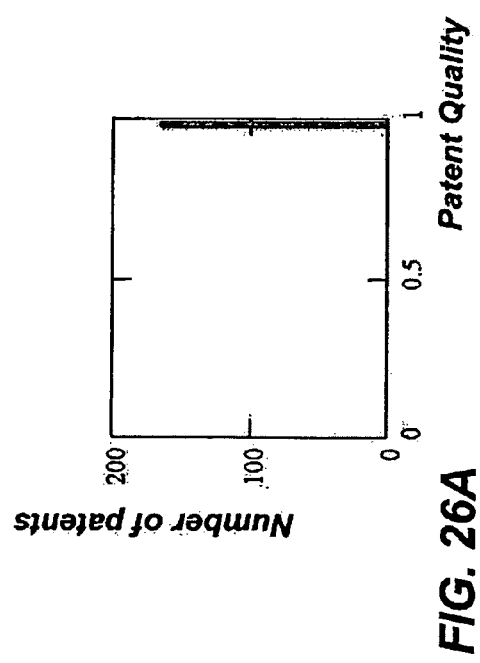
Figure 26D:
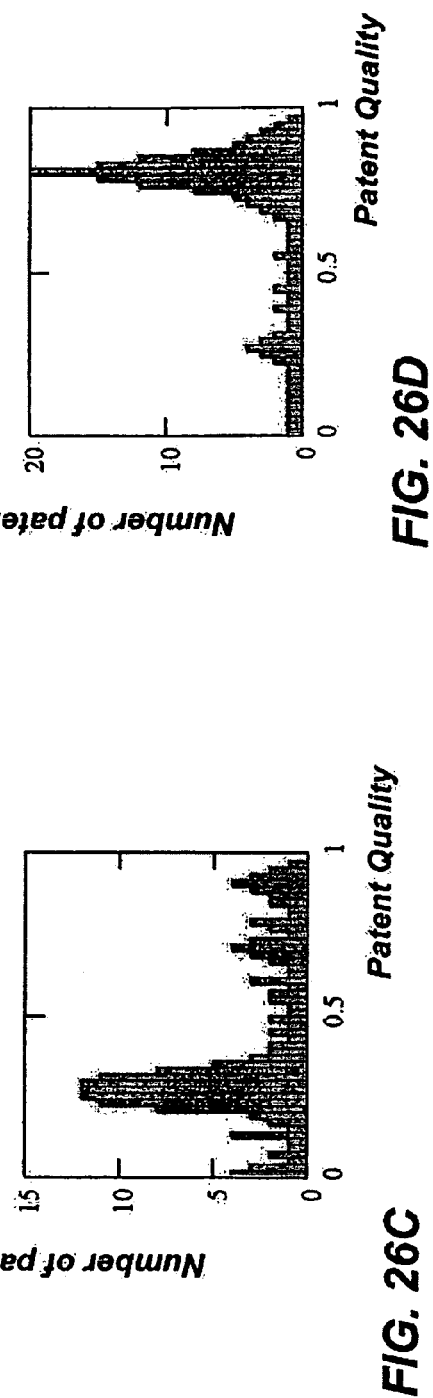

In real life situations, the graph bars illustrating patent portfolios may and will look differently, including patents distributed over the whole range of the Patent Quality index variations. For example, the bars graphs shown in FIGS. 26C and 26D illustrate patent portfolios of low quality and high quality respectively. The patent portfolio of FIG. 26C contains relatively large proportion of low quality patents, whereas the bulk of the patents of the patent portfolio on FIG. 26D concentrates on the high end of the patent quality scale. It means that the patent portfolio of FIG. 26C is of lower quality than the patent portfolio of FIG. 26D.

Thus, the shape of the corresponding bar graph allows to estimate the quality of the patent portfolio visually and quickly.

Numerically, the Patent Portfolio Quality (PPQ) can be calculated using the following formula:

$$PPQ = \frac{n_1 \cdot PQ_1 + n_2 \cdot PQ_2 + \ldots n_N \cdot PQ_N}{N} \quad (40)$$

where $n_i$—total number of patents with Patent Quality $PQ_i$; $i=1, \ldots, N$; N—total number of patents in the patent portfolio.

The monetary value of the portfolio (MVPP) is the sum of the monetary values of individual patents, determined according to the formula (18):

$$MVPP = \sum_{j=1}^{M} \sum_{i=1}^{N_j} MVCP_i \cdot \frac{1-B_j}{-2 \cdot B_j + (1+B_j) \cdot \left(\frac{K_1}{x_{1i}} + \frac{K_2}{x_{2i}} + \ldots + \frac{K_n}{x_{ni}}\right)} \quad (41)$$

where M—number of experts on the team; $N_j$—number of patents evaluated by the j-th expert; $MVCP_i$—monetary value of the i-th Etalon Patent; $B_j$—bias coefficient of the j-th expert; $x_{ni}$—numerical evaluation of the n-th feature of the i-th patent.

In another form of graphical representation of the results of a patent portfolio evaluation, for patents characterized by three patent indices or less, e.g. as described in the section "CHOICE OF PATENT INDICES" above, we introduce a system of coordinates, with the number of axes being equal to the number of patent indices. Each patent index is associated with one of the axes so that a geometrical point with coordinates equal to the numerical values of the corresponding patent indices visually represents the quality of the patent. All points corresponding to all possible combinations of the patent indices form a square, if two Patent Indices characterize the patent, or a cube, if three patent indices are involved. The position of the point within the square or cube alone provides valuable information about quality of the patent. For example, in the case of the square formed by patent indices of Commercial Value and Legal Strength similar to that shown in FIG. 17A, the point in the vicinity of the upper right corner would represent a high quality patent. Repeating the procedure described above for all the patents in the patent portfolio, we get a number of points scattered around a square (or a cube), possibly non-uniformly, i.e. the average density of the points may differ from place to place. These differences in the patent's density may form a certain pattern, which we will refer to as the patent portfolio structure. For example, three patent portfolios 1500, 1510 and 1520, depicted in FIGS. 27A, 27B and 27C respectively, have distinct patent portfolio structures that have been made very simple, for illustrative purposes, and represent a high quality, average quality, and low quality portfolios respectively. In real life situations, a patent portfolio structure may not necessarily be that distinct and transparent.

Thus, in this form of graphical representation of a patent or a patent portfolio a position of the point in the patent indices system of coordinates, or a shape and a pattern formed by multiple patent points in the respective system of coordinates provides visualization of the quality of a patent or a patent portfolio.

Color Coding of the Patent Quality

In yet another form of graphical representation of the results of a patent evaluation, we introduce color coding of patents, wherein colors are in the correspondence with the quality of the patents.

Conveniently, a visible part of the light spectrum is used to visually represent the Patent Quality so that, e.g. low quality patents are associated with different shades of the purple color, whereas high quality patents are associated with different shades of the red color. Accordingly, average quality patents will be assigned different shades of blue, green and yellow colors.

Assuming that the visible part of the spectrum is occupying a wavelength range of $[\lambda_{min}, \lambda_{max}]$, and the Patent Quality varies in the range of $[PQ_{min}, PQ_{max}]$, the formula for the wavelength $\lambda_0$ corresponding to a specific value of the Patent Quality $PQ_0$ is as follows:

$$\lambda_0 = \lambda_{min} + \frac{\lambda_{max} - \lambda_{min}}{PQ_{max} - PQ_{min}} \cdot (PQ_0 - PQ_{min}) \quad (42)$$

Once the wavelength $\lambda_0$ corresponding to the Patent Quality $PQ_0$ of a selected patent has been determined, the corresponding color label is generated to graphically display the Patent Quality of the patent to a user. The label may be generated on a computer screen of a computer, e.g. the computer storing the PQC 400 in its memory, and/or the label may be printed on paper by using a general purpose printer, or a specialized label printer, e.g. QLS-8100 XE manufactured by QuickLabel Systems Inc., or printed on any other media, e.g. to be affixed to a paper folder. Conveniently, the PQC 400 is connected to the label printer and additionally programmed so that to provide correspondence between the PQ and the color, e.g. in accordance with the expression (36). Within the reasonable limits, the size and shape of the label may greatly vary as long as they allow a user to grasp the color of the label easily. In practical terms, the size of the label may vary from a few millimeters to a several decimeters or larger, e.g. on posters or booth presentations at trade shows etc. In the computer catalog example discussed above, it is hardly a problem to find several millimeters of the screen space to place such color labels against respective database records.

While the correspondence between the quality of the patent and its color has been determined by the expression (42), it is understood that other arrangements between the Patent Quality value and the color are also possible. For example, the color coding may be done in a reverse order compared to the expression (42), wherein low quality patents are color coded with different shades of the red color, and high quality patents will correspond to different shades of the purple color.

Figure 27A:
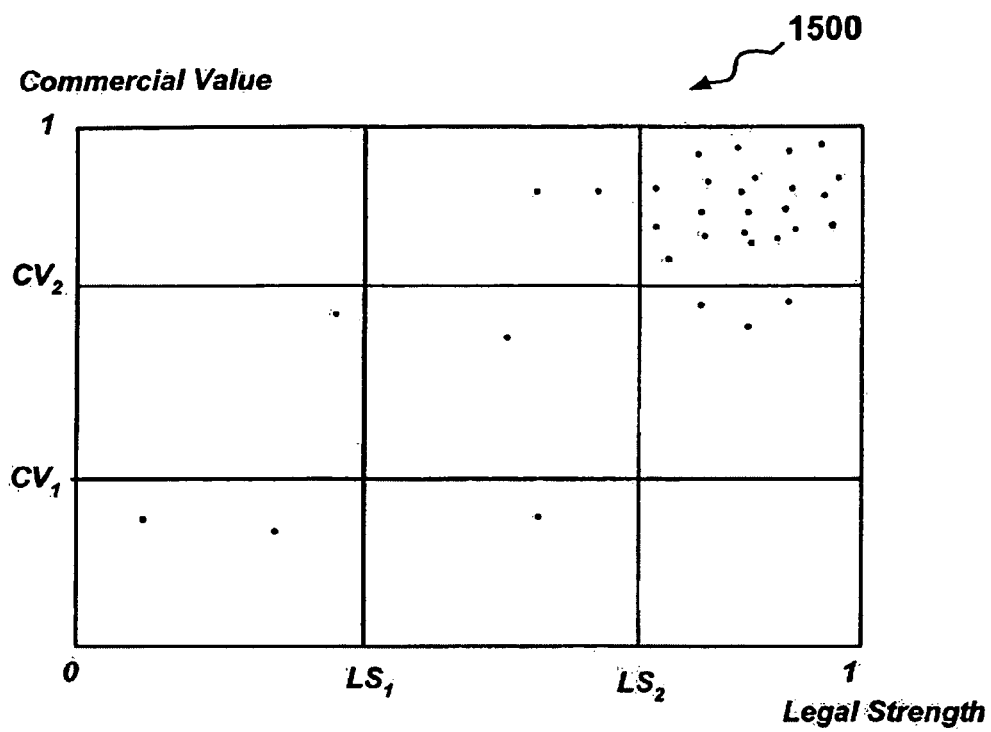
FIGS. 27A to 27C show another form of visualization representation of the results of patent portfolio evaluation for a high quality, average quality and low quality patent portfolios respectively.
Figure 27B:
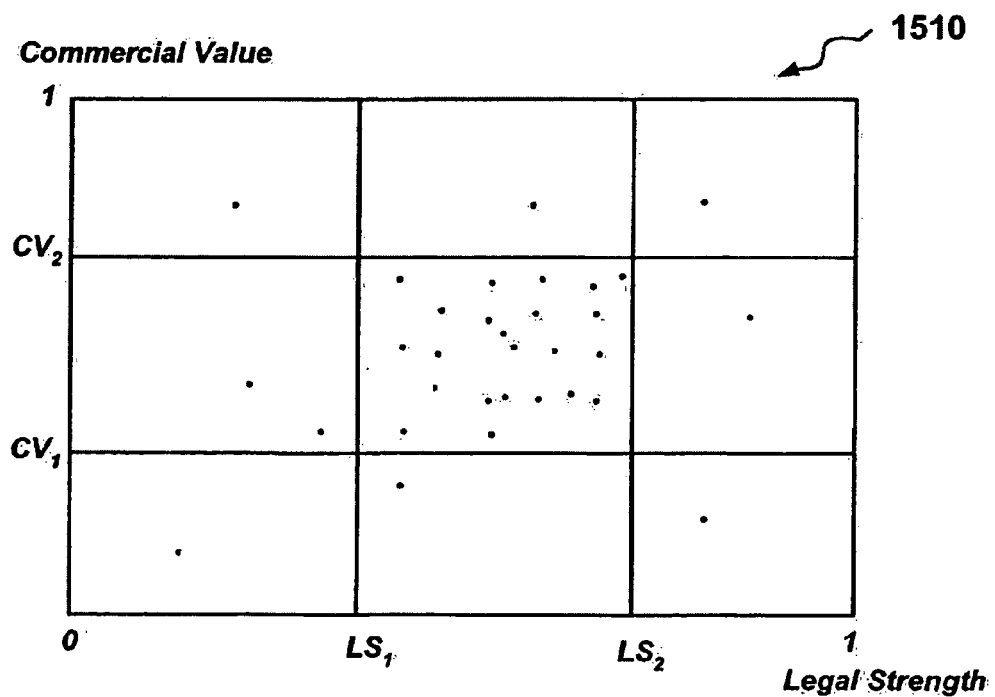
Figure 27C:
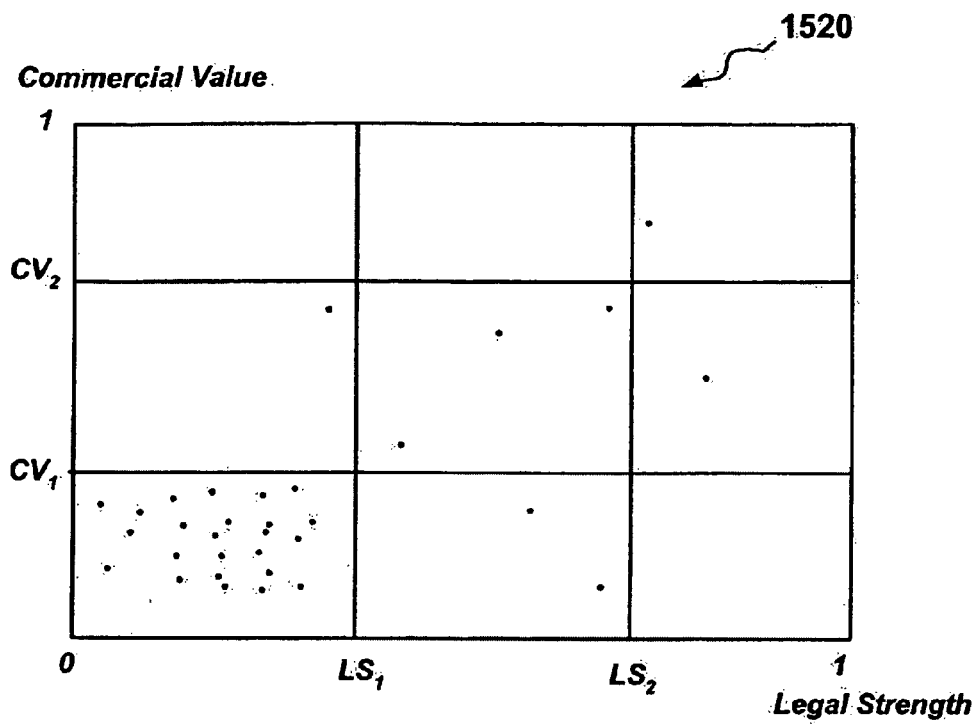

When a patent is represented by a point in the respective system of coordinates formed by patent indices axes, e.g. as shown in FIGS. 27A to 27C, the addition of the color to the point according to the value of $\lambda_0$ determined earlier greatly improves and facilitates the visual representation of the patent quality, thus allowing to grasp the quality of the patent quicker and with less effort. This is true for the number of patent indices equal to one, two, or three, but in the case of three patent indices, color coding has an additional advantage of becoming a substitute of a fourth coordinate (the Patent Quality itself), thus allowing to visualize the value of the Patent Quality (the value of the fourth coordinate) in a three dimensional space, which would not be possible otherwise.

Figure 28:
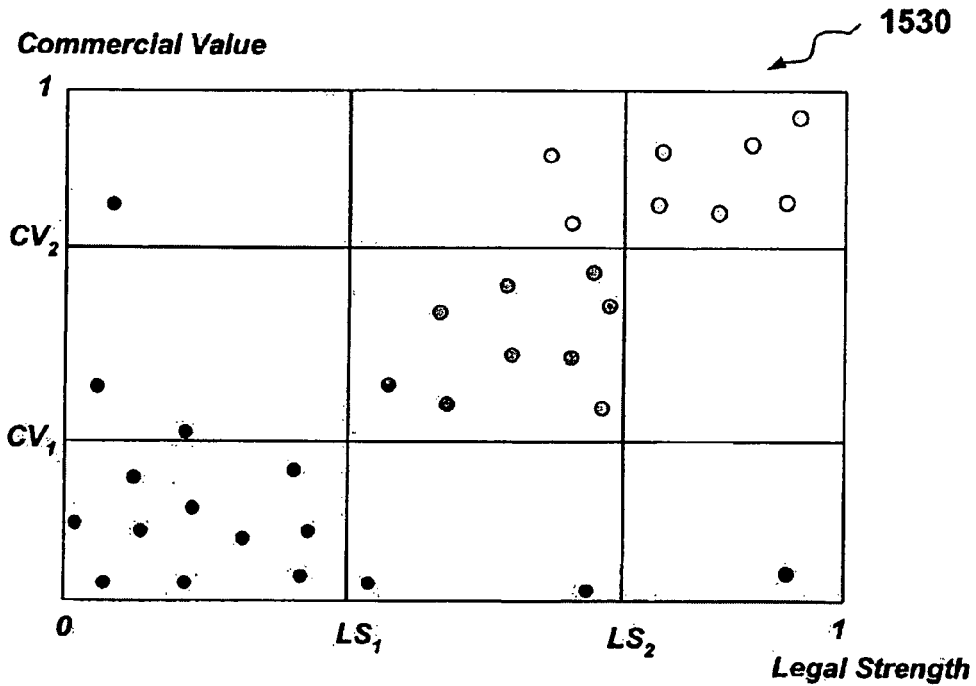
FIG. 28 shows yet another form of visualization representation of the results of patent portfolio evaluation using a color coding of patents according to their Patent Quality.

Color-coding of the quality of patents becomes even more important when a patent portfolio is under evaluation. In real life situations, patent portfolio structure may not necessarily be distinct, which makes patent portfolio analysis without the color coding technique more difficult. In such cases, color-coding greatly helps to emphasize, or even reveal, the patterns, simplifying the portfolio analysis. It also makes it much easier and quicker to get a general impression about the portfolio structure. For illustrative purposes, FIG. 28 shows a color coded visualization 1530 of an exemplary patent portfolio, wherein different colors are represented by different shades of grey color, namely purple color is substituted by black color, yellow and green colors are substituted by grey color, and red color is substituted by while color. This has been done for illustrative purposes only and for making black and white reproduction of drawings prepared for the USPTO easier. Thus, low quality patents are represented by black points (small circles), and higher quality patents are represented by grey points, which turn into almost white points when the quality of patents increases further.

In a three dimensional space, when a third patent index, e.g. of Technical Merit, is added, the shape of the surface containing points representing Patent Quality of patents in the patent portfolio, and a distribution of the colors assigned to the points across the surface will vary, but will give a quick visual representation of the quality of the portfolio as a whole depending on which color (or colors) prevail on the surface. It is worth mentioning once more, that the introduction of color as a representation of Patent Quality allows to provide a visual representation of a fourth coordinate, i.e. of three patent indices and the PQ in a three dimensional space, which is impossible to do with ordinary graphical means, or would require to find another way of representing a fourth dimension in a three dimensional space.

While different colors have been assigned to patent documents having different value of the PQ, alternatively, it is possible to assign the same color to a portion of the patent portfolio, having patent documents whose PQ values are within a selected range of the PQ value variations. For example, patent documents having their PQ value within $[PQ_{min}, P_1]$ may be color coded with a blue color, patent documents having their PQ value within $[PQ_1, P_2]$ may be color coded with a yellow color, and patent documents having their PQ value within $[P_2, PQ_{max}]$ may be color coded with a red color. It is understood that any number of the patent portfolio portions that are color-coded by different colors may be created as required.

In one more form of graphical representation of the results of patent evaluation, the color characterizing the value of the patent document may be conveniently generated based on values of patent indices characterizing the patent document. This form of graphical representation may be used in conjunction with the AI system of the AI Unit 410 described above. A visualization of the value of the patent document is performed as follows. Areas (sub-squares) of the square 750 on FIG. 17A, corresponding to different conclusions labeled Conclusion 1 to Conclusion 9, are assigned colors such that at least one said area has a color, which is different from the colors of other areas, and the patent document is characterized by the color, which is the same as the color of the area where the patent indices characterizing the patent document belong. Advantageously, different areas of the square 750 will have different colors. Thus, all patent documents belonging to the same area will have the same color, while the patent portfolio as a whole will be characterized by a number of colors, which are associated with the conclusions generated by the AI system, or, in other words, associated with the areas within the space of variations of the patent indices, which have meaningful interpretations with regard to the value of the patent document. When the patent document is characterized by three patent indices, a similar procedure may be applied to a three dimensional coloring of the cube corresponding to variations of three patent indices, and to respective sub-cubes within the cube associated with meaningful interpretations of the value of the patent document and corresponding to the Conclusions 1 to 27 described above.

In a modification to the above form of graphical representation of the results of patent evaluation, the colors of the areas associated with the conclusions are assigned as follows, which will be illustrated by way of example for the patent documents having three patent indices. First, the area (sub-cube) to be colored is selected, and then a patent document whose patent indices belong to the selected area is chosen, e.g. the document whose patent indices are substantially in the center of the selected area, e.g. in the middle of the selected sub-cube. The values of patent indices of this selected patent document are used as corresponding Red, Green, and Blue values in the known RGB color model widely used in computer graphics, see e.g. a handbook "Principles of Digital Image Synthesis" by Andrew Glassner published by Morgan-Kaufman, San Francisco 1995, articles on "Education for the Colour industry"; a lecture by Nan C. Schaller, a professor of Computer Science Department at Rochester Institute of technology; a Java Applet implementing a Graphic RGB Calculator; an article "Where's purple? Or, how to plot colours properly on a computer screen", and documents available at the website of International Color Consortium, all references cited in the IDS submitted by the applicant. As a result, various intensities of Red, Green and Blue colors, corresponding to the values of the patent indices of the selected patent document within the selected area, when mixed together, produce the color, which will be assigned to the selected area. Beneficially, all patent documents within the selected area will be associated with the same color. Other areas will have different colors, corresponding to their own RGB values and respective RGB color mixtures. Instead of the RGB color model, which is often referred to as a subtractive color model used for computer visualization, and alternative additive color model using a CMY (Cyan, Magenta, Yellow) colors may also be used for printing visualization. For example, to correspond to the above RGB values selection, the intensities of Cyan, Magenta and Yellow colors may be chosen so that Cyan=1.0—Red, Magenta=1.0—Green, and Yellow=1.0—Blue. An improved CMYK (Cyan, Magenta, Yellow, Key), wherein a black (key) color added may be used for printing purposes. Other color models used in computer graphics and/or printing industry may be also used for color visualization of values of patent documents on a computer screen or on paper, e.g. by using— RGB, HSV (Hue, Saturation, Value), HLS (Hue, Lightness, Saturation), or device independent color models (spaces) such as XYZ model, L*u*v* model, or L*a*b* model, the details of which are described, e.g. in the paper "Color and Color management Systems" published by Apple Computers, May 27, 2004 cited in the IDS submitted by the applicant. The majority of the described color models use three or four input components to produce a color, thus being conveniently suitable for color visualization of patent documents characterized by three or four patent indices.

If the patent document is characterized by less than three patent indices, the procedure of assigning the color to the selected area according to the RGB (Red, Green, Blue) color model or the CMY (Cyan, Magenta, Yellow) color model will be similar except for one or two colors being excluded from the respective RGB or CMY color models when the patent document is characterized by two or one patent indices respectively. As a result, the color coding will represent shades of two color mixtures only (in case of two patent indices), or just different shades of one color (in the case of one patent index).

It is contemplated that color coding or other graphical representations may be applied to an individual patent (when applicable), or to a patent portfolio in a manner described above. When applied to the individual patent, the PQC 400 may be enhanced with a visualization unit (not shown) similar to the Portfolio visualization Unit 1226, which would have a similar structure and operation, with the simplification that it will apply to the individual patent instead of the patent portfolio.

The color visual representation of patents according to their monetary value can be also done in a similar manner, e.g. by providing a correspondence between a color and a monetary value of a patent, or between selected colors and ranges of monetary values of patents in the patent portfolio.

Thus, a visual representation of the results of patent quality evaluation has been provided.

Although specific embodiments of the invention have been described in detail, it will be apparent to one skilled in the art that variations and modifications to the embodiments may be made within the scope of the following claims.

What is claimed is:

1. A computerized method for evaluating a patent document, comprising:
in a computer having a processor configured for:
(a) introducing one or more patent indices, characterizing different aspects of the patent document, and a Patent Quality (PQ) index, depending on said one or more patent indices; a monetary value of the patent document being a function of said PQ index;
(b) the Patent Quality index having a single numerical value, and being varied on a bounded interval for said PQ index having respective $PQ_{min}$ and $PQ_{max}$ values; each patent index having a single numerical value and being defined on a bounded interval for each said patent index having respective minimal and maximal values; and
(c) transforming said one or more patent indices into said Patent Quality index according to a deterministic non-linear transformation;
said non-linear transformation being continuous, monotonous with respect to each of said patent indices,
said non-linear transformation being non-linear with respect to at least one of said patent indices;
wherein said patent indices and said non-linear transformation are chosen so as to satisfy the following:
tending of any one of said patent indices substantially to a respective minimal value, results in said Patent Quality index tending substantially to one of the following, independent of values of other patent indices:
the $PQ_{min}$;
the $PQ_{max}$; and
wherein said non-linear transformation has a parameter of non-linearity expressed as a real number, and
wherein said non-linear transformation is a single-valued transformation providing a single numerical value for said PQ index for any parameter of non-linearity.

2. The method as described in claim 1, said non-linear transformation being non-linear with respect to each of said patent indices.

3. The method as described in claim 1, the step (a) comprising introducing a hierarchy of patent indices, each of said patent indices being further characterized by one or more respective patent sub-indices.

4. The method as described in claim 3, the step (b) comprising transforming said patent sub-indices into respective patent indices, said transforming of said sub-indices being performed according to one of the following:
(i) a linear transformation of said patent sub-indices into said patent indices; and
(ii) a non-linear transformation of said patent sub-indices into said patent indices.

5. The method as described in claim 3, wherein the step of introducing a hierarchy of patent indices comprises introducing one or more of the following sub-indices characterizing a patent index of technical merit:
degree of technical importance to business;
difficulty of manufacturing;
degree of technical solution of a problem;
difficulty of designing around; and
number of existing alternative solutions.

6. The method as described in claim 3, wherein the step of introducing a hierarchy of patent indices comprises introducing one or more of the following sub-indices characterizing a patent index of inventive merit:
invention scale;
degree of the solution of the problem;
uniqueness of the invention;
degree of novelty;
originality of the solution; and
technical effectiveness of the proposed solution.

7. The method as described in claim 3, wherein the step of introducing a hierarchy of patent indices comprises introducing one or more of the following sub-indices characterizing a patent index of commercial value:
life cycle stage of the patent document;
size of the market to serve;
required investment; and
scalability for volume production.

8. The method as described in claim 3, wherein the step of introducing a hierarchy of patent indices comprises introducing one or more of the following sub-indices characterizing the patent index of legal strength:
scope of claims;
infringement detectability;
chances of infringing third party patents;
chances of invalidity of the patent document; and
simplicity of designing around the proposed solution.

9. The method as described in claim 1, wherein:
all patent indices are defined on the same bounded interval for each said patent index; and
transforming any number of patent indices having equal numerical values holds the numerical value of the Patent Quality index unchanged.

10. The method as described in claim 1, comprising selecting the $PQ_{min}$ equal to zero.

11. The method as described in claim 1, the step (c) comprising selecting the non-linear transformation as follows:

$$PQ = \frac{1}{1 - b + b \cdot \left( \frac{K_1}{x_1} + \frac{K_2}{x_2} + \ldots + \frac{K_n}{x_n} \right)},$$

wherein b is the parameter of non-linearity, $x_1, x_2, \ldots, x_n$ are patent indices, and $K_i$, i=1, ... n is a coefficient indicating relative contribution of the i-th patent index into the PQ, where $K_1 + K_2 + \ldots + K_n = 1$.

12. The method as described in claim 1, further comprising determining a monetary value of the patent document as a product of a normalized value of the PQ index equal to $(PQ - PQ_{min})/(PQ_{max} - PQ_{min})$ and a monetary value of an Etalon Patent (EP) under current market conditions, the EP being devoted to the same problem as the patent document and characterized by the same set of patent indices, values of all patent indices of the EP being equal to respective maximal values.

13. A method of generating a computer database stored in a computer memory, comprising steps of:
providing evaluation of patent documents, each patent document being evaluated in accordance with the method of claim 12; and
storing results of the patent evaluations in the computer database in the computer memory.

14. The method as described in claim 1, further comprising analyzing values of said patent indices by an Artificial Intelligence (AI) system, including generating a conclusion regarding the value of the patent document based on the performed analysis, and a reason explaining how the conclusion relates to the numerical values of the patent indices.

15. The method as described in claim 14, further comprising displaying one of the following to a user:
the generated conclusion; and
the generated conclusion and the reason.

16. The method as described in claim 14, the step of analyzing comprising analyzing the values of the patent indices by the AI system, which is a decision tree based AI system, comprising decision nodes and conclusion nodes, each decision node having at least two outcomes connecting the decision node to another decision node or to the conclusion node.

17. The method as described in claim 1, wherein the step (a) comprises introducing the patent indices from the following set of patent indices: technical merit, commercial value, legal strength, inventive merit, and utility.

18. The method as described in claim 1, further comprising a step of visualizing the PQ index by providing a correspondence between the single numerical value of the PQ index and one or more colors of a visible part of light spectrum.

19. The method as described in claim 18, the visualizing comprising providing the correspondence between said PQ index and a color $\lambda$ of the visible part of light spectrum as follows:

$$\lambda = \lambda_{min} + \frac{\lambda_{max} - \lambda_{min}}{PQ_{max} - PQ_{min}} \cdot (PQ - PQ_{min}),$$

$[\lambda_{min}, \lambda_{max}]$ being a wavelength range for the visible part of light spectrum, and $(PQ-PQ_{min})/(PQ_{max}-PQ_{min})$ being a normalized value of the PQ index.

20. A method of generating a computer database stored in a computer memory, comprising steps of:
providing evaluation of patent documents, each patent document being evaluated in accordance with the method of claim 1; and
storing results of the patent evaluations in the computer database in the computer memory.

21. A system for evaluating a patent document, comprising:
data input means for receiving an input data with regard to one or more patent indices, characterizing different aspects of the patent document, each patent index having a single numerical value and being defined on a bounded interval for each said patent index having respective minimal and maximal values; and
a Patent Quality processing unit, comprising a computer program code stored in a computer memory, for processing the input data into a Patent Quality (PQ) index according to a deterministic non-linear transformation of said patent indices, said PQ index having a single numerical value; a monetary value of the patent document being a function of said PQ index;
said non-linear transformation being continuous, monotonous with respect to
each of said patent indices, and said PQ index being varied on a bounded
interval for the PQ index having respective $PQ_{min}$ and $PQ_{max}$ values;
said non-linear transformation being non-linear with respect to at least one of said patent indices;
wherein said patent indices and said non-linear transformation are chosen so as to satisfy the following:
tending of any one of said patent indices substantially to a respective minimal value, results in said Patent Quality index tending substantially to one of the following, independent of values of other patent indices: the $PQ_{min}$; the $PQ_{max}$; and
wherein said non-linear transformation has a parameter of non-linearity expressed as a real number, and
wherein said non-linear transformation is a single-valued transformation providing a single numerical value for said PQ index for any parameter of non-linearity.

22. The system of claim 21, said non-linear transformation being non-linear with respect to each of said patent indices.

23. The system as described in claim 21, further comprising a graphical user interface, comprising a computer program code stored in the computer memory, for displaying one the following to a user:
the output data;
the input data and the output data.

24. The system as described in claim 23, the graphical user interface comprising a computer program code stored in the computer memory, which when executed by a computer, provides a graphical means for entering and displaying the input data, and a graphical means for displaying the output data.

25. The system as described in claim 24, the graphical means comprising a slider, having a linear scale, a sliding object movable along the linear scale, and a counter associated with the linear scale and showing the current position of the sliding object on the linear scale.

26. The system as described in claim 21, wherein:
all patent indices are defined on the same bounded interval for said each patent index; and
transforming any number of patent indices having equal numerical values holds the numerical value of the Patent Quality index unchanged.

27. The system as described in claim 21, the PQ processing unit further comprising computer readable instructions stored in the computer memory for execution by a processor for determining a monetary value of the patent document as a product of a normalized value of said PQ index equal to $(PQ-PQ_{min})/(PQ_{max}-PQ_{max})$ and a monetary value of an Etalon Patent (EP) under current market conditions, the EP being devoted to the same problem as the patent document and characterized by the same set of patent indices, values of all patent indices of the EP being equal to respective maximal values for the patent indices.

28. The system as described in claim 27, further comprising means for storing one or more of the said patent indices, the PQ index and the monetary value in a database or for sending this data over a network.

29. The system as described in claim 27, the system being implemented to be accessible via a corporate Intranet or the Internet.

30. The system as described in claim 27, further comprising a visualization unit comprising computer readable instructions stored in the computer memory for visualizing said PQ index or the monetary value of the patent document by providing a correspondence between the value of said PQ index or the monetary value of the patent document and a mixture of one or more colors of a visible part of light spectrum.

31. The system as described in claim 21, further comprising an Artificial Intelligence (AI) unit, comprising an AI system having computer readable instructions stored in the computer memory for analyzing values of said patent indices, and generating a conclusion regarding the value of the patent document based on the performed analysis, and a reason explaining how the conclusion relates to the numerical values of said patent indices.

32. The system as described in claim 21, wherein the $PQ_{min}$ is equal to zero.

33. The system as described in claim 21, wherein the non-linear transformation is as follows:

$$PQ = \frac{1}{1-b+b\cdot\left(\frac{K_1}{x_1}+\frac{K_2}{x_2}+\ldots+\frac{K_n}{x_n}\right)},$$

wherein b is the parameter of non-linearity, $x_1, x_2, \ldots, x_n$ are patent indices, and $K_i$, i=1, ... n is a coefficient indicating relative contribution of the i-th patent index into the PQ, where $K_1+K_2+\ldots+K_n=1$.

34. A computerized method for evaluating a patent document, comprising:
in a computer having a processor configured for:
  (a) providing one or more patent indices, characterizing different aspects of the patent document, and a Patent Quality (PQ) index depending on said one or more patent indices, a monetary value of the patent document being a function of said PQ index, each patent index having a single numerical value and being defined on a bounded interval for each said patent index having respective minimal and maximal values;
  (b) transforming said patent indices into said PQ index according to a deterministic non-linear transformation, said Patent Quality index being varied on a bounded interval for said PQ index having respective $PQ_{min}$ and $PQ_{max}$ values;
    said non-linear transformation being continuous, monotonous with respect to each of said patent indices;
    said non-linear transformation being non-linear with respect to at least one of said patent indices;
    wherein all patent indices are defined on the same bounded interval for each said patent index;
    transforming any number of patent indices having equal numerical values holds the numerical value of said Patent Quality index unchanged;
    wherein said non-linear transformation has a parameter of non-linearity expressed as a real number;
    wherein said non-linear transformation is a single-valued transformation providing a single numerical value for said PQ index for any parameter of non-linearity.

35. The method as described in claim 34, wherein said patent indices and said non-linear transformation are chosen so as to satisfy the following:
tending of any one of said patent indices substantially to a respective minimal value, independent of values of other patent indices, results in said Patent Quality index tending substantially to one of the following:
  the $PQ_{min}$;
  the $PQ_{max}$.

36. The method as described in claim 35, comprising selecting the $PQ_{min}$ equal to zero.

37. The method as described in claim 34, the step (a) comprising providing a hierarchy of patent indices, each of the patent indices being further characterized by one or more respective patent sub-indices.

38. The method as described in claim 34, further comprising determining a monetary value of the patent document as a product of a normalized value of said PQ index equal to $(PQ-PQ_{min})/(PQ_{max}-PQ_{min})$ and a monetary value of an Etalon Patent (EP) under current market conditions, the EP being devoted to the same problem as the patent document and characterized by the same set of patent indices, values of all patent indices of the EP being equal to respective maximal values for the patent indices.

39. The method as described in claim 38, further comprising visualizing the PQ index or the monetary value of the patent document by providing a correspondence between the value of the PQ index or the monetary value of the patent document and a mixture of one or more colors of a visible part of light spectrum.

40. The method as described in claim 34, further comprising analyzing values of said patent indices by an Artificial Intelligence (AI) system, including generating a conclusion regarding the value of the patent document based on the performed analysis, and a reason explaining how the conclusion relates to the numerical values of said patent indices.

41. The method as described in claim 34, wherein the non-linear transformation is as follows:

$$PQ = \frac{1}{1-b+b\cdot\left(\frac{K_1}{x_1}+\frac{K_2}{x_2}+\ldots+\frac{K_n}{x_n}\right)},$$

wherein b is the parameter of non-linearity, $x_1, x_2, \ldots, x_n$ are patent indices, and $K_i$, i=1, ... n is a coefficient indicating relative contribution of the i-th patent index into the PQ, where $K_1+K_2+\ldots+K_n=1$.

42. A non-transitory computer readable storage medium having recorded thereon statements and instructions for execution by a computer, causing the computer to:
  (a) introduce one or more patent indices, characterizing different aspects of the patent document, and a Patent Quality (PQ) index, depending on said one or more patent indices; a monetary value of the patent document being a function of said PQ index;
  (b) wherein the Patent Quality index has a single numerical value and varies on a bounded interval for said PQ index having respective $PQ_{min}$ and $PQ_{max}$ values; each patent index has a single numerical value and defined on a bounded interval for each said patent index having respective minimal and maximal values; and
  (c) transform said one or more patent indices into said Patent Quality index according to a deterministic non-linear transformation;
    said non-linear transformation being continuous, monotonous with respect to each of said patent indices,
    said non-linear transformation being non-linear with respect to at least one of said patent indices;
    wherein said patent indices and said non-linear transformation are chosen so as to satisfy the following:
      tending of any one of said patent indices substantially to a respective minimal value, results in said Patent Quality index tending substantially to one of the following, independent of values of other patent indices:
      the $PQ_{min}$;
      the $PQ_{max}$; and
    wherein said non-linear transformation has a parameter of non-linearity expressed as a real number, and
    wherein said non-linear transformation is a single-valued transformation providing a single numerical value for said PQ index for any parameter of non-linearity.

43. A system for evaluating a patent document, comprising:
a processor and a non-transitory computer readable storage medium having computer readable instructions stored thereon for execution by the processor, causing the processor to:
- (a) provide one or more patent indices, characterizing different aspects of the patent document, each patent index having a single numerical value and being defined on a bounded interval for each said patent index having respective minimal and maximal values;
- (b) transform the patent indices into a Patent Quality index (PQ) according to a deterministic non-linear transformation, said Patent Quality index being varied on a bounded interval for said PQ index having respective $PQ_{min}$ and $PQ_{max}$ values; a monetary value of the patent document being a function of said PQ index;
  said non-linear transformation being continuous, monotonous with respect to each of said patent indices;
  said non-linear transformation being non-linear with respect to at least one of said patent indices;
  wherein all patent indices are defined on the same bounded interval for each said patent index;
  transforming any number of patent indices having equal numerical values holds the numerical value of said Patent Quality index unchanged;
  wherein said non-linear transformation has a parameter of non-linearity expressed as a real number, and
  wherein said non-linear transformation is a single-valued transformation providing a single numerical value for said PQ index for any parameter of non-linearity.

44. The system as described in claim 43, further comprising providing a hierarchy of patent indices, each of the patent indices being further characterized by one or more respective patent sub-indices.

45. The system as described in claim 43, wherein said patent indices and said non-linear transformation are chosen so as to satisfy the following:
tending of any one of said patent indices substantially to a respective minimal value, independent of values of other patent indices, results in said Patent Quality index tending substantially to one of the following:
the $PQ_{min}$;
the $PQ_{max}$.

46. The system as described in claim 43, wherein the $PQ_{min}$ is equal to zero.

47. The system as described in claim 43, wherein the non-linear transformation is as follows:

$$PQ = \frac{1}{1 - b + b \cdot \left(\frac{K_1}{x_1} + \frac{K_2}{x_2} + \ldots + \frac{K_n}{x_n}\right)},$$

wherein b is the parameter of non-linearity, $x_1, x_2, \ldots, x_n$ are patent indices, and $K_i$, i=1, ... n is a coefficient indicating relative contribution of the i-th patent index into the PQ, where $K_1 + K_2 + \ldots + K_n = 1$.

* * * * *

UNITED STATES PATENT AND TRADEMARK OFFICE
CERTIFICATE OF CORRECTION

| | | |
|---|---|---|
| PATENT NO. | : 8,145,639 B2 | Page 1 of 1 |
| APPLICATION NO. | : 10/915598 | |
| DATED | : March 27, 2012 | |
| INVENTOR(S) | : Allan Williams | |

It is certified that error appears in the above-identified patent and that said Letters Patent is hereby corrected as shown below:

In the Claims:

Column 57, Claim 18, line 12, "a step of visualizing" should read as --visualizing--.

Signed and Sealed this
Twenty-fifth Day of September, 2012

David J. Kappos
*Director of the United States Patent and Trademark Office*